United States Patent
Duan et al.

(10) Patent No.: US 8,697,169 B2
(45) Date of Patent: Apr. 15, 2014

(54) METHODS AND COMPOSITIONS FOR FINING BEVERAGES

(75) Inventors: Weidong Duan, Vermont (AU); Caroline Giandinoto, Greensborough (AU); Mark Goldsmith, Ringwood (AU); Peter Hosking, Double View (AU); Aldo Lentini, Ascot Vale (AU); Tony Oliver, Warrandyte (AU); Peter Rogers, Williamstown (AU); Peter Smith, Altona Meadows (AU); Antony Bacic, Eaglemont (AU); Ming-Long Liao, Greensborough (AU); Filomena Pettolino, Crescent Reservoir (AU)

(73) Assignee: Carlton and United Beverages Limited, Southbank, Victoria (AU)

( * ) Notice: Subject to any disclaimer, the term of this patent is extended or adjusted under 35 U.S.C. 154(b) by 846 days.

(21) Appl. No.: 11/663,274

(22) PCT Filed: Sep. 20, 2005

(86) PCT No.: PCT/AU2005/001439
§ 371 (c)(1),
(2), (4) Date: Sep. 5, 2008

(87) PCT Pub. No.: WO2006/032088
PCT Pub. Date: Mar. 30, 2006

(65) Prior Publication Data
US 2009/0169691 A1  Jul. 2, 2009

(30) Foreign Application Priority Data
Sep. 20, 2004 (AU) ................................ 2004905416

(51) Int. Cl.
*A23L 1/05* (2006.01)

(52) U.S. Cl.
USPC ........... 426/573; 426/590; 426/592; 426/658; 426/422

(58) Field of Classification Search
USPC .......................... 426/573, 590, 592, 658, 422
See application file for complete search history.

(56) References Cited

U.S. PATENT DOCUMENTS

| 1,631,384 A |   | 6/1927 | Richmond |
|---|---|---|---|
| 2,419,930 A |   | 4/1947 | Wilson |
| 3,052,548 A | * | 9/1962 | Nugey ........................... 426/329 |
| 3,293,040 A | * | 12/1966 | Shaler, Jr. et al. ............ 426/442 |

(Continued)

FOREIGN PATENT DOCUMENTS

| AU | 772 345 | 11/2001 |
|---|---|---|
| EP | 111420 | 6/1984 |

(Continued)

OTHER PUBLICATIONS

Manay, N. Shakuntala and M. Shadaksharaswany, Foods: Facts and Principles. 2001, New Age International (P) Limited Publishers, pp. 30-31.*

(Continued)

*Primary Examiner* — Humera Sheikh
*Assistant Examiner* — Hong T Yoo
(74) *Attorney, Agent, or Firm* — Finnegan, Henderson, Farabow, Garrett & Dunner, LLP

(57) ABSTRACT

The present invention provides a finings formulation comprising pectin and methods of using pectin in a fining process to produce fined beverages, particularly beers.

50 Claims, 26 Drawing Sheets

(56) References Cited

U.S. PATENT DOCUMENTS

| | | | |
|---|---|---|---|
| 3,770,454 A * | 11/1973 | Stone | 426/12 |
| 5,059,431 A | 10/1991 | Daeschel et al. | |
| 5,567,451 A | 10/1996 | Rinn et al. | |
| 6,045,852 A | 4/2000 | Talley | |
| 6,699,977 B1 * | 3/2004 | Gerrish et al. | 536/2 |
| 7,160,563 B1 * | 1/2007 | Malcorps et al. | 426/16 |
| 2003/0064143 A1 * | 4/2003 | Gerrish et al. | 426/592 |
| 2003/0157218 A1 * | 8/2003 | Donhowe | 426/16 |
| 2004/0096565 A1 * | 5/2004 | Evans et al. | 426/592 |
| 2005/0220935 A1 | 10/2005 | Oono | |

FOREIGN PATENT DOCUMENTS

| | | | |
|---|---|---|---|
| EP | 0 377 301 | 7/1990 | |
| GB | 555089 | 8/1943 | |
| GB | 571368 | 8/1945 | |
| GB | 2 342 321 | 4/2000 | |
| GB | 2 395 413 | 5/2004 | |
| JP | 61-132140 | 6/1986 | |
| JP | 02006408 * | 1/1990 | A61K 31/555 |
| WO | WO 98/00519 A1 | 1/1998 | |
| WO | WO 9818902 A1 * | 5/1998 | C12H 1/14 |
| WO | WO 2006/032088 | 3/2006 | |

OTHER PUBLICATIONS

JP 02006408, Adachi H; Nozaki S; and Sakaguchi T, Jan. 10, 1990, DERWENT Abstract, English translation. pp. 1-4.*

International Search Report dated Oct. 27, 2005, for Application No. PCT/AU2005/001439.

Pisarnitskii, A. et al., "Stimulation of the Clarification of Apple Juices and Wines," *Vinodelie i Vinogradarstvo SSSR* (1972), (4), 27-9.

English Abstract of Pisarnitskii, A. et al., "Stimulation of the Clarification of Apple Juices and Wines," *Vinodelie i Vinogradarstvo SSSR* (1972), (4), 27-9.

Supplementary European Search Report in EP 05 78 4633 dated Jan. 30, 2013.

Anonymous: "Pectin"; Wikipedia, the free encyclopedia; XP002567848; retrieved from the Internet: URL:http//en.wikipedia.org/wiki/Pectin; retrieved on Feb. 10, 2010.

Supplementary European Search Report, dated Feb. 10, 2010.

Office Action dated May 7, 2012 in U.S. Appl. No. 12/524,942.

Office Action dated Jun. 8, 2011 in U.S. Appl. No. 12/524,942.

Office Action dated Oct. 1, 2012 in U.S. Appl. No. 12/602,520.

Castellari M. et al., "Removal of Ochratoxin A in Red Wines by Means of Adsorption Treatments with Commercial Fining Agents," J. Agric. Food Chem., vol. 49. pp. 3917-3931 (2001).

International Search Report for PCT/AU2008/000802 dated Jul. 11, 2008.

New Zealand Examination Report in Application No. 578877 dated Aug. 13, 2010.

Suppementary European Seach Report in EP 08 75 6890 dated Oct. 20, 2010.

* cited by examiner

Figure 4

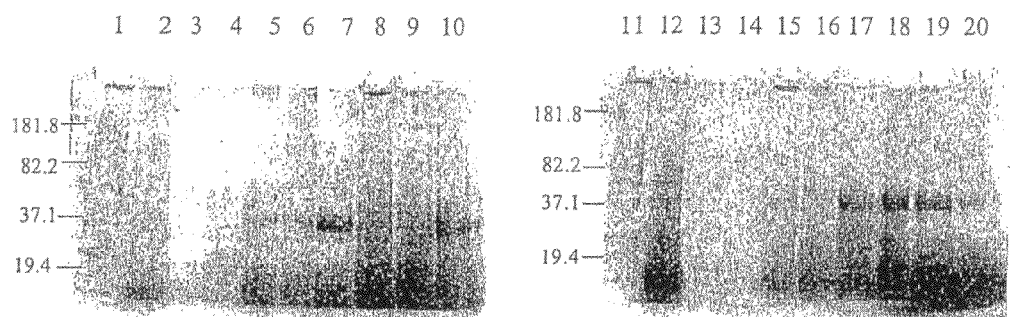

1 - MW markers
2 - Top pellet - No fining
3 - Top pellet - Isinglass
4 - Top pellet - PB-B
5 - Floc supernatant - No fining
6 - Floc supernatant - Isinglass
7 - Floc supernatant - PB-B
8 - Floc pellet - No fining
9 - Floc pellet - Isinglass
10 - Floc pellet - PB-B 11 - MW markers
12 - Top pellet - No fining
13 - Top pellet - Isinglass
14 - Top pellet - PB-B
15 - Floc pellet - No fining
16 - Floc pellet - Isinglass
17 - Floc pellet - PB-B
18 - Top supernatant - No fining
19 - Top supernatant - Isinglass
20 - Top supernatant - PB-B 1 - MW markers
2 -
3 - Floc super. - no fining
4 - Floc super - isinglass
5 - Floc super - PB-A
6 - Floc super - PB-C
7 - Floc pellet - no fining
8 - Floc pellet - isinglass
9 - Floc pellet - PB-A
10 - Floc pellet - PB-C 11 - MW markers
12 - Top super. - no fining
13 - Top super - isinglass
14 - Top super - PB-A
15 - Top super - PB-C
16 -
17 - Top pellet - no fining
18 - Top pellet - isinglass
19 - Top pellet - PB-A
20 - Top pellet - PB-C Figure 7
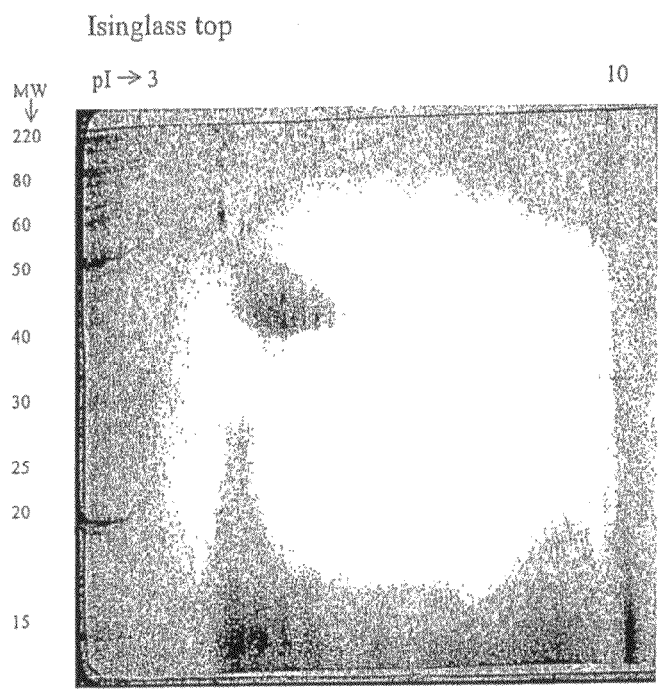
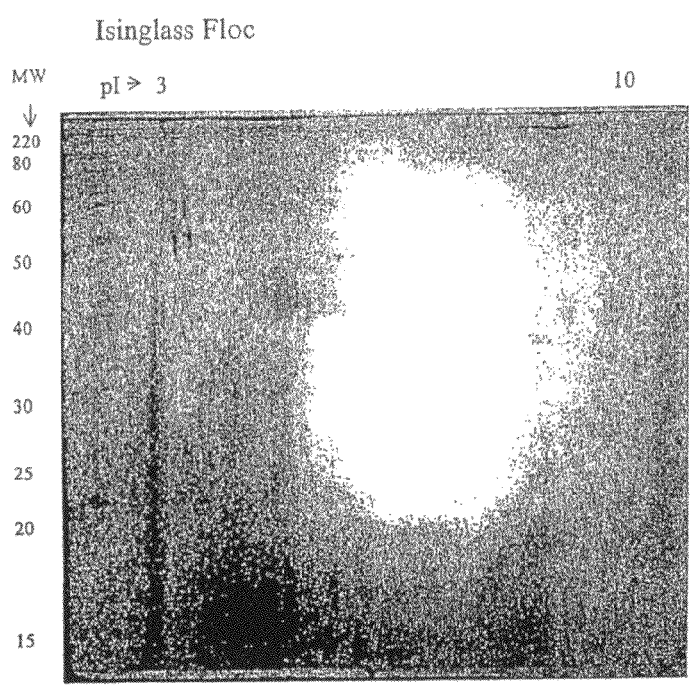

5    5.6    7

5    5.6    7

SEQUENCE LISTING

<160> NUMBER OF SEQ ID NOS: 1

<210> SEQ ID NO 1
<211> LENGTH: 400
<212> TYPE: PRT
<213> ORGANISM: Hordeum vulgare

<400> SEQUENCE: 1

```
Met Ala Thr Thr Leu Ala Thr Asp Val Arg Leu Ser Ile Ala His Gln
1               5                   10                  15

Thr Arg Phe Ala Leu Arg Leu Ala Ser Ala Ile Ser Ser Asn Pro Glu
            20                  25                  30

Arg Ala Ala Gly Asn Val Ala Phe Ser Pro Leu Ser Leu His Val Ala
        35                  40                  45

Leu Ser Leu Ile Thr Ala Gly Ala Gly Gly Ala Thr Arg Asp Gln Leu
    50                  55                  60

Val Ala Ile Leu Gly Asp Gly Gly Ala Gly Asp Ala Lys Glu Leu Asn
65                  70                  75                  80

Ala Leu Ala Glu Gln Val Val Gln Phe Val Leu Ala Asn Glu Ser Ser
                85                  90                  95

Thr Gly Gly Pro Arg Ile Ala Phe Ala Asn Gly Ile Phe Val Asp Ala
            100                 105                 110

Ser Leu Ser Leu Lys Pro Ser Phe Glu Glu Leu Ala Val Cys Gln Tyr
        115                 120                 125

Lys Ala Lys Thr Gln Ser Val Asp Phe Gln His Lys Thr Leu Glu Ala
    130                 135                 140

Val Gly Gln Val Asn Ser Trp Val Glu Gln Val Thr Thr Gly Leu Ile
145                 150                 155                 160

Lys Gln Ile Leu Pro Pro Gly Ser Val Asp Asn Thr Thr Lys Leu Val
                165                 170                 175

Leu Gly Asn Ala Leu Tyr Phe Lys Gly Ala Trp Asp Gln Lys Phe Asp
            180                 185                 190

Glu Ser Asn Thr Lys Cys Asp Ser Phe His Leu Leu Asp Gly Ser Ser
        195                 200                 205

Ile Gln Thr Gln Phe Met Ser Ser Thr Lys Lys Gln Tyr Ile Ser Ser
    210                 215                 220

Ser Asp Asn Leu Lys Val Leu Lys Leu Pro Tyr Ala Lys Gly His Asp
225                 230                 235                 240

Lys Arg Gln Phe Ser Met Tyr Ile Leu Leu Pro Gly Ala Gln Asp Gly
                245                 250                 255

Leu Trp Ser Leu Ala Lys Arg Leu Ser Thr Glu Pro Glu Phe Ile Glu
            260                 265                 270

Asn His Ile Pro Lys Gln Thr Val Glu Val Gly Arg Phe Gln Leu Pro
        275                 280                 285

Lys Phe Lys Ile Ser Tyr Gln Phe Glu Ala Ser Ser Leu Leu Arg Ala
    290                 295                 300

Leu Gly Leu Gln Leu Pro Phe Ser Glu Ala Asp Leu Ser Glu Met
305                 310                 315                 320

Val Asp Ser Ser Gln Gly Leu Glu Ile Ser His Val Phe His Lys Ser
                325                 330                 335

Phe Val Glu Val Asn Glu Glu Gly Thr Glu Ala Gly Ala Ala Thr Val
            340                 345                 350

Ala Met Gly Val Ala Met Ser Met Pro Leu Lys Val Asp Leu Val Asp
        355                 360                 365
```

```
Phe Val Ala Asn His Pro Phe Leu Phe Leu Ile Arg Glu Asp Ile Ala
    370                 375                 380

Gly Val Val Val Phe Val Gly His Val Thr Asn Pro Leu Ile Ser Ala
385                 390                 395                 400
```

METHODS AND COMPOSITIONS FOR FINING BEVERAGES

This application is a national stage filing under 35 U.S.C. §371 of International Application No. PCT/AU2005/001439 filed on Sep. 20, 2005. This application claims priority of Australian Patent Application No. 2004/905416, filed on Sep. 20, 2004.

The present invention relates to methods and formulations for fining beverages. More particularly the present invention relates to formulations useful as finings agents, the use of finings agents in the production of beverage products, and beverage products produced by the use of such finings agents. The finings agents find particular utility in fining beverages produced by fermentation.

BACKGROUND OF THE INVENTION

Fermented or fruit based beverages in particular are often cloudy or hazy. The haze in fermented beverages is due to the presence of protein and tannin molecules, along with yeast cells.

Due to consumer preference, it is often desirable to clarify the haze from such beverages. Additionally, clarification removes molecules which could aggregate and block processing equipment. In wine and some beers, acceptable levels of clarification may occur by standing the beverage over an extended period to allow agents producing the haze to settle. However, in the case of many beverages, particularly ales, lagers and fruit juices, where shelf life is not particularly long, it is necessary to effect rapid clarification to speed up delivery of the product to the consumer.

Brewers aim for short production times and limited inventories. Various additives or finings agents are generally used to enhance solids separation in beer streams.

Finings agents are used to associate with proteinaceous material in the beverage and form a precipitate which rapidly falls to the bottom of the storage vessel as a dense floc which then can be removed.

Isinglass is a fish bladder collagen preparation, which is added to storage beer to promote beer clarity and so improve filtration performance. Auxiliary finings agents such as silicates or polysaccharides may be used together with Isinglass.

Recently it became mandatory to label beer for the presence of fish-derived ingredients because of allergy issues. Bovine-sourced replacement collagens, need not carry the same warning. However bovine products have negative sentiment in the market because of Bovine Spongiform Encephalopathy (BSE) disease and may, at best, be considered short-term replacement finings agents. There are no known non-collagen alternatives that are as cost effective as Isinglass. Brewers are anxious to find an acceptable Isinglass replacement.

Another problem with using Isinglass as a finings agent for wine is that Isinglass takes out polyphenols in the wine and therefore may alter some of the characteristics of the wine.

Competitive finings agents such as Silicasol™ and carrageenans provide variable results according to the industry and may have drawbacks—fluffy bottoms and contamination of yeast residues.

It is an aim of the present invention to provide a reliable Isinglass alternative for use in clarifying beverages, particularly fermented beverages such as beer and wine.

It will be clearly understood that, although a number of prior art publications are referred to herein, this reference does not constitute an admission that any of these documents forms part of the common general knowledge in the art, in Australia or in any other country.

SUMMARY OF THE INVENTION

The inventors have found that particular types of pectin, a plant derived, non-allergenic polysaccharide, provide effective fining activity, to a level equal or superior to that achieved with Isinglass. They have also determined that the addition of certain additives to the pectin provide an enhanced finings effect.

Accordingly, in a first aspect the present invention provides a finings formulation comprising a pectin and a donor of sulphur dioxide.

As pectin activity, stability and solubility is reliant upon pH, it is preferred that the finings formulation also comprises a buffering agent capable of buffering the pH of the formulation when in solution to the pH that is optimum for the activity, solubility and stability of the pectin.

As pectin activity may be influenced by the presence of divalent ions, the finings formulation preferably also comprises a sequestering agent.

In a second aspect the present invention provides for the use of a pectin as a finings agents. The pectin for use in the second aspect of the invention is preferably provided as the finings formulation according to the first aspect of the invention.

In a third aspect the present invention provides a method of fining a beverage, the method comprising adding to the beverage an effective amount of a pectin. The pectin for use in the method according to the third aspect of the invention is preferably provided by the finings formulation according to the first aspect of the invention.

The method of the third aspect of the invention preferably also comprises the steps of allowing floc to form between proteinaceous material and the pectin; and removing the floc and associated pectin from the beverage.

In a fourth aspect the present invention provides a beverage which has undergone a fining process using a pectin. The pectin is preferably provided by the finings formulation according to the first aspect of the invention.

DETAILED DESCRIPTION OF THE INVENTION

Pectins are polysaccharide materials having gelling properties, which are found in variable amounts in the primary cell walls and intercellular tissues of many plants. They are most abundant in fruits and vegetables, especially in the rinds of citrus fruits.

Pectins with a degree of esterification (DE) of 50% or more are known as high methyl ester pectins and are capable of forming gels in aqueous systems with high contents of soluble solids and low pH values. The higher the DE, the lower the amount of soluble solids required and the higher the pH value at which gels can be formed.

High methyl ester (HM) pectins are used to achieve gel formation in fruit-based systems with high contents of solid and low pH values. Gels made with high methyl ester pectins have a firm and short structure and are clear and transparent with excellent flavour release. Such gels are not shear-reversible or heat-reversible. High methyl ester pectins are also widely used in acidified milk products due to their protein stabilising effect at a low pH.

Low methyl ester or low methoxy (LM) pectins are defined as those with a degree of esterification (DE) of 50% or less. This group of pectins is divided into two sub-groups, i.e. conventional low methyl ester (LMC) pectin and amidated, low methyl ester (LMA) pectin. Both sub-groups are characterised by their ability to form gels in systems with low solids content and a wide pH range. Both types form gels in the presence of calcium. The DE (degree of esterification) and DA (degree of amidation) of pectins are both known to have an influence on the ability of pectins to form gels, since DE and DA determine the calcium reactivity of pectins.

LMA pectins are generally used to assist gelation in low-sugar fruit preparations, particularly in low-sugar jams and jellies. They are calcium sensitive and are consequently able to gel as a result of the calcium content in fruit. LMC pectins are less calcium reactive than LMA preparations, and will only act as thickening agents in fruit preparations. However, if additional calcium is added, gelation will take place. LMC pectins are used in fruit yoghurt, ice cream ripple and similar products.

Other than their use as gelling agents in fruit-based and milk products, it is known to use pectins in beverage products. US patent application 20030064143 assigned to CP Kelco and U.S. Pat. No. 6,143,346 assigned to Hercules Incorporated both describe a process for making a clear beverage using a pectin which has a high DE (greater than 70%) and is not sensitive to calcium and which increases the viscosity of the beverage. In U.S. Pat. No. 6,143,346 the pectins are used to thicken materials, including foodstuffs and cosmetics. In both the prior art documents the pectin is used as an additive, in an amount of at least 0.025%, which remains in the final product. It is not suggested as a finings agent. In the present invention the pectin is used as a processing agent for increasing clarity only; it is not retained, other than in a negligible amount, in the final beverage product.

International patent application PCT/GB97/01546, with applicant Laporte BSD Limited describes the use of pectins as finings agents, the pectin having a molecular size range indicated by limiting viscosity number less than 0.5, and preferably from 0.005 to 0.2 and a degree of esterification of 10-50%, preferably less than 30%.

The pectin disclosed for use by Laporte is derived from nature but must be converted to the desired form by depolymerisation with pectinase. This is not necessarily the case in the present invention. The amount of pectin disclosed for use as a finings agent in Laporte is in the range of 0.5 to 2.0%. This is far more than is contemplated by the present invention.

Finings agents, such as Isinglass and animal finings are used in beer manufacture to accelerate the clarification of beer once the fermentation process is complete and when the beer is in storage. Many beers, especially lager beers, are filtered after time in storage by membrane filtration, or by diatomaceous earth-assisted filtration. The finings process ideally produces compact flocs which are not easily disturbed in the storage tanks upon drawing off the beer prior to passage to membrane or DE-filtration but are not nevertheless so compact that removal is difficult with the usual cleaning regimes applied in this art. Finings favour more efficient filtration and longer filtration runs.

Finings agents are dosed into beer on passing into settling tanks, usually after passage of the beer through the yeast centrifuges that reduce the yeast cell load typically to about $10^6$/ml. The high Reynolds number associated with dosing usually ensures that the finings agent is dispersed aggressively in the beer. The main component of pectin is galacturonic acid, which is bound to a galacturonate chain with glycosidic links. The galacturonic acid units are partially esterified with methanol and this in turn determines the DE value, the degree of esterification, which in turn has a decisive influence on the functional properties of the pectin.

Low methyl ester pectin (also referred to herein as low methoxy pectin) is the partial methyl ester of 1,4-linked poly-alpha-D-galacturonic acid. The structure is complicated however by interruption with single 1,2-alpha-L-rhamnose residues. Low methoxy pectins will form firm calcium gels and the method of cross linking can be considered in terms of the 'egg-box' model, which requires cooperative binding of calcium ions between aligned polygalacturonate ribbons. The affinity towards calcium can be modified by amidation of the acid groups and by esterification—by changing charge and charge distribution. The affinity of pectin in solution will also be affected by pH, temperature and the concentration of sugars and macromolecules in solution.

To minimise dilution of beer and for convenience of handling, finings agents are dosed from concentrated stock solutions. We have determined that there are upper limits to the usable range of concentration for pectin-based finings agents in breweries, based on process considerations: finings viscosity, finings stability, fining activity and finally the efficacy of finings dispersion into the beer stream.

It is proposed that the formation of pectin-protein flocs involves a sequence of events which may include gel formation, decoration, particle precipitation and floc formation. Beer contains significant amounts of calcium and magnesium ions as well as other cations. Calcium may typically be in the order 50 ppm, and magnesium likewise about 100 ppm. These values may vary considerably depending on the malt and brewhouse process, whether the wort is high gravity or very high gravity (e.g. 14-18° P), whether sugar adjuncts are used, and on any additions made in the brewhouse, which may include gypsum, and kettle finings. This is not meant to be an exclusive list as there are many variations practised according to the art of beer making.

Dispersion of the finings agents involves the injection of a liquid stream into a beer stream. The injection of the finings agents creates an interface(s) between the finings concentrate and the beer. Ideally this inhomogeneity is a momentary phenomenon, and disappears as the pectin equilibrates within the beer. However if the dispersion is inadequate (low Reynold's number), or if the finings agent at the interface is very reactive (e.g. towards calcium ions), the interface may be stabilised and a stable colloidal suspension may result. This will prevent the finings agents interacting with proteins, yeast cells, polyphenols and other substances in the beer and enhance haze and limit clarification and the formation of a compact floc. Therefore the make-up of the finings agent is important.

The finings agent dispersion should be assisted by good agitation. The formation of stable pectin-colloids in beer can be avoided by the appropriate choice of pectin, and by the use of agents in the dosing solution which limit reactivity during dispersion, such as for example, the inclusion of chelating or sequestering agents.

Floc formation may also be promoted by targeting the redox state of the beer proteins (e.g. by sulphitolysis).

Without wishing to be bound by theory the inventors propose that the progress of fining action may be summarised as follows (referring to FIG. 1)

i. The mechanism is explained by (a) the interaction of pectin with cations such as $Mg^{2+}$ and $Ca^{2+}$ which are found at levels of 100 and 50 ppm respectively in beer; (b) the binding of basic proteins, polyphenols and protein-polyphenol complexes to negatively charged pectins; (c) the equilibrium between pectin gels and insoluble pectin precipitates.

ii. Pectin binds $Ca^{2+}$ ions and other divalent cations; this association is slow enough to allow dispersion of pectin in the beer matrix. $M^{2+}$ binding (divalent cations) favours gel formation through the binding of, for example, $Ca^{2+}$ ions by aligned polygalacturonic acid ribbons that leads to cross linking and gel formation. Other charged groups such as positively charged proteins (basic proteins) compete for negative sites on pectin. Beer proteins bind cations such as $Zn^{2+}$, $Fe^{2+}$, $Cu^{2+}$ and which may be stabilised by thiol groups. Polyphenols are also bound to some proteins in beer. Polyphenols may also remain in beer in polymerised or monomeric forms. Existing aggregates of two or more of these components may be involved in targeting and binding charged sites and specific structural sites in/on the pectins.

iii. Pectin is decorated with protein, polyphenols and $Ca^{2+}$, $M^{2+}$. The decoration favours precipitation of the complexes. Colloids continue to be decorated and particles aggregate together to form flocs. Syneresis accelerates and a compact sediment forms.

iv. Pectins with appropriate $Ca^{2+}$ reactivity will result in both clarification of the beer and compaction of the sediment. At least for the low methoxy pectins the finings efficiency will depend on tuning the level of the pectin and beer divalent cations.

The pectins used in the formulations and methods of the present invention may be commercially available and obtained "off the shelf" or prepared by the conventional processes of de-esterification or amidation of naturally occurring pectins, e.g. fruit pectins such as apple or citrus pectins, or root or tuber pectins such as beet, carrot or potato pectins, or sunflower pectins.

Commercially available pectins are termed "standardised pectins". These often contain about 20-50% sugars. Pectins without any added sugar are referred to as "active pectins". When referred to herein, the concentration of pectin in a finings agent, unless otherwise noted, refers to the concentration of standardised pectins, i.e. including any sugars.

The term "finings agent" refers to any material that is used to clear a ferment (clarification) by promoting aggregation and compact settling (compact/coherent settling).

The term "fining process" refers to any process that uses a finings agent to clear a ferment (clarification) by promoting aggregation and compact settling (compact/coherent settling).

Clarification (or clarifying) as referred to herein refers to the clearing of a ferment. A beverage that is clarified is judged, by observation or measurement, by one or several or all of the criteria: an increase in visual transparency, an increase in light transmittance, a decrease in turbidity or light scattering, a reduction in particle number, an improvement in the filterability of the clarified beverage through a membrane of restricted porosity.

Effective fining activity is defined herein as fining activity comparable to the finings performance of Isinglass in beer. In sedimentation tests, as described in the examples, addition of Isinglass to pre-fined beer reduced the absorbance at 500 nm wavelength from 1.322 to 0.31, e.g. by over a factor of 4.

In Examples 7 to 19 the benchmark is a bovine collagen dispersion. We have found bovine collagen to have comparable and in general better, finings activity than Isinglass in high and ultra high gravity beers.

When the amount of a component is expressed as a percentage it shall be appreciated that all the amounts of the components add up to 100%.

Any reference herein to wt/v or w/v refers to a weight for volume relationship, i.e. x % wt/v refers to x g of solid formulation in 100 ml of liquid.

Any reference herein to wt/wt or w/w refers to a weight for weight relationship, i.e. x % wt/wt refers to x g of solid formulation in 100 g of the solid formulation.

Generally when expressed herein the % solution refers to the amount of pectin in the solution and not the other components. For example a 5% pectin solution will have 5 g of pectin in 100 ml. Other components may be present.

Although all three types of pectin have some capacity to clarify beer, some are more effective than others. Whilst not wishing to be bound by theory, the inventors propose that the overall charge density is an important factor.

In the formulation according to the first aspect of the invention or the methods or uses of the second and third aspects of the invention preferred finings agents are high methyl ester pectins with a DE of 50-70%, preferably, 50-65% and most preferably between 50-60%, low methyl ester pectins with a DE of greater than or equal to 20%, preferably 30-50%, more preferably 35-45%, most preferably 40% and amidated low methyl ester pectins with a DE of 20-40%, preferably 30-37% and a degree of amidation (DA) of 10-25%, preferably 14-18%.

Examples of pectins that can be used as finings agents in accordance with the present invention, which can be obtained off the shelf are CP Kelco LMA pectin, type 101 and Herbstreith and Fox Gmb LMC pectin type AF702. Other examples are provided in Table 1. The finings formulation may comprise a combination of one or more pectins.

In the formulation according to the first aspect of the invention the pectin is provided with a donor of sulphur dioxide.

The donor of sulphur dioxide is preferably potassium metabisulphite or sodium metabisulphite. This agent enhances the finings effect whist avoiding contamination.

The finings formulation preferably further comprises a buffering agent. This buffering agent must be capable of maintaining the pH of the finings formulation, when in solution, to an optimum pH for the activity, stability and solubility of the pectin. For a finings formulation for use in beers the optimum pH for pectin activity, solubility and stability is between pH 4 and 5, preferably between pH 4.5 and 5 and most preferably about pH 4.7 or 4.8. For use in other beverages the optimum pH of the finings formulation may be different. A person skilled in the art should be able to determine the optimal pH for the formulation for use in a particular beverage without undue experimentation.

For beer the preferred pH of the finings formulation is between pH 4 and pH 5. A suitable agent for buffering at this pH is citrate buffer, which should buffer any solution at around pH 4.8. Other buffers may be used in place of citrate and suitable buffers can be readily determined by those skilled in the art. The advantage of using citrate as a buffer is that it is capable of binding calcium ions. Solubility of the pectins increases as pH increases.

Other suitable buffers include acetate, lactate, phosphate, malate, succinate and propionate buffers.

The formulation of the first aspect of the invention may further comprise a sequestering (or chelating) agent. The purpose of this agent is to combine with any divalent ions which may influence the finings activity of the pectin. The sequestering agent preferably chelates calcium, magnesium, iron and, or copper ions.

Preferred sequestering agents are tri-sodium citrate, citric acid or a combination of both. Other suitable sequestering agents include phosphate, polyphosphates, products based on amino/carboxylate functionality, products based on carboxy functionality or carboxylic acid chemistry, compounds based on polyphenol activity such as tannic acid, catechins and the like.

If the buffering agent is citrate it will also have activity in sequestering ions.

Based on the initial concentration of proteins, polyphenols, metal ions, and carbohydrates in the beverage, some additives which are able to increase finings effect (rates of clarification, and reduction in residual fining components in the final product), may be added to the finings formulation or during the fining process:

a. Tannic acids at the final concentration of 10-50 ppm, preferably 30-50 ppm;
b. Hop extracts by 30-50% ethanol or acidic water [(pH 1.8-2.0) at 0.1-0.5% (v/v) of total volume], or commercial hop extracts, such as Carlton United Breweries Ltd HP6, hop extract or like isomerised or reduced hop extracts;
c. Some basic proteins, such as cytochrome C or like basic beer/cereal proteins (e.g. 5-20 ppm) but not excluding other proteins from other sources.

The structure and molecular weight of pectins (normally 50,000-150,000) affects pectin finings activity; low molecular weight pectins are generally less favourable than high MW proteins.

For use in a finings process the finings formulation according to the first aspect of the invention is preferably made into a stock solution in water. The preferred amount of pectin in the stock solution is in the range of 1-10%. Above 10% the pectin is not generally soluble.

Best solubility is achieved at a stock solution concentration towards the low end of the range, i.e. at 1%, as at this concentration the pectin is able to disperse well and mix with the beverage that it is to act on. Concentrated pectin is more convenient for shipping and storing and for end users. However at higher concentrations the may pectin come out of solution over time and there appears to be a reduction in finings activity. Additionally, for higher pectin concentrations there is a greater propensity for the pectin to aggregate or gel rather than disperse evenly in the beverage. Accordingly a stock solution of 4-8.5% is preferred, with a stock solution of 5, 5.5 or 6% pectin being most preferred.

Whilst higher temperature increases pectin solubility and reduces viscosity it brings with it increased likelihood of pectin deactivation.

A preferred fining formulation according to the first aspect of the invention comprises 25-91% (w/w) pectin, 5.5-50% (w/w) citrate and about 3.5-25% a donor of sulphur dioxide (w/w). The amounts refer to the composition of a solid formulation, i.e. dry weight. The preferred ratio of pectin to donor of sulphur dioxide is 3.5-7.5:1, more preferably 5:1.

The finings formulation is preferably provided as an aqueous solution. A preferred fining formulation in aqueous solution with water comprises is 5.5% (w/v) pectin, 1.5% (w/v) sodium citrate, 0.5% (w/v) citric acid, 1.0% (w/v) potassium metabisulphite.

In accordance with the present invention in the second or third aspects, preferably the concentration of pectin used as a finings agent is at least 10 ppm (parts per million) final concentration of the fluid volume of the beverage. Effective fining activity may be achieved with a concentration of pectin of between 10 and 300 ppm of the total fluid volume of the beverage.

The amount of finings agent used to provide effective fining activity depends on the type of pectin used, high methyl ester, low methyl ester or amidated low methyl ester pectin. The preferred concentration of pectin in the total fluid volume of the beverage product to give effective fining activity is 10, 20, 30, 40, 50, 60, 70, 80, 90, 100, 110, 120, 130, 140, 150, 160, 170, 180, 190, 200, 210, 220, 230, 240, 250, 260, 270, 280, 290, 300 ppm. This equates to an amount of pectin in the final beverage to be fined of 0.001 to 0.03% (w/v). Preferably the concentration of pectin used in the beverage is in the range of 40 to 80 ppm, i.e. an amount of 0.005 to 0.008 (w/v).

The use and method according to the second and third aspects of the invention relate to standard fining processes, as would be carried out with known finings agents.

Preferably the fining method comprises making an 1-10% aqueous solution of pectins, adding an amount of the solution to a post separation beer to obtain a concentration of pectins of about 10 to 300 ppm, preferably 40-80 ppm, processing beer finings for 12-168 hours and then filtering. A good finings agent will have a comparable filterability rate to Isinglass or bovine collagen.

The present invention finds its major utility in fining alcoholic beverages, particularly those that are fermented such as beers, lagers, ales, cider, perry and wine. It may also find utility in alcopops and alcoholic fruit mixes.

Using pectin as a finings agent is proposed to have little or no adverse effect on the beverage to which it is added. It is proposed that the beverage has the same mouth feel, taste etc as the same beverage when fined with Isinglass or bovine collagen.

Description of the Preferred Fining Process

In a preferred finings process, a dry finings agent (mixture) comprising a mixture containing 25-91% (w/w) pectins, about 5.5-50% (w/w) citrate and about 3.5-25% (w/w) a donor of sulphur dioxide, preferably potassium metabisulphite or sodium metabisulphite is prepared by dry blending. The mixture is then slowly added to water at room temperature with preferably continuous mixing until the solids are completely solubilized. This process can be enhanced using a recirculation pump, an homogeniser, or an eductor, and no doubt other variations and mechanical devices. The pectin concentration of the fining solution can be as high as 5-10% (w/v) depending on the type and nature of the pectin and the temperature. The dry finings mixture may be stored for several months at 4° C. in an air-tight container. The liquid finings preparation is stable microbiologically and in fining activity for several weeks.

The finings agent is mixed with beer usually after centrifuging to reduce the yeast contents, to obtain a concentration of about 20-200 ppm of standardised pectin, preferably 40-80 ppm for most tested beers. Yeast levels are generally of the order of $10^6$-$10^7$ cells/ml. Preferred final concentrations for citrate and sulphur dioxide in the beer are 5-20 ppm and 5-8 ppm respectively. Some additives such as tannic acid, basic proteins or hop extracts may be added at this time to increase finings effect. The effect of these additives will depend to some degree on the nature of the beer.

The beer should be stored, preferably at about 4° C. for at least 12, if not 24 hrs to 168 hrs before final filtration.

For the purposes of this specification it will be clearly understood that the word "comprising" means "including but not limited to", and that the word "comprises" has a corresponding meaning.

It will be apparent to the person skilled in the art that while the invention has been described in some detail for the purposes of clarity and understanding, various modifications and alterations to the embodiments and methods described herein may be made without departing from the scope of the inventive concept disclosed in this specification.

The invention will now be described in detail by way of reference only to the following non-limiting examples and drawings.

BRIEF DESCRIPTION OF THE FIGURES

FIG. 3 shows reverse phase HPLC profiles of soluble proteins at 280 nm.

FIG. 4 shows SDS-PAGE of beer fractions with different treatments.

FIG. 7 shows separation of proteins in Isinglass floc and top by 2-D electrophoresis.

EXAMPLES

Method for Pectin Digestion

Pectin solution [1% HM121 (100 ml)] was digested by adding pectinase (from *Rhizopus* sp. Sigma, EC 3.2.1.15) (2 U, 5 U, 10 U, 20 U and 50 U). The solution was at first incubated at 25° C. for 1 hour and subsequently for 10 min at 80° C. to deactivate the enzyme. After cooling to 20° C., the finings activity of the treated pectin solution was tested.

Method for Pectin Washing

The aim of the washing was to remove any blended sugar and metallic ions from the standardised pectin samples.

Pectin, for instance HM121 (50 g) was washed with 60% ethanol with continuous stirring (magnetic stirrer or mixer, 400 mL×0.5-1 h; 300 mL×0.5-1 h; 300 mL×0.5-1 h). The treated pectin was recovered by centrifuging (1,000-4,000 g for 5-20 minutes). The pectin was dehydrated by resuspension in absolute ethanol (200 mL for 10 min). The pectin was recovered by filtration (Whatman No. 541 filter). The pectin was air dried, followed by drying in a conventional oven (with ventilation) at 50-55° C.

Clarification of Beer

All clarification tests were conducted at 4° C. using post-separation (unfined) beer. Fining agent was added to 1 L beer in a 2 L Schott bottle to provide for mixing, and subsequently transferred to a glass cylinder and allowed to settle for up to 168 hrs. At various times thereafter, 30 ml aliquots of beer were collected by sampling at 10 cm from the top of cylinder. Beer turbidity, measured in EBC units (European Brewery Convention) were obtained using a Laboratory Turbidimeter (Hach, 2100AN). Both a negative (no finings agent) and a positive control (0.02% w/v bovine collagen) were carried out. Bovine collagen is used as a benchmark as well as Isinglass. The bovine collagen is provided as a 2% w/v protein solution. This material gave at least comparable and in general better finings performance as judged by clarification and compactness of flocs than commercial Isinglass preparations with the same beer streams, in our experience, as a laboratory reference tool and in regular commercial usage.

A System for Filterability Test.

Figure 1:
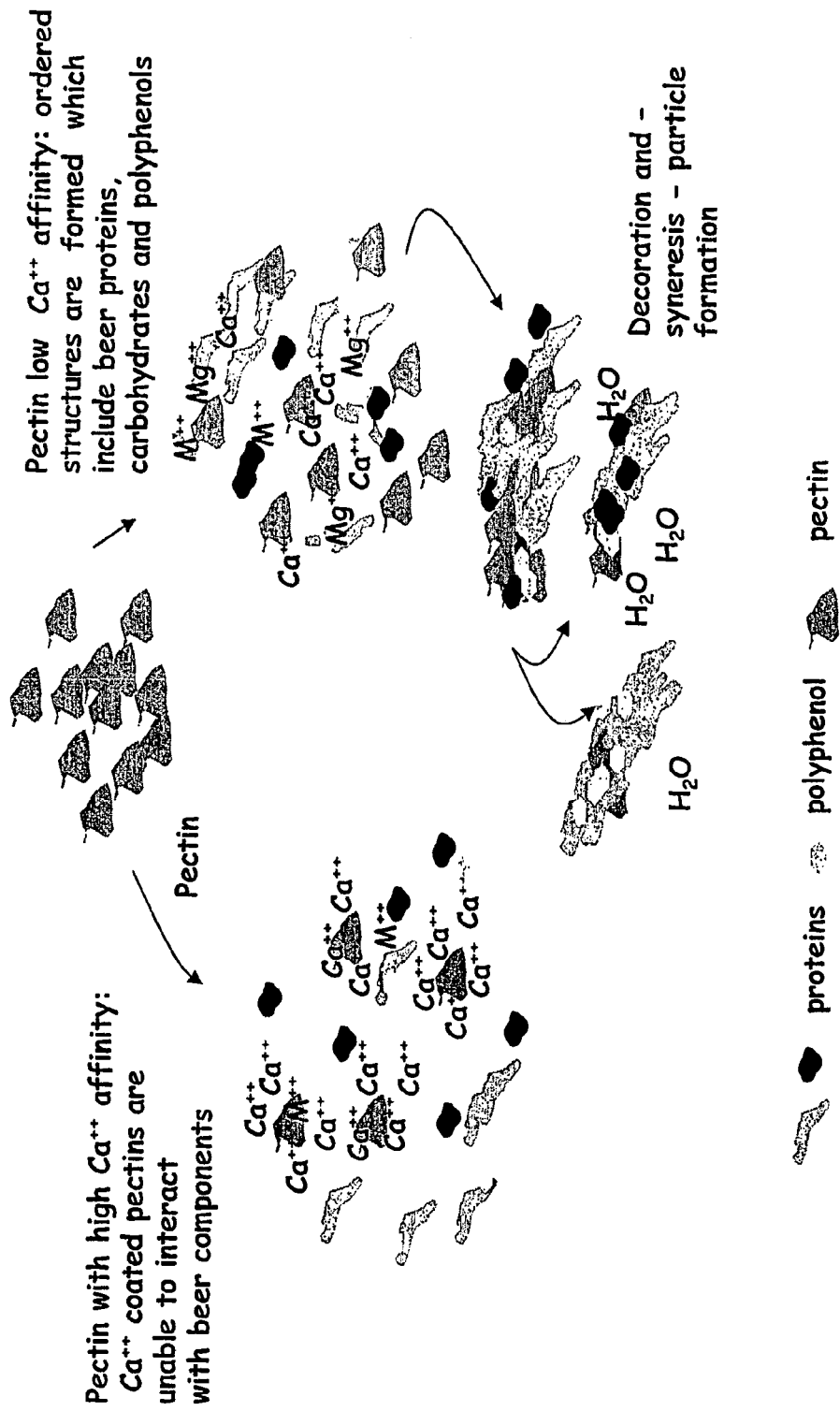
FIG. 1 shows a diagrammatic representation of the proposed mechanism of finings action by pectins.
Figure 2:
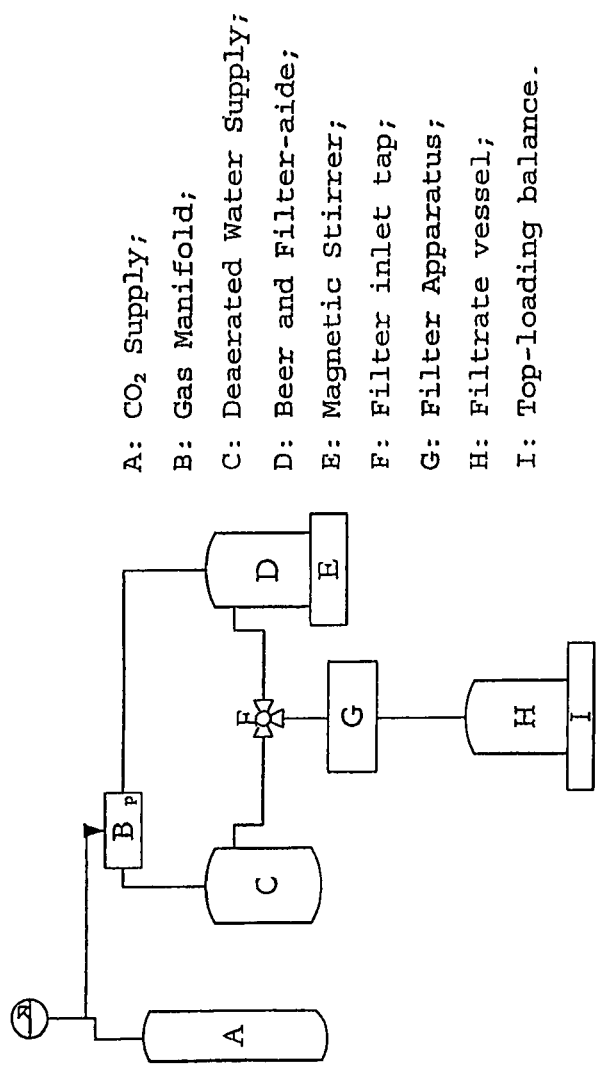
FIG. 2 is a schematic diagram of a filtration system.

The filtration apparatus is a 'dead end' Millipore Model YT 30 140HW with a fixed internal volume and filtration area (FIG. 2). The filter is prepared by placing two glass fibre pre-filters onto the filter support screen and wetted. The endplates are clamped on, after which a slurry of precoat (Freshwater Speedflow) at a rate of $0.115$ g/cm$^2$ is added using distilled water to fill the apparatus. The precoat was 'bedded in' by passing de-aerated water at 100 kPa through the apparatus until there was a clear layer of liquid above the precoat. The apparatus is subsequentially switched to beer, which is passed through at 100 kpa pressure. The filtrate is collected in another 9 L keg placed on top of a top-loading balance. Weight measurements are collected every 10 seconds for 10 or 15 minutes via a connection from the balance to a PC where it is interpreted by an excel spreadsheet.

Statistics:

Clarity improvement ($C_i$): Definition of beer clarity improvement is the difference of turbidity between tested sample and the control by the time against actual turbidity of the control.

$$C_i = \frac{[\text{Turbidity of the control } (EBC) - \text{tested sample } (EBC)]}{\text{Turbidity of the control } (EBC)} \times 100\%$$

General Material Information

The range of pectins included in this study are summarised in Table 1. Sugar concentration in pectins was analysed by HPLC with a RI detector. Total sugar may account for 1-40% (w/w). The level of esterification (DE) of conventional pectins is around 20-70%, split between low methyl ester pectins with a DE greater than or equal to 20%, preferably 30-50%, more preferably 35-45% and high methyl ester pectins with a DE of 50-70%, preferably 50-60%. For amidated pectins, DE is about 20-40%, preferably 30-37% and DA is in the range of 10-25%, preferably 14-18%.

The types of beer used in the finings trials are summarised in Table 2. The initial gravity of high gravity beer (HG) is around 13.5-14.2° P (Plato) and for ultra high gravity beer (UHG) it is about 18° P. Turbidity values or else a range of turbidity is provided depending on whether a single batch or multiple batches of beer have been analysed.

In Table 2:

Malt charge=% of extract in wort that comes from the malt (based on malt gives 73% by mass of sugar extract);

Kettle hops=hops is added to the kettle when the wort is boiled;

Kettle finings=addition of kettle finings (carageenans usually) to the wort during the kettle boil;

Yeast=yeast strain—industrial yeast;

Initial turbidity=turbidity of the beer after passage through the centrifuges after chill back of the fermented; and $Ca^{2+}=Ca^{2+}$ in the post centrifuge beer.

Other terms used in the brew house are described as follows:

Mash tun—extraction of sugars→Lauter tun separation of extract→Whirlpool, separation of trub→kettle boil removal of protein, lipid, polyphenols, assisted in some cases by the addition of kettle finings and addition sometimes of hops→fermentation→chill back of beer in fermenters→separators—removal of most yeast→post filter addition of FININGS→Storage of beer→filtration→dilution to sales strength beer, addition of hop extract sometimes—packaging.

Example 1

Characterisation of Particles

Although Isinglass is used as a filtration aid in the brewing industry very little is known about the way it works. Knowledge of the chemical composition and the physical nature of the material that is settled by the action of Isinglass will contribute to a better understanding of its mechanism of action. This in turn will assist in designing suitable alternatives for the industry. The chemical composition of beer material, with and without Isinglass treatment, was determined with respect to carbohydrate, protein, fatty acid and phenolic content.

Sample Preparation

Samples were taken from the top and floc of treated and untreated beer (see Isinglass Alternative Screen, Materials and Methods for details).

Unless otherwise stated, untreated beer, Isinglass-treated beer and Isinglass samples were dialysed (10,000 MW cutoff) against Milli-Q water and freeze-dried before analysis. Freeze-dried Isinglass floc was not completely soluble in water.

Carbohydrate Analysis

Colorimetric Assays

Total carbohydrate was determined by the calorimetric assay of Dubois (1956) with glucose as the standard.

Uronic acid content was estimated by the method of Filisetti-Cozzi and Carpita (1991) with galacturonic acid as the standard.

Monosaccharide Analysis

Monosaccharide and monosaccharide-linkage composition was determined by methylation analysis as described by Ciucanu and Kerek (1984) and modified by McConville et al (1990). Derivatised sugars were injected onto a CPSIL 5 column at 250° C., with helium as the carrier gas at 0.8 ml/min, and eluted with an oven temperature profile of 110° C. to 320° C. at 3° C./min. Spectra were collected for the mass range of 100 to 400 m/z.

Protein Analysis

Colorimetric Assay

Soluble protein was estimated with the BioRad protein assay reagent according to the manufacturers instructions. BSA was used as the standard.

Total Protein Analysis

Total protein was estimated from nitrogen analysis. Nitrogen and carbon were analysed using a Carlos Erba NA 1500 Series 2 NCS Analyzer and AS-200 Autosampler (Fisons Instruments, Milan, Italy).

Amino Acid Analysis

Samples were hydrolysed in 6M HCl at 110° C. for 16 hours for amino acid analysis. Amino acids were derivatised according to Persson and Nasholm (2001) and analysed on a GC-MS by injection at 270° C. onto a CPSIL5 column with an oven temperature profile of 130° C. to 290 C at 10° C./min. Spectra were collected for the mass range of 50 to 550 m/z.

SDS-Page

Aliquots (non-dialysed) of 1 ml treated or untreated beer and 0.1 ml flocculated material, were centrifuged (13,000×g, 15 min, RT) to isolate the insoluble pellet fraction. The supernatant was transferred to a new tube and concentrated under vacuum. All samples were suspended in SDS loading buffer and run on 4-20% pre-cast polyacrylamide gels (Laemmli, 1970). Gels were stained with GelCode Reagent as per manufacturer's instructions.

Isoelectric Focusing Gel

Isoelectric focusing was conducted on a Pharmacia IEF (3-9) phastgel. A broad range pI calibration kit (pI 3-10)

provided standards. Non-dialysed samples were concentrated under vacuum and loaded in urea sample buffer (9M Urea, 35 mM Tris-Base, 4% CHAPS, 1% w/v DTT, 1% ampholytes pH 3-9). Gels were fixed then stained with Coomassie Blue and destained in 40% methanol, 10% acetic acid.

RP-HPLC

Aliquots (non-dialysed) of 1 ml treated or untreated beer and 0.1 ml flocculated material, were centrifuged (13,000×g, 15 min, RT) to separate the insoluble (pellet) from the soluble (supernatant) fraction. Pellets were resuspended in MQ water. Samples were incubated at 50° C. for 1 h and centrifuged, as above, to separate insoluble and heat soluble material. Reverse-phase HPLC of soluble proteins was performed on a C8 (RP300) HPLC column and eluted with a linear gradient of 0.1% TFA to 80% acetonitrile, 0.0895% TFA. Protein elution was monitored by absorbance at 280 nm with a UV detector.

Phenolic Analysis

Colorimetric Assay

Soluble phenolics were estimated with the Folin-Ciocalteu's reagent using ferulic acid as a standard (Fry, 1988).

GC-MS of Ester-Linked Phenolics

Ester-linked phenolic acids were released by treatment of sample with 2M NaOH. The samples were acidified and the phenolic acids extracted into ethyl acetate. Extracts were sialylated with TriSil and analysed by GCMS on a CPSIL5 column. The sample was injected at 240° C. and eluted with a temperature gradient from 110 to 320° C. at 6° C./min.

Fatty Acid Analysis

Lipids and fatty acids were extracted into chloroform:methanol (2:1) then treated with methanolic-HCl (0.5M) at 80° C. for 16 h. The fatty acid methyl-esters were sialylated with MSTFA according to manufacturers instructions and analysed by GC-MS on a CPSIL 5 column. Samples were injected at 240° C. and eluted with an oven temperature gradient from 80° C. to 245° C. at 5° C./min. Spectra were collected in scan mode from 40 to 800 m/z.

Elemental Composition

The ash content of non-dialysed samples was determined from the weight of sample residue after heating at 600° C. Elemental composition was determined by ICP-OES.

Electrophoretic Mobility Measurements

Samples of Isinglass, untreated beer, and Isinglass floc were tested for zeta potential on a Zeta PALS Zeta Potential Analyzer (Brookhaven Instruments Corp.).

Results and Discussion

Polysaccharide Analysis

The carbohydrate contents of the dialysed beer samples range from 56% to 100% (Table 3.1—Carbohydrate content (% (w/w)) dried beer)). Untreated beer contains 94% carbohydrate while in the settled beer tops, Isinglass treated and untreated, the colorimetric assay estimates that 100% of the material recovered after dialysis (>10,000 Da) is carbohydrate. The least amount of carbohydrate is found in the Isinglass floc (56%). The levels of uronic acids, as estimated by the colorimetric assay, are negligible.

TABLE 3.1

| Sample | % Total CHO | % Uronics |
|---|---|---|
| Untreated beer | 94 | <0.01 |
| Settled beer top | 101 | <0.01 |
| settled beer floc* | 96 | <0.01 |
| Isinglass top | 102 | <0.01 |
| Isinglass floc | 56 | <0.01 |

*Settled beer floc also contains unsettled beer due to the limited availability of material Monosaccharide linkage composition gives an indication of the types of polysaccharide present in a sample. The monosaccharide composition of all the beer samples tested is similar (Table 3.2—Monosaccharide linkage composition (mol %)), with glucose the predominant sugar constituent, along with smaller amounts of xylose and arabinose. Although not shown in Table 3.2, trace amounts of mannose and galactose were also present.

The glucose exists as 4-linked, terminal and 4,6-linked residues, all of which are typical of the linkages found in starches or maltodextrins. The presence of xylose as 4-Xyl and 2,3,4-Xyl, along with t-Ara, is indicative of an arabinoxylan component.

TABLE 3.2

| Glycosyl Residue | Deduced Linkage | Untreated Beer | Settled Beer Top | Settled Beer Floc* | Isinglass Top | Isinglass Floc |
|---|---|---|---|---|---|---|
| Ara (f) | t— | 6 | 5 | 5 | 5 | 6 |
|  | 3— | Tr | — | — | — | tr |
|  | 5— | Tr | tr | tr | tr | tr |
|  |  | 6 | 5 | 5 | 5 | 6 |
| Xyl (p) | t— | Tr | tr | tr | tr | tr |
|  | 2— | Tr | tr | tr | tr | tr |
|  | 4— | 4 | 3 | 4 | 4 | 4 |
|  | 2, 4— | Tr | tr | 1 | 1 | 1 |
|  | 3, 4— | Tr | tr | tr | tr | tr |
|  | 2, 3, 4 | 2 | 2 | 2 | 2 | 2 |
|  |  | 7 | 6 | 8 | 7 | 7 |
| Glc (p) | t— | 19 | 18 | 18 | 18 | 19 |
|  | 3— | Tr | tr | tr | tr | tr |
|  | 4— | 62 | 63 | 60 | 60 | 61 |
|  | 2, 4— | — | — | tr | tr | — |
|  | 3, 4— | — | tr | tr | tr | tr |
|  | 4, 6— | 6 | 6 | 7 | 8 | 5 |
|  | Glucitol | Tr | tr | tr | 1 | tr |
|  |  | 87 | 88 | 86 | 87 | 86 |

*Settled beer floc also contains unsettled beer due to the limited availability of material
tr, trace <1%;
—, not detected.

Protein Analysis

The calorimetric assay for protein (Table 4.1—Protein content (% (w/w)) estimated by the Biorad Protein Assay) suggests that the untreated beer and the settled beer tops (treated and untreated) contain approximately 3% (w/w) protein after dialysis. The Isinglass-treated floc contains considerably more protein (10%). These levels are likely to be underestimated since the assay depends on soluble protein. The beer samples all contain an insoluble component.

It is possible to estimate total protein content (soluble and insoluble) from the nitrogen levels in a sample. Based on nitrogen analysis, the Isinglass top contains 12.6% protein and the floc, 38.2% protein (Table 4.2—Protein content based on nitrogen analysis (% (w/w)).

TABLE 4.1

| Sample | % Soluble Protein |
| --- | --- |
| Untreated beer | 2.9 |
| Settled beer top | 3.3 |
| Settled beer floc* | 3.1 |
| Isinglass top | 2.9 |
| Isinglass-fined floc | 10.0 |

*Settled beer floc also contains unsettled beer due to the limited availability of material

TABLE 4.2

| Sample | % Nitrogen | % Carbon | % Protein (N × 6.25) |
| --- | --- | --- | --- |
| Isinglass-fined top | 2.02 | 42.76 | 12.6 |
| Isinglass-fined floc | 6.11 | 45.21 | 38.2 |

TABLE 2.3

| | Amino Acid (mol %) | | |
| --- | --- | --- | --- |
| Amino Acid | Isinglass | Untreated Beer | Isinglass Floc |
| Ala | 9 | 10 | 8 |
| Gly | 17 | 6 | 7 |
| Val | 3 | 5 | 5 |
| Leu | 5 | 4 | 5 |
| Ile | 2 | 2 | 3 |
| Pro | 7 | 23 | 13 |
| GABA | Tr | tr | tr |
| Cle | Tr | tr | tr |
| Met | 1 | 1 | 1 |
| Ser | 3 | 4 | 4 |
| Thr | 3 | 2 | 2 |
| Phe | 2 | 2 | 3 |
| Asx | 5 | 7 | 7 |
| Hyp | 30 | 1 | 4 |
| Cys | Nd | 2 | 8 |
| Glx | 7 | 27 | 22 |
| Lys | 1 | 2 | 0 |
| Arg | 4 | 2 | 2 |
| His | 1 | 0 | 1 |
| Tyr | 1 | 1 | 2 |
| Cys2 | Nd | nd | 2 |

Amino acid analysis of untreated beer, Isinglass floc and Isinglass alone is presented in Table 4.3 (Amino Acid Analysis (tr, trace <1%; nd, not detected). Isinglass is rich in glycine and hydroxyproline, which is reflected in the amino acid analysis. Hydroxylysine is also expected to be found in Isinglass but was not detected in this analysis. The amino acid composition of untreated beer and the Isinglass floc is similar except that the Isinglass floc contains less proline and more cysteine and hydroxyproline.

Figure 3A:
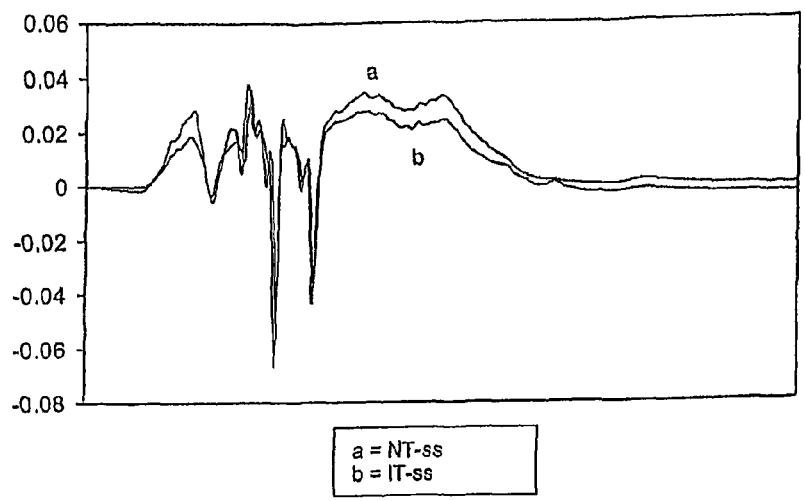
FIG. 3a shows proteins in beer tops from a cold soluble fraction.
Figure 3B:
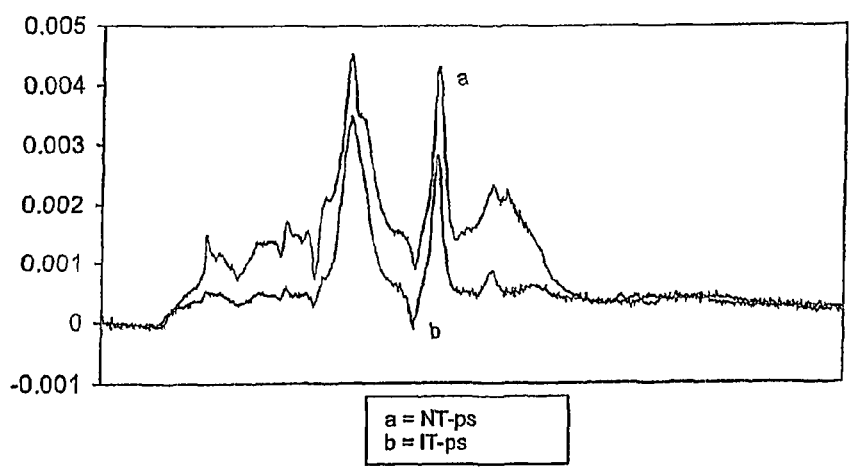
FIG. 3b shows proteins in post-finings clarified beer from a hot soluble fraction and FIG. 3c shows proteins in beer flocs from a hot soluble fraction.
Figure 3C:
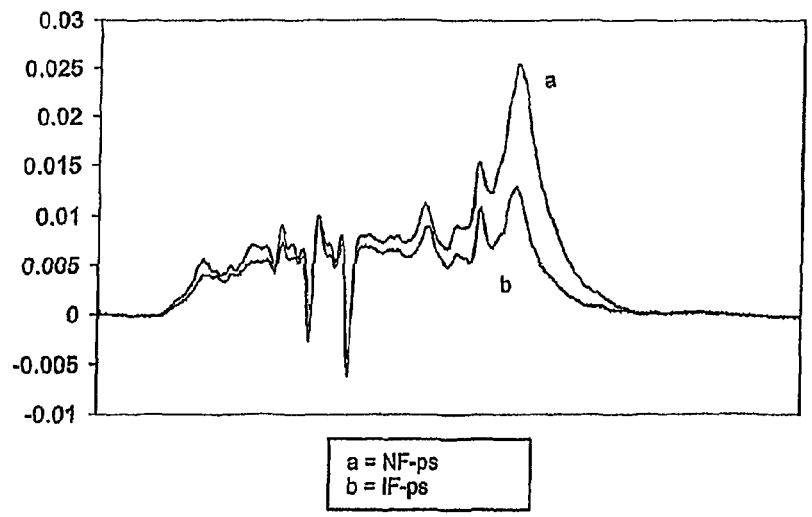

Reverse-phase HPLC can be used to look for overall differences in the profile (absorbance at 280 nm) of soluble proteins in different samples. The profiles of beer samples from different fractions are shown in FIG. 3. These include proteins from beer tops that are soluble at room temperature (FIG. 3a), room temperature insoluble proteins from the tops that are solubilised by heating at 50° C. for 1 h (FIG. 3b), and proteins from the floc that are soluble after heating (FIG. 3c).

The profiles of cold-soluble proteins from the settled beer tops (FIG. 3a) are very similar for untreated beer (NT-ss) and Isinglass treated beer (IT-ss). In the case of the top beer proteins solubilised by heating (FIG. 3b), the untreated sample (NT-ps) appears to have more protein components than the Isinglass treated sample (IT-ps). The protein components in the heat-solubilised beer flocs (FIG. 3c) are similar for untreated (NF-ps) and treated (IF-ps) samples. The variation in the peak heights of some components may be the result of sample preparation as it is difficult to obtain untreated floc material without including unsettled beer material.

SDS-PAGE under denaturing conditions can be used to look at differences in soluble and insoluble proteins of different sizes. FIG. 4 shows SDS-PAGE of proteins in different fractions of treated and untreated beer. In the settled tops, treatment removes the insoluble proteins (top pellets) while most of the soluble proteins remain (top supernatant). Comparison of the proteins in the floc (supernatant and pellet) suggests that there is little difference in the proteins present with and without Isinglass treatment. The band just below the 181.8 kDa marker originates from the Isinglass, not the beer.

Figure 5:
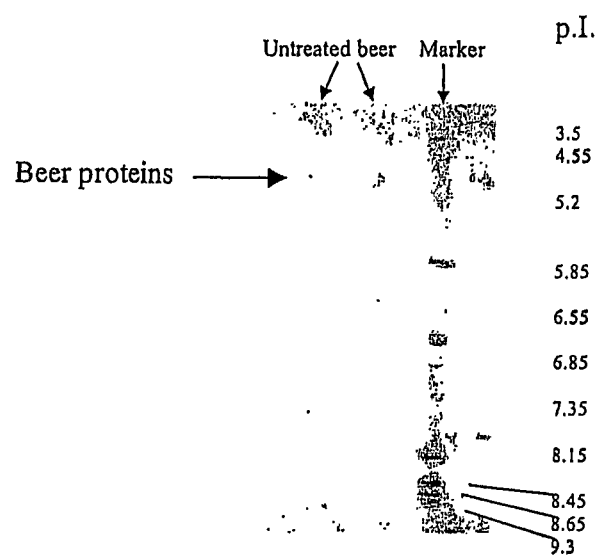
FIG. 5 shows an isoelectric focussing gel.

When beer proteins are run on an IEF gel, not all proteins enter the gel due to their insoluble nature. The majority of proteins that do enter the gel run at isoelectric points between 4.55 and 5.2 (FIG. 5).

Fatty Acid Analysis

The beer samples tested (untreated beer, Isinglass floc and untreated floc) contain some fatty acids. These include myristic, pentadecanoic, palmitic, margaric (heptadecanoic) and stearic acids in the untreated beer and Isinglass floc; and palmitic, linoleic, 10-octadecanoic and stearic acids in the untreated floc. The quantitative analysis of these fatty acids is currently underway.

Phenolics

The level of total soluble phenolics in Isinglass treated and untreated beer was estimated by a colorimetric assay. Based on this assay, untreated beer, settled beer tops and settled beer flocs all contain approximately 4% phenolics (Table 5.1—Phenolic content of beer samples (% (w/w) and Table 5.2—Phenolic ester composition). The Isinglass floc had a higher level of phenolics at 9.6%, although some of this could be due to the elevated protein content.

Carbohydrate analysis suggested the presence of arabinoxylan in the beer samples. Phenolic acids are known to associate with this polysaccharide in barley, and to test whether or not there is a difference in phenolic acid content for Isinglass treated samples compared to untreated beer, the ester-linked phenolics were measured. The overall levels of ester-linked phenolics in the dialysed samples are low, with untreated beer containing the most at 1.4 ppm, followed by the Isinglass floc and the settled beer floc. Ferulic acid is the most abundant phenolic acid in all samples, while o-coumaric acid appears only in the untreated beer. Cinnamic acid appears in both flocs, but p-coumaric and syringic acids are only found in the Isinglass floc.

TABLE 5.1

| Sample | Phenolics |
| --- | --- |
| untreated beer | 3.9 |
| settled beer top | 4.1 |
| settled beer floc* | 4.2 |
| Isinglass-fined top | 3.8 |
| Isinglass-fined floc | 9.6 |

*Settled beer floc also contains unsettled beer due to the limited availability of material

TABLE 5.2

| Phenolic acid | Untreated beer (mol %) | Isinglass floc (mol %) | Settled beer floc (mol %) |
| --- | --- | --- | --- |
| Cinnamic | nd | 6 | 15 |
| o-coumaric | 28 | nd | nd |
| Syringic | nd | 7 | nd |
| p-coumaric | nd | 4 | nd |
| Ferulic | 72 | 83 | 85 |
| Total (ppm) | 1.4 | 1.0 | 0.7 | nd, not detected.

Elemental Composition

Untreated beer and Isinglass floc were collected and dried for elemental analysis. The results (Table 5.3) suggest that there is an increase in calcium, iron, copper and aluminium in the floc. The floc also contains more ash than the untreated beer.

TABLE 5.3

| Element | Untreated Beer (ppm) | Isinglass Floc (ppm) |
| --- | --- | --- |
| Calcium | 942 | 2160 |
| Magnesium | 1260 | 955 |
| Potassium | 3490 | 3760 |
| Sodium | 4800 | 2290 |
| Iron | 2 | 15 |
| Phosphorous | 2650 | 2250 |
| Copper | 1 | 16 |
| Zinc | <0.1 | 1 |
| Manganese | 1 | 0.3 |
| Aluminium | 6 | 16 |
| % Mineral ash (w/w) | 0.03 | 2.09 |

Colloidal Property Analysis

Electrophoretic mobility and zeta potential measurements (Table 6) show that Isinglass is positively charged and the particles in beer are negatively charged. In general particles with zeta potentials of >30 mV (positive or negative) are electrophoretically stable. The low zeta potential values of the beer and floc particles are indicative of unstable systems, which are more likely to aggregate.

TABLE 6

| | Mobility | Zeta Potential (mV) |
| --- | --- | --- |
| Untreated beer | −0.26 | −3.36 |
| Isinglass alone | 1.69 | 21.61 |
| Isinglass floc | −0.39 | −5.05 |

Conclusion

The floc from Isinglass treated beer contains more protein, phenolics and cations than untreated beer but has similar charge characteristics. The dialysed Isinglass floc is composed of polysaccharide (56%), protein (38%) and phenolics (9.6%). Some fatty acids were also identified. The polysaccharides present are mostly starch-based (malto-dextrins) but also include arabinoxylan. The proteins are rich in glutamine/glutamate and proline and contain more cysteine than those in untreated beer. They generally have acidic pIs (~pI 5) and a broad molecular weight distribution, although there are groups of proteins that run at ~40 and below 20 kDa on SDS-PAGE gels. It appears that all the proteins that settle with Isinglass treatment are present in untreated beer, and are still present in the settled tops as soluble proteins. Ester-linked phenolic acid levels are low. The influence of phenolic compounds on the action of Isinglass remains unclear.

Example 2

Isinglass Alternative Screen

An ideal Isinglass alternative will show similar activity to Isinglass but will not be animal derived and will be cost competitive and amenable to current manufacturing processes. A number of essentially plant-derived materials have been used in a scaled-down version of the test for sedimentation in an attempt to find a suitable Isinglass alternative.

Materials

Un-fined high gravity beer was produced by Calton and United Breweries (CUB) although any source of un-fined beer could be used. Isinglass, semi-refined kappa-carrageenan, polyvinyl pyrroloidone (PVP), and polymerised PVP (PVPP) are universally available, for example PVPP is available from BASF, Germany, under the name Divergen. Commercial suppliers for other products are: Plantis M and Plantis WT (Australian Winemakers, North Melbourne); Klebosol (Clariant, France); Baykisol (Victus International, Albert Park; manufactured by Bayer Chemicals, Germany); kappa-carrageenan, sodium alginate and xanthan gum (Sigma, USA); carboxymethyl chitosan (types N—, O—, N,O—, sol, and gel; from V-LABS, Inc., USA); Gellan gum (Gelrire; from PhytoTechnology Laboratories, USA); HM pectins (types RS-109, USP and SS-121; from Citrus Colloids, now part of Hercules—contact Copenhagen Pectin A/S Lille Skensved, Denmark); HM pectins (types RS-400, RS-450, MRS-351, and SS-200; from Danisco—contact Danisco Ingredients, Brabrand, Denmark); LMC pectin (type 710 also from Danisco); LMC pectin (type 18CG from CP Kelco—contact CP Kelco Lille Skevensved, Denmark); LMA pectins (types 1000, 2000 and 3000; from Citrus Colloids); LMA pectins (types 101 and 104; from CP Kelco); LMA pectin (types 210; from Danisco); LMA pectin (type 290 NH; from Unipectine).

In the experiments that follow PB-A (plant biopolymer A) is CP Kelco type 101, PB-B (plant biopolymer B) is LMA pectin, Danisco type 210, PB-C (plant biopolymer C) is CP Kelco type 104 and PB-D (plant biopolymer D) is Unipectine type 290 NH.

Sedimentation Test

All sedimentation tests are conducted at 4° C. using unsettled, pre-fined beer. Finings agent is added to unsettled beer to a final volume of 250 ml. The solution is mixed using a magnetic stir-bar (5 min, medium speed), transferred to a glass cylinder and allowed to settle for up to 113 h. To assess beer turbidity, the absorbance (wavelength—500 nm; ref—water) of 1 ml beer, taken from the 210 ml cylinder graduation line, is measured at various time-points following finings agent addition. Both a negative (no finings agent) and a positive control (0.002% Isinglass) are included in every test. At the conclusion of each test, 20 ml of beer from between the 210 and 190 ml graduation marks (Top) and material from the bottom of the cylinder (Floc) are retained for analysis.

Results and Discussion
Sedimentation Tests

In the sedimentation tests (Table 7-$A_{500nm}$ of unsettled beer ~1.350), Baykisol imparts some clarity to the beer as does Plantis M. Baykisol is not as effective as Isinglass, and Plantis M, a commercial protein preparation sold for the clarification of wines in combination with bentonite, is only effective after treatment for an extended period of time. From the initial trials, only plant biopolymer B (PB-B) showed some potential. A series of other plant biopolymers of a similar composition to PB-B were tested (Table 8). PB-A was also effective as an Isinglass alternative while PB-C and PB-D were not.

TABLE 7

| Finings Agent | | Concentration | 21 h | 24 h | 48 h | 72 h | 92 h | 96 h |
|---|---|---|---|---|---|---|---|---|
| None | | — | — | 1.198 | 0.976 | 0.873 | — | 0.704 |
| Isinglass | | 0.00025% | — | 1.048 | — | — | — | — |
| | | 0.0005% | — | 0.644 | — | — | — | — |
| | | 0.001% | — | 0.47 | — | — | — | — |
| | | 0.002% | — | 0.307 | 0.261 | 0.226 | — | 0.225 |
| Silica Sol | Klebosol | 100 □L/L | — | 1.013 | — | — | — | — |
| | Klebosol | 200 □L/L | — | 0.924 | — | — | — | — |
| | Klebosol | 400 □L/L | — | 0.788 | — | — | — | — |
| | Klebosol | 800 □L/L | — | 0.666 | — | — | — | — |
| | Baykisol | 800 □L/L | — | 0.54 | — | — | — | — |
| | Baykisol | 800 □L/L | — | 0.48 | — | — | — | — |
| □-Carrageenan | Purified | 0.003% | — | 0.922 | — | — | — | — |
| | Purified | 0.004% | — | 1.005 | — | — | — | 0.822 |
| | Purified | 0.006% | — | 0.996 | — | — | — | — |
| | Purified | 0.006% | — | 0.911 | — | — | — | — |
| □-Carrageenan | Semi-refined (hydrated) | 0.008% | — | 1.002 | — | — | — | 0.772 |
| | Semi-refined (50-60° C.) | 0.008% | — | 1.053 | — | — | — | 0.886 |
| | Semi-refined (80-90° C.) | 0.008% | — | 0.988 | — | — | — | 0.783 |
| Carboxy-methyl Chitosan | N,O— | 0.004% | — | 1.239 | — | — | 1.066 | — |
| | N,O— | 0.004% | — | 1.426 | 1.271 | — | — | — |
| | N,O— | 0.008% | — | 1.441 | 1.353 | — | — | — |
| | N— | 0.004% | — | 1.215 | — | — | 1.021 | — |
| | N— | 0.004% | — | 1.336 | 1.173 | — | — | — |
| | N— | 0.008% | — | 1.385 | 1.283 | — | — | — |
| Carboxy-methyl Chitosan | O— | 0.004% | — | 1.508 | 1.318 | — | — | — |
| | O— | 0.008% | — | 1.6 | 1.55 | — | — | — |
| | CMC Gel | 0.004% | 1.435 | — | — | — | — | — |
| | CMC Gel | 0.008% | 1.466 | — | — | — | — | — |
| | N-CMC (sol) | 0.004% | 1.428 | — | — | — | — | — |
| | N-CMC (sol) | 0.008% | 1.376 | — | — | — | — | — |
| Plantis | M | 0.001% | — | 1.334 | 1.027 | 0.901 | — | 0.902 |
| | M | 0.001% | — | 1.391 | 0.797 | 0.701 | — | 0.674 |
| | M | 0.002% | — | 0.895 | 0.528 | 0.463 | — | 0.414 |
| | WT | 0.001% | — | 1.037 | 1.019 | 0.778 | — | 0.751 |
| | WT | 0.001% | — | 1.113 | 0.982 | 0.715 | — | 0.728 |
| | WT | 0.002% | — | 1.1 | 0.992 | 0.763 | — | 0.766 |
| PVP | | 0.015% | — | 0.949 | — | — | 0.771 | — |
| PVPP | | 0.015% | — | 1.063 | — | — | 0.836 | — |
| Gelrite | Gellan Gum | 0.004% | — | 1.1 | — | — | 0.852 | — |
| | | 0.008% | — | 0.869 | — | — | 0.75 | — |
| Alginic Acid | | 0.004% | — | 1.123 | — | — | 0.824 | — |
| | | 0.008% | — | 1.167 | — | — | 1.012 | — |
| Gum Xanthan | | 0.004% | — | 1.138 | — | — | 1.071 | — |
| | | 0.008% | — | 1.025 | — | — | 0.698 | — |
| LMA pectin | Danisco type 210 | 0.004% | — | 0.601 | 0.505 | 0.492 | — | 0.46 |
| | | 0.006% | — | 0.687 | 0.589 | 0.54 | — | 0.521 |
| | | 0.008% | — | 0.597 | 0.522 | 0.499 | — | 0.471 |

TABLE 8

| Finings Agent | | Concentration | 21 h | 24 h | 43 h | 48 h | 66 h | 72 h | 92 h | 96 h | 113 h |
|---|---|---|---|---|---|---|---|---|---|---|---|
| None | | | — | 1.198 | — | 0.976 | — | 0.873 | — | 0.704 | — |
| Isinglass | | 0.002% | — | 0.307 | — | 0.261 | — | 0.226 | — | 0.225 | — |
| PB-A | CP Kelco | 0.001% | — | 1.22 | — | — | — | — | — | — | — |

TABLE 8-continued

| Finings Agent | | Concentration | Absorbance 500 nm) | | | | | | | | |
|---|---|---|---|---|---|---|---|---|---|---|---|
| | | | 21 h | 24 h | 43 h | 48 h | 66 h | 72 h | 92 h | 96 h | 113 h |
| LMA pectin | type 101 | 0.002% | — | 0.937 | — | — | — | — | — | — | — |
| | | 0.004% | — | 0.404 | — | — | — | — | — | — | — |
| | | 0.008% | — | 0.266 | — | — | — | — | — | — | — |
| | | 0.008% | 0.223 | — | 0.133 | — | — | — | — | — | — |
| | | 0.012% | — | 0.221 | — | — | — | — | — | — | — |
| PB-B | Danisco | 0.002% | — | 0.559 | — | — | — | — | — | — | 0.539 |
| LMA pectin | type 210 | 0.004% | — | 0.349 | 0.316 | — | — | — | — | — | — |
| | | 0.004% | — | 0.468 | — | — | — | — | — | — | 0.336 |
| | | 0.004% | — | 0.561 | — | 0.465 | 0.415 | — | — | — | — |
| | | 0.006% | — | 0.435 | — | — | — | — | — | — | 0.335 |
| | | 0.006% | — | 0.489 | — | 0.437 | 0.39 | — | — | — | — |
| | | 0.008% | — | 0.313 | 0.274 | — | — | — | — | — | — |
| | | 0.008% | — | 0.312 | — | — | — | — | — | — | 0.309 |
| | | 0.008% | — | 0.439 | — | 0.451 | 0.391 | — | — | — | — |
| | | 0.012% | — | 0.435 | 0.311 | — | — | — | — | — | — |
| | | 0.016% | — | 0.477 | 0.355 | — | — | — | — | — | — |
| PB-B | Danisco | 0.006% | — | 0.49 | — | 0.45 | 0.39 | — | — | — | — |
| LMA pectin | type 210 | 0.008% | — | 0.489 | — | 0.488 | 0.419 | — | — | — | — |
| (de-sugared) | | 0.010% | — | 0.606 | — | 0.548 | 0.489 | — | — | — | — |
| PB-C | CP Kelco | 0.008% | 0.836 | — | 0.672 | — | — | — | — | — | — |
| LMA pectin | type 104 | | | | | | | | | | |
| PB-D | Unipectine | 0.004% | — | 0.895 | — | — | — | — | — | — | 0.745 |
| LMA pectin | type 290NH | 0.006% | — | 0.85 | — | — | — | — | — | — | 0.754 |
| | | 0.008% | — | 0.735 | — | — | — | — | — | — | 0.604 |

Figure 6:
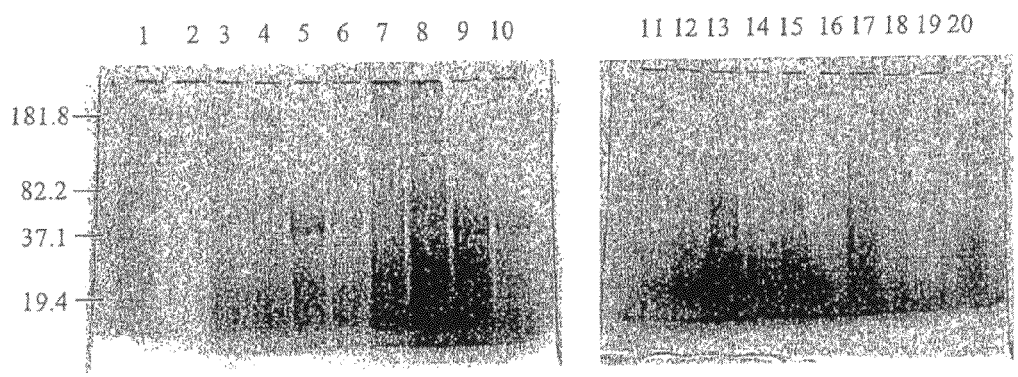
FIG. 6 shows SDS-PAGE of beer fractions treated with Isinglass, LMA pectin A (CP Kelco, type 101) and LMA pectin B (CP Kelco, type 104).

Comparison of the protein profiles by SDS-PAGE (FIG. 6), suggest that Isinglass and PB-A interact with proteins differently. Similar to Isinglass, PB-A depletes the top pellet fraction of protein, whereas PB-C, which is not an effective finings agent, does not. However, PB-A appears to collect more of one protein in particular (~40 kDa) in the treated floc. Isinglass and PB-C also pull down the same band but to a lesser extent.

Of the different material tested, the plant biopolymer preparations PB-A and PB-B appear to show some potential as an Isinglass alternative.

Example 3

Further Characterisation of Beer Particles

Sample preparation, phenolic ester analysis and sedimentation tests were performed as described in Examples 1 and 2. For the 2-D electrophoresis, samples (0.5 to 1.0 mg) were suspended in thiourea sample buffer and focused on 18 cm IPG strips covering a pH range of 3 to 10. IPG strips were equilibrated and placed across a 12.5% polyacrylamide gel for the second dimension. In-gel trypsin digests were performed on the 40 kDa band on SDS-PAGE (see Examples 1 and 2). The peptide fragments were analysed by mass spectrometry and sequences matched to known proteins by database searches.

Phenolic Analysis

Analysis for phenolic esters was repeated due to the extremely low levels found in the samples contributing to possible errors in the analysis. The levels of ester-linked phenolics in whole beer, the Isinglass floc and top are very low with less than 50 ng in 5 mg of dialysed, freeze-dried material (Table 9—Ester-linked phenolic acid analysis). The major phenolic acid is ferulic acid in all samples, with trace amounts of syringic, cinnamic and p-coumaric acids. On a weight basis, it appears that the greatest amount of phenolics is found in the Isinglass floc, which consists of more syringic and coumaric acid as a percentage than the untreated beer and Isinglass top.

TABLE 9

| Phenolic acid | Whole beer | Isinglass FLOC | Isinglass TOP |
|---|---|---|---|
| Cinnamic | tr | 0.2% | 0.3% |
| o-coumaric | nd | Nd | nd |
| Syringic | 0.3% | 1.5% | 0.6% |
| p-coumaric | 0.5% | 1.7% | 0.3% |
| Ferulic | 99.1% | 96.5% | 98.8% |
| Total in 5 mg (ng) | 38.9 | 46.4 | 29.5 |
| % in sample | 0.0008% | 0.0009% | 0.0006% |

2-D Electrophoresis

Proteins in the Isinglass floc and top were separated by 2-DE (FIG. 7. The protein pattern of both samples is very similar, consisting of major proteins of acidic, but differing pI at approximately 40 kDa. In-gel tryptic digests of the 40 kDa band on SDS-PAGE gels allowed for sequencing of this band. Sequenced peptides matched protein z-type serpin from barley (see below SEQ ID NO. 1).

Peptide match from MS/MS sequencing

Match to: gi|1310677 Score: 216

(X97636) protein z-type serpin [*Hordeum vulgare* subsp. *vulgare*]

Nominal mass (Mr): 43307; Calculated pI value: 5.61

Taxonomy: *Hordeum vulgare* subsp. *vulgare*

Cleavage by semiTrypsin: cuts C-term side of KR unless next residue is P

Sequence Coverage: 16%

Matched peptides shown in bold and underlined in SEQ ID NO. 1

```
  1 MATTLATDVR LSIAHQTRFA LRLASAISSN PERAAGNVAF SPLSLHVALS   SEQ ID NO. 1

51 LITAGAGGAT RDQLVAILGD GGAGDAKELN ALAEQVVQFV LANESSTGGP

101 RIAFANGIFV DASLSLKPSF EELAVCQYKA KTQSVDFQHK TLEAVGQVNS

151 WVEQVTTGLI KQILPPGSVD NTTKLVLGNA LYFKGAWDQK FDESNTKCDS

201 FHLLDGSSIQ TQFMSSTKKQ YISSSDNLKV LKLPYAKGHD KRQFSMYILL

251 PGAQDGL WSLAKRLSTEPEF IENHIPKQTV EVGRFQLPKF KISYQFEASS

301 LLRALGLQLP FSEEADLSEM VDSSQGLEIS HVFHKSFVEV NEEGTEAGAA

351 TVAMGVAMSM PLKVDLVDFV ANHPFLFLIR EDIAGVVVFV GHVTNPLISA
```

TABLE 10

| Finings Agent | | Pectin | | | | | |
|---|---|---|---|---|---|---|---|
| Name | Company* | % COO | % CONH$_2$ | % COO | % Product | Assumed % Active | Absorbance □ |
| Unsettled Beer | | | | | — | — | 1.473 |
| No Finings | | | | | — | — | 1.322 |
| Isinglass | | | | | | | 0.31 |
| HM pectin | | | | | | | |
| RS-109 | CC Colloids | 70 | — | 30 | 0.008 | 0.004 | 0.954 |
|  |  |  |  |  | 0.016 | 0.008 | 1.039 |
| RS-400 | Danisco | 70 | — | 30 | 0.008 | 0.004 | 0.923 |
|  |  |  |  |  | 0.016 | 0.008 | 1.025 |
| RS-450 | Danisco | 69 | — | 31 | 0.008 | 0.004 | 0.967 |
|  |  |  |  |  | 0.016 | 0.008 | 1.028 |
| MRS-351 | Danisco | 68 | — | 32 | 0.008 | 0.004 | 1.807 |
|  |  |  |  |  | 0.016 | 0.008 | 1.668 |
| SS-200 | Danisco | 64 | — | 36 | 0.008 | 0.004 | 1.74 |
|  |  |  |  |  | 0.016 | 0.008 | 0.759 |
|  |  |  |  |  | 0.024 | 0.012 | 1.696 |
|  |  |  |  |  | 0.032 | 0.016 | 0.299 |
| USP | CC Colloids | 61 | — | 39 | 0.008 | 0.004 | 1.796 |
|  |  |  |  |  | 0.016 | 0.008 | 1.91 |
| SS-121 | CC Colloids | 58 | — | 42 | 0.002 | 0.002 | 0.988 |
|  |  |  |  |  | 0.004 | 0.004 | 0.692 |
|  |  |  |  |  | 0.008 | 0.008 | 0.359 |
|  |  |  |  |  | 0.012 | 0.012 | 0.272 |
|  |  |  |  |  | 0.016 | 0.016 | 0.249 |
|  |  |  |  |  | 0.020 | 0.020 | 0.176 |
|  |  |  |  |  | 0.024 | 0.024 | 0.180 |
| LMC pectin | | | | | | | |
| Type 710 | Danisco | 48 | — | 52 | 0.002 | 0.002 | 0.57 |
|  |  |  |  |  | 0.004 | 0.004 | 0.362 |
|  |  |  |  |  | 0.008 | 0.008 | 0.304 |
|  |  |  |  |  | 0.012 | 0.012 | 0.201 |
|  |  |  |  |  | 0.016 | 0.016 | 0.22 |
|  |  |  |  |  | 0.020 | 0.020 | 0.165 |
|  |  |  |  |  | 0.024 | 0.024 | 0.175 |
| Type 18CG | CP Kelco | 39 | — | 61 | 0.008 | 0.004 | 0.729 |
|  |  |  |  |  | 0.016 | 0.0008 | 0.631 |
| LMA pectin | | | | | | | |
| Type 3000 | CC Colloids | 36 | 14 | 50 | 0.002 | 0.002 | 0.634 |
|  |  |  |  |  | 0.004 | 0.004 | 0.44 |
|  |  |  |  |  | 0.008 | 0.008 | 0.393 |
|  |  |  |  |  | 0.012 | 0.012 | 0.33 |
|  |  |  |  |  | 0.016 | 0.016 | 0.325 |
|  |  |  |  |  | 0.02 | 0.02 | 0.294 |
|  |  |  |  |  | 0.024 | 0.024 | 0.242 |
| Type 101 | CP Kelco | 36 | 14 | 50 | 0.002 | 0.001 | 1.22 |
|  |  |  |  |  | 0.004 | 0.002 | 0.937 |
|  |  |  |  |  | 0.008 | 0.004 | 0.375 |
|  |  |  |  |  | 0.016 | 0.008 | 0.278 |
|  |  |  |  |  | 0.024 | 0.012 | 0.221 |
| Type 210 (minus sugar) | Danisco | 33 | 16 | 51 | 0.006 | 0.006 | 0.49 |
|  |  |  |  |  | 0.008 | 0.008 | 0.489 |
|  |  |  |  |  | 0.010 | 0.010 | 0.606 |

TABLE 10-continued

| Finings Agent | | Pectin | | | | | |
|---|---|---|---|---|---|---|---|
| Name | Company* | % COO | % CONH$_2$ | % COO | % Product | Assumed % Active | Absorbance ☐ |
| Type 2000 | CC Colloids | 32 | 18 | 50 | 0.008 | 0.004 | 0.427 |
| | | | | | 0.016 | 0.008 | 0.343 |
| Type 104 D) | CP Kelco | 30 | 18 | 52 | 0.016 | 0.008 | 0.836 |
| Type 1000 | CC Colloids | 28 | 20 | 52 | 0.008 | 0.004 | 0.654 |
| | | | | | 0.016 | 0.008 | 0.558 |

*CC: Citrus Colloids.

Sedimentation Tests

Early trials suggested that there was potential for pectin (PB A and PB B) to act as an Isinglass alternative. The biopolymers used in the previous trial (PB A and PB B) were examples of amidated pectin. The current trial was performed to determine the relevance of the amide group on the pectin. In this trial high methyl ester, low methyl ester and amidated low methyl ester pectin were assessed for activity in sedimentation tests (Table 10). It is important to note these preparations are typically highly blended at production and that the chemistry listed in Table 10 is based on product specification not real chemical analysis of each batch. Also, these values are indicative of population averages and do not consider differences in the distribution pattern of individual polymers.

The results suggest that all 3 types of pectin have some capacity to clarify beer but not all pectins are effective. We propose that the difference between pectins that are active and those that are not is related to overall charge density. LM pectins are generally more effective than HM regardless of whether or not the LM pectin is amidated. HM pectin is effective but generally only when the proportion of free COOH is greater than 35%. The upper and lower limits for degree of esterification (DE) and degree of amidation (DA) to give effective fining activity are under further study.

Example 4

Filtration Performance Tests

Filtration tests were conducted at 2° C. using unsettled pre-fined high gravity beer. Finings agents were added to pre fined high gravity beer to a final volume of 8.5 liters. The solution was mixed by rolling the vessel (stainless steel pre mix tank) for 3 minutes and then allowed to settle for 48 hrs. The supernatant (7.5 l) was transferred to another vessel via a short spear leaving the sediment behind.

Diatomaceous earth (DE) filtration was conducted on the supernatant. DE (Filchem—577), 7.5 g was added to the beer and the solution was continuously mixed using a magnetic stir-bar. The subsequent removal of DE was performed with a Millipore horizontal filtration apparatus, using a 120 cm$^2$ cross sectional area column with 100 kPa upstream pressure. The filter was precoated with two Millipore type AP prefilters, followed by 0.115 g/cm$^2$ of DE precoat powder (Filchem—DU40). To calculate filtration performance, the volume of filtered beer was monitored with time and the filterability index was calculated using a method reported by Lim et al. 1992.

By plotting t/V against V a straight line is obtained with the slope equal to the filterability index. A low value indicates good filterability, a high value the converse.

The filterability index results for beer treated with different finings aids, as shown in Table 11, show that beer treated with Pectin 121 is comparable to collagen treated beer. Beer treated with Pectin 710 showed good improvement compared to a control without finings but not as good as Pectin 121.

TABLE 11

| Finings Agent | Rate (mg/L) | Filterability Index (sec/L$^2$) |
|---|---|---|
| None | | 43.4 |
| Collagen | 5 | 7.1 |
| Pectin 121 | 100 | 7.5 |
| Pectin 710 | 100 | 19.8 |

Figure 8:
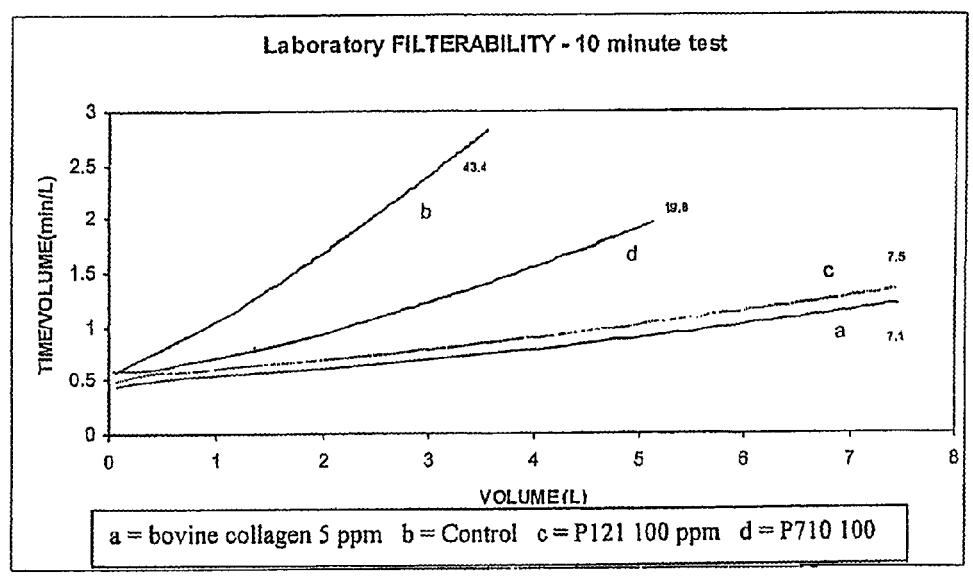
FIG. 8 is a chart showing time/volume against volume to indicate filtration performance.

The chart shown in FIG. 8 shows the laboratory DE filtration performance of beer without finings (control) compared to beer treated with bovine collagen and the two pectin samples, HM-SS-121 and LMC-710.

Flat lines with low slopes (sec/12) indicate a faster filtration. From this result it appears that sample 121, high methyl ester pectin is comparable to beef collagen. Sample 710 does aid clarification but does not perform nearly as well as sample 121. The pectins were dosed at a higher rate compared to the beef collagen (10 ppm versus 80 ppm).

Example 5

Optimising Finings Treatments

It seems likely from work in progress that finings agents are able to capture specific proteins to form stable aggregates and in so doing stabilise and facilitate the extension of the flocs over time. Our work has shown that there is a specific group of low molecular weight, redox proteins in beer that have reactive thiols. These proteins can be identified by tracking these protein thiols (see later Example 19).

Example 6

Detecting Residual Pectins in Beer

Antibodies that recognize specific structural signatures, associated with the pectin finings agent(s) are under development. This data can be used for optimising the dosage rates, and to control the unauthorised use of this technology. The finings pectins defined in this patent application will exhibit unique reactivity that can therefore be used for authentication, against a variety of other pectins.

Example 7

Non-Amidated Pectins

Figure 9:
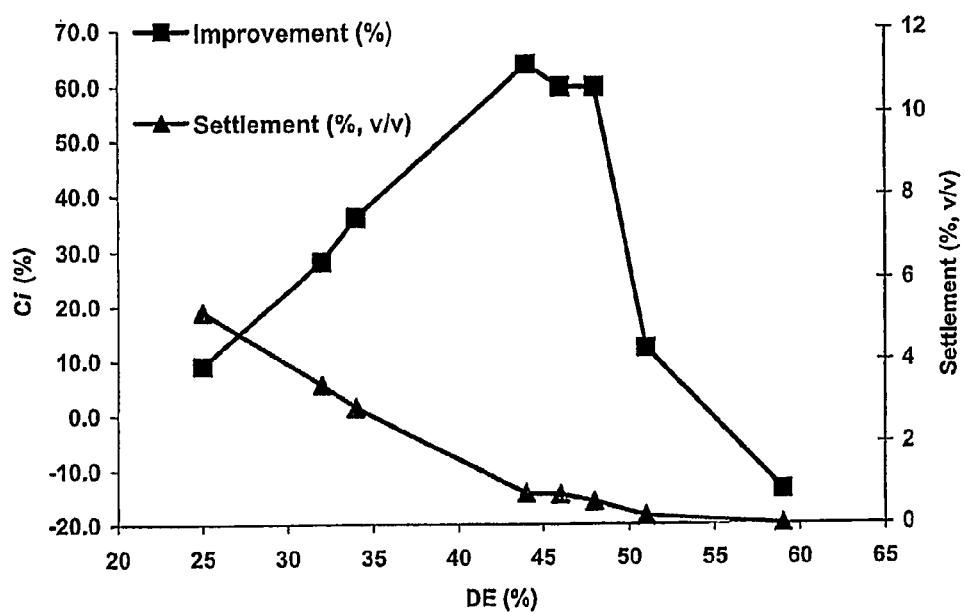
FIG. 9 is a chart showing the relationship between non-amidated pectin DE (%) clarity after settling (48 h) and the volume of floc.

Effects of Pectin DE, Pectin Concentration and Beer Type on Beer Finings Performance A series of tests were performed with non-amidated pectins of variable esterification, in which beer clarity and sediment volume were compared under standard settling conditions. FIG. 9 shows the relationship between the degree of pectin esterification (DE, %, beer clarity (after 48 h) and the apparent volume of the sediment or floc. Pectin (1% stock solution) was dosed into UHG beer (CPL, Table 2; 18° P original wort) to give 50 ppm. (The pectin solution was prepared in water and contained no other additives.)

Clarity improvement=(turbidity)control−(turbidity)pectin/(turbidity)control×100. The settlement refers to sediment volume; settlement=apparent volume sediment/total beer volume×100. The clarification shows a sharp dependence on pectin DE (FIG. 9). The optimum range for pectin DE is between 45-50% based on clarity achievement and the compactness of the sediments. Sediment volume within this range is <1% of the suspension volume. At reduced DE (e.g. <40%) the sediment becomes 'fluffier' and the apparent volume of the sediment increases quite sharply as DE levels are reduced below 40%. At higher DE values (e.g. >50%) the sediment volume diminishes as a consequence no doubt of the reduced clarification achieved.

The finings effect of two different pectins—HM121 (ethanol washed) and LMC710 (refer to Table 1), was tested using a VB beer with high turbidity (e.g. 88 EBC, Table 12 which shows the effect of dosing high gravity beer with pectin based finings: settling tests and turbidity measurements). Pectin was dosed to a final concentration of 50 ppm or 100 ppm. Bovine collagen (4-10 ppm protein/hL) was used as the positive control. The results (Table 3) showed that collagen finings clarified the beer progressively over time. By 48 h the treated beer appeared optically clear, bearing in mind this describes the appearance of the beer sample in a standard 1 L cylinder. The turbidity stabilised at about 8 EBC after 72 h. HM121 and LM101 (100 ppm) produced equivalent clarification after 72 h (7.9 verus 10.7 EBC). LMC710 showed activity at the lower dose rate of 50 ppm. HM121 did not when compared to the no-finings-addition control. The finings performance of the pectins thus depends on functionality as well as concentration. In this respect it is no different to the collagen finings that shows dose dependency and dependence on the source and the protocols of preparation (functionality).

TABLE 12

| Pectin | Conc. (ppm) | Turbidity (EBC) | | | | |
|---|---|---|---|---|---|---|
| | | 0 h | 8 h | 24 h | 48 h | 72 h |
| Control | — | 88.4 | 88.0 | 86.7 | 85.7 | 84.4 |
| HM121 | 100 | 87.6 | 46.1 | 25.7 | 11.3 | 7.9 |
| HM121 | 50 | 84.4 | 86.7 | 85.7 | 84.7 | 82.4 |
| LMC710 | 100 | 83.2 | 17.0 | 14.6 | 13.3 | 10.7 |
| LMC710 | 50 | 83.3 | 42.8 | 38.2 | 36.1 | 34.7 |
| Collagen | 0.02% | 82.8 | 56.7 | 28.9 | 12.7 | 8.9 |

The effect of the initial turbidity of beer on non-amidated pectin finings efficiency in settling tests is illustrated in Table 13. Beer was dosed as indicated and monitored for 72 hours. LAGER beer with low and high initial turbidity (45 vs 75 EBC) was used in the study. The pectin dosing solution contained 1% pectin (w/w). The final concentration of pectin in the beer ranged from 50-100 ppm. In the low turbidity beer (45 EBC LAGER, Table 13), the turbidity of the control beer that received no finings after 72 h of settling was down to 33 EBC. The collagen-treated beer (0.02%) at the same time had a turbidity of 5.7 EBC. HM121-treated beer at 70-100 ppm was 5.4 EBC or less. At 60 ppm the turbidity had increased slightly to 11.8 EBC. With 50 ppm pectin this had increased noticeably to 31.7 EBC. There was scarcely any difference to the control, untreated beer. By way of contrast, in the highly turbid beer (75 EBC LAGER, Table 13), it can be seen that fining did not take place until the pectin level in the beer was 70 ppm. The collagen treated beer reached 13.8 EBC after 72 h. To get the same clarity required 100 ppm of HM121, although satisfactory clarification rates were obtained with 80 ppm HM121. Consequently the initial turbidity of the beer for treatment (mainly caused by the residual yeast cells) can markedly influence the pectin finings capability.

TABLE 13

| Pectin | Conc. (ppm) | Turbidity (EBC) | | | | | |
|---|---|---|---|---|---|---|---|
| | | 0 h | 4 h | 18 h | 24 h | 48 h | 72 h |
| Lager (initial turbidity: ~45 EBC) | | | | | | | |
| Control | — | 45.0 | 45.5 | 45.2 | 43.1 | 36.4 | 33.3 |
| HM121 | 50 | 44.3 | 43.2 | 40.3 | 37.1 | 34.6 | 31.7 |
| HM121 | 60 | 45.1 | 40.2 | 26.1 | 20.5 | 14.0 | 11.8 |
| HM121 | 70 | 46.7 | 41.7 | 14.4 | 12.0 | 8.9 | 7.4 |
| HM121 | 80 | 45.8 | 40.7 | 7.9 | 6.8 | 5.9 | 5.4 |
| HM121 | 90 | 45.6 | 40.3 | 7.9 | 6.8 | 5.4 | 5.1 |
| HM121 | 100 | 44.3 | 38.9 | 10.3 | 7.8 | 5.0 | 4.8 |
| Collagen | 0.02% | 45.7 | 42.2 | 16.7 | 11.4 | 8.1 | 5.7 |
| Lager (Initial Turbidity: ~75 EBC) | | | | | | | |
| Control | — | 77.6 | 76.7 | 75.8 | 74.7 | 74.9 | 72.8 |
| HM121 | 50 | 77.2 | 77.2 | 76.0 | 72.8 | 72.1 | 70.0 |
| HM121 | 60 | 73.4 | 76.6 | 76.5 | 72.8 | 72.3 | 70.1 |
| HM121 | 70 | 74.8 | 73.7 | 75.1 | 71.8 | 68.8 | 59.8 |
| HM121 | 80 | 74.8 | 75.2 | 74.4 | 72.6 | 51.3 | 36.0 |
| HM121 | 90 | 73.3 | 76.8 | 67.7 | 51.9 | 25.6 | 20.0 |
| HM121 | 100 | 74.3 | 70.3 | 30.8 | 24.5 | 13.5 | 11.3 |
| Collagen | 0.02% | 77.2 | 68.7 | 32.3 | 25.7 | 16.7 | 13.8 |

Example 8

Amidated Pectin

Structure and Functionality

The finings effect of amidated pectin has been investigated. Amidated pectins with variable DE and DA values (refer to Table 1) were used in the study. 1% pectin solution was dosed into VB beer at a final concentration at 75 ppm. The beer was stored at 4° C. for 72 hours. During this time aliquots were removed to determine the turbidity. The settlings results showed (Table 14) that although addition of all the amidated pectins led to an improvement in beer clarity (72 h), LM101 and LA110 appeared to be far more effective than others.

TABLE 14

| Pectin | DE (%) | DA (%) | Ca$^{++}$ reactivity | Turbidity (EBC) | | | | | |
|---|---|---|---|---|---|---|---|---|---|
| | | | | 0 h | 4 h | 18 h | 24 h | 48 h | 72 h |
| Control | — | — | — | 35.7 | — | 33.3 | 32.1 | 27.6 | 23.4 |
| LM101 | 35 | 15 | Low | 35.7 | 14.3 | 10.9 | 8.74 | 7.43 | 5.95 |
| LM102 | 30 | 19 | Medium | 39.2 | — | 13.1 | 12.2 | 11.7 | 9.98 |

TABLE 14-continued

| Pectin | DE (%) | DA (%) | Ca$^{++}$ reactivity | Turbidity (EBC) | | | | | |
|---|---|---|---|---|---|---|---|---|---|
| | | | | 0 h | 4 h | 18 h | 24 h | 48 h | 72 h |
| CF005 | 32-40 | 11-17 | Low | 35.7 | 22.7 | 17.5 | 16.3 | 14.8 | 14.2 |
| CF010 | 30-36 | 14-20 | Medium | 35.7 | 19.6 | 16.5 | 14.7 | 13.2 | 13.0 |
| CF020 | 27-32 | 18-23 | High | 35.7 | 37.5 | 36.8 | 35.6 | 32.8 | 30.3 |
| LA110 | 33 | 17 | Low | 41.2 | — | — | 10.4 | 8.42 | 7.61 |
| Collagen | N/A | N/A | N/A | 45.7 | 42.2 | 16.7 | 11.4 | 8.1 | 5.7 |

For LM101 and LA110, DE and DA add up to 50%. However as the other pectins in this cohort have similar (DE+DA) values (Table 14), the superior performance of these two pectins is likely to be a consequence of other factor(s). Pectin colloidal properties are especially sensitive to the presence of Ca$^{2+}$, as well as other cations. Ca$^{2+}$ and Mg$^{2+}$ levels for instance in beers are of the order of 50 and >100 ppm, as already mentioned, although there will be considerable variation in the art. Both LM101 and LA110 are classified by their commercial suppliers as having low Ca$^{2+}$ sensitivity for gel formation, whereas the least effective pectins in the cohort, albeit still effective clarifying agents under the conditions chosen, are CF010 and CF005. The Ca$^{2+}$ sensitivity series for gel formation is CF020>CF010>CF005, or according to the manufacturer's description, CF020 has high, CF010 has medium and CF005 has low sensitivity to Ca$^{2+}$ judged by gel formation under standard conditions. The CF005 specification has a broad range of DE (32-40%) and DA (11-17%) which may make it less comparable to the other pectins in this cohort. But taken together, the data indicates that beer fining capability is significantly prescribed by the levels of esterification and amidation, and thus by residual charge, as well as by the Ca$^{2+}$ sensitivity of gelling. The latter is, as is known in the literature also linked to the distribution of charge along the polygalacturate backbone of the pectins. Thus it is no surprise that different pectins, e.g. citrus, apple, or hop pectins which may differ in the distribution of pectin carboxyl groups, may have different fining activity for equivalent DE and DA. The crowding of carboxyl groups also affects the pKa values of the carboxyls, which may be a factor at low beer pH values. We observed that pectins with high Ca$^{2+}$ sensitivity when added to beers tend to form small colloidal particles, which may remain in suspension in the beer for extended times. If the clarification sequence involves a transient, quasi-gel state, and subsequent decoration with protein and other beer components, prior to flocculation, then the formation of Ca$^{2+}$-coated residues is definitely not desirable. The sequence of the process, and the timing of protein decoration of the colloids must clearly play a key role in compaction of these beer flocs. The Ca$^{2+}$ effect may be minimised by the use of chelating agents. The reactivity of proteins may be modified by altering their redox state. This can be achieved by sulphitolysis, which disrupts disulphide linkages and creates a reactive thiol and adds a sulphonate group. The sulphonation will increase protein negative charge, and thus may affect interactions with pectin based on electrostatic attraction. Localised sulphite may also act as a buffer against peroxide.

Peroxides do accumulated in beer. Oxidation of protein thiols produces hydrogen peroxide, and forms a disulphide bridge. Oxidation of vicinal thiols will tend to favour intramolecular bridge formation, whereas floc formation is more concerned with extended macromolecular lattice production. The finings solution is air saturated. During dispersion the accompanying oxygen in the finings can cause protein oxidation. Disulphide cross linking between proteins will occur more slowly than vicinal thiol oxidation. But the intracellular events will be less likely to take place if oxygen is limiting.

Sulphitolysis can reverse thiol oxidation, albeit some loss will occur over time, and this ought to promote protein cross linking events and floc formation. Certainly elevated concentrations of sulphite in beer under normal packaged conditions will promote particle formation even after short storage times. Sulphite also acts as a reactive oxygen scavenger or free radical scavenger and may have benefit for beer stability as well as floc formation.

Example 9

Effects of SO$_2$ and Citrate on Pectin Finings Performance

SO$_2$ accumulates in beer during fermentation and typically can reach 10 ppm, more or less at the end of fermentation. SO$_2$ is a reducing agent, and it may also act as a free radical quencher. SO$_2$ may also result in sulphitolysis of proteins, by which disulphide bridges in proteins are cleaved to produce a free thiol group and a sulphonate group (Example 7 above). Proteins can become more reactive or 'sticky' as a consequence, and this has been attributed as the cause for the formation of particulate matter in some beers. SO$_2$ as sulphite is frequently added to beer prior to packing, and finished beer total SO$_2$ levels can range up to 25 ppm or higher.

Sodium sulphite was added to pectin finings (1% w/w LMC710, 1% LA110 or 1% LM101; sodium sulphite 1.86 or 3.72 g/L) prepared from either an amidated or a non-amidated pectin. The final concentration of pectin in the beer was 50 ppm. The final SO$_2$ concentration was either 8 or 16 ppm. The effect of sulphite on the finings effect of amidated and non-amidated pectin finings (50 ppm) on LAGER (high gravity beer) is shown in Table 15. Sulphite (8 or 16 ppm) improved the rate of clarification compared to the samples that did not have sulphite in the dosing solution, for the two amidated pectins (LA110 and LM101) and for the non-amidated LMC710. LMC710 (50 ppm) plus 16 ppm SO$_2$ clarification was almost equivalent to the collagen fining after 48 h.

TABLE 15

| Pectin | SO$_2$ (ppm) | Turbidity (EBC) | | | | |
|---|---|---|---|---|---|---|
| | | 0 h | 18 h | 24 h | 48 h | 72 h |
| Control | — | 54.3 | 59.7 | 59.5 | 57.2 | 54.1 |
| LMC710 | — | 54.4 | 23.1 | — | 19.2 | — |
| LMC710 | 8 | 53.7 | 22.6 | — | 16.5 | — |
| LMC710 | 16 | 54.3 | 16.1 | — | 13.0 | — |
| LM101 | — | 45.1 | — | 17.8 | | |
| LM101 | 6 | 45.5 | — | 16.6 | | |
| LA110 | — | 44.7 | — | 23.7 | | |
| LA110 | 6 | 45.1 | — | 19.6 | | |
| Collagen | — | 50.6 | 17.6 | — | 8.7 | 6.9 |

These trials were extended to include the effect of citrate as well as sulphite on beer clarification (Table 16). Two amidated pectins (LM101 and LA110) were chosen for further study. The pectin-sulphite finings solution was fortified with sodium citrate so that the final citrate level in the dosed LAGER beer was 13 ppm. Citrate produces an improvement in beer clarification (50 ppm LM101 pectin, LA110) in addition to the effect of sulphite with both pectin-types. The result appears to be additive as opposed to synergistic, which agrees with the proposed action of citrate as opposed to sulphite. Citrate targets cations and hence moderates the progression from 'monomeric' form to gel to particulate floc. Sulphite may result in sulphitolysis and also the formation of carbonyl adducts. It may promote macromolecular crosslinking. LM101 (50 ppm), citrate (13 ppm) and sulphite (8 ppm) in dosed LAGER beer was equivalent to 20 ppm collagen finings in terms of the rate of clarification as well as the end point reached. However lower levels of the LM101 in combination with citrate and sulphite may in fact be equivalent also to the benchmark collagen clarification.

TABLE 16

| Pectin (ppm) | Citrate (ppm) | $SO_2$ (ppm) | Turbidity (EBC) | | | |
|---|---|---|---|---|---|---|
| | | | 0 h | 24 h | 48 h | 72 h |
| Control | — | — | 45.1 | 45.8 | 43.3 | 40.1 |
| LM101 | — | — | 45.1 | 17.8 | 15.2 | 14.8 |
| LM101 | — | 8 | 45.2 | 16.6 | 13.7 | 11.9 |
| LM101 | 13 | 8 | 45.5 | 12.1 | 10.5 | 8.7 |
| LM101 | 13 | — | 45.2 | 12.4 | 10.7 | 8.9 |
| LA110 | — | — | 45.3 | 23.7 | 21.7 | 21.5 |
| LA110 | — | 8 | 45.0 | 19.6 | 17.4 | 15.1 |
| LA110 | 13 | 8 | 45.2 | 16.7 | 14.9 | 13.8 |
| Collagen | 0.02% | — | 45.1 | 11.6 | 9.0 | 7.9 |

Figure 10:
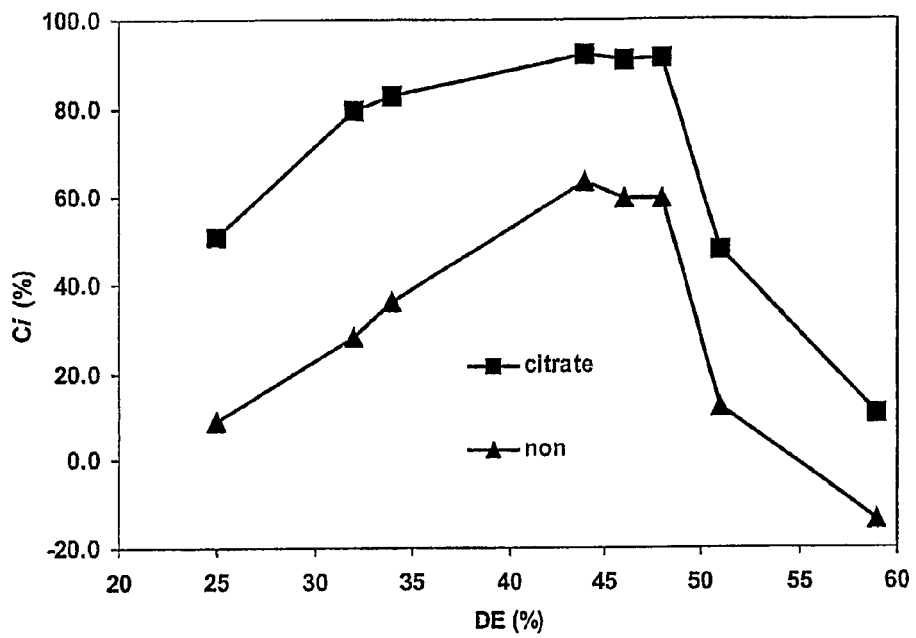
FIG. 10 is a chart showing the effect of citrate and sulphur dioxide on finings performance using pectin solution (1%).

The effect of citrate and $SO_2$ on the finings performance was also conducted for a range of non-amidated pectins (FIG. 10; DE, 25-58%). Pectin was added to CPL beer to a final concentration of 50 ppm with and without accompanying citrate (13 ppm final) and $SO_2$ (8 ppm final). Citrate enhanced the finings effect as judged by the improvement in clarity (EBC units, FIG. 10). The results with CPL beer, after settling are shown in Table 16. The positive effect of citrate applied to all the samples of pectin in the tests. Citrate is a good chelator of $Ca^{2+}$ and may compete with pectins for $Ca^{2+}$ in the beer. The $Ca^{2+}$ content of beer is about 40 ppm; $Mg^{2+}$ levels are generally ~100 ppm. $Mg^{2+}$ may also interact with pectins.

Example 10

Effects of Exogeneous Protein Addition
(Cytochrome c (Basic Protein PI ~9, Horse Heart, Bovine Serum Albumin, Fraction V, PI ~4) and Tannic Acid on Pectin Finings Performance Cytochrome c (20 ppm) or BSA (20 ppm) was added together with HM121 (60 ppm) to LAGER beer (14° P original wort) to determine the effect on clarification. Table 17 shows the effect of cytochrome c and bovine serum albumin (BSA) supplementation on the finings activity of pectin HM121 in high gravity beer shown by settling results. The results in Table 17 show that cytochrome c (20 ppm) improved the rate of clarification and lowered the endpoint turbidity compared to the HM121 control. BSA (low pI protein) had the opposite effect. The rate of clarification was slower and the end-point clarity not as good as the pectin-only control. Cytochrome c is positively charged at beer pH (4.1); BSA carries little net charge as beer pH is almost the same as the isoelectronic point. Cytochrome c may act as a bridging agent for decoration of the acidic pectin groups and in addition, binding of the more acidic proteins in beer.

TABLE 17

| Pectin (ppm) | Additive (ppm) | Turbidity (EBC) | | | |
|---|---|---|---|---|---|
| | | 0 h | 24 h | 48 h | 72 h |
| Control | — | 59.8 | 59.4 | 54.7 | 52.2 |
| HM121 | — | 59.8 | 59.4 | 31.9 | 22.0 |
| HM121 | Cytochrome C (20) | 60.2 | 19.2 | 13.2 | 10.8 |
| HM121 | BSA (20) | 59.2 | 60.6 | 47.7 | 36.6 |

The effect of tannic acid supplementation on the finings action of pectin HM121 in high gravity beer as shown by settling tests was investigated (Table 18). Control beer (LAGER beer 14° P original gravity) showed a slight reduction in EBC turbidity units after 120 h of settling. HM121 (80 ppm) addition reduced turbidity to just under 10 after 58 h. But as shown previously in Table 13, HM121 fining activity dropped off rapidly at levels <80 ppm. The presence of tannic acid offset this decline (Table 18). For example, with 50 ppm tannic acid present and 50 ppm HM121 the turbidity after 48 h of settling was 8 EBC units, compared to 9.8 for 80 ppm HM121—only beer. There is some finings action from tannic acid alone; for instance 50 ppm reduced the turbidity after 48 h to 32 EBC. But overall there appears to be an improved outcome when both the tannic acid and the polyphenol are present together. It was also noted that polyphenols as well as protein and pectin accumulate in the flocs. This data together with this analytical data indicates the sediments are formed, at least in part, as a result of the interaction between proteins, and tannin (polyphenols) and the pectin.

TABLE 18

| HM121 (ppm) | Tannic acids (ppm) | Turbidity (EBC) | | | | | | |
|---|---|---|---|---|---|---|---|---|
| | | 0 h | 18 h | 24 h | 48 h | 72 h | 96 h | 120 h |
| Control | — | 59.8 | — | 59.1 | 54.4 | — | — | 44.4 |
| 80 | — | 58.8 | 48.7 | 11.9 | 9.8 | 8.9 | 8.3 | — |
| 17 | 17 | 60.2 | — | 78.1 | 74.2 | — | — | 72.3 |
| 32 | 32 | 59.7 | — | 95.0 | 55.2 | — | — | 33.9 |
| 49 | 49 | 59.8 | — | 11.9 | 7.8 | — | — | 5.3 |
| 65 | 65 | 62.2 | — | 9.9 | 6.6 | — | — | 5.1 |
| 40 | 40 | 66.9 | 25.0 | 19.7 | 14.5 | 11.7 | 10.0 | — |
| 50 | 50 | 65.8 | 13.5 | 11.4 | 8.0 | 7.0 | 5.7 | — |
| 60 | 60 | 66.4 | 12.5 | 9.5 | 7.7 | 5.9 | 4.7 | — |
| — | 50 | 67.9 | 32.3 | 31.7 | 32.2 | 30.4 | 30.2 | — |
| Collagen | 0.02% | 58.9 | 22.1 | 13.6 | 9.4 | 7.7 | 5.9 | — |

Example 11

Pectin Finings Performance on Kettle-Hopped and Non-Kettle-Hopped Beers

Figure 11:
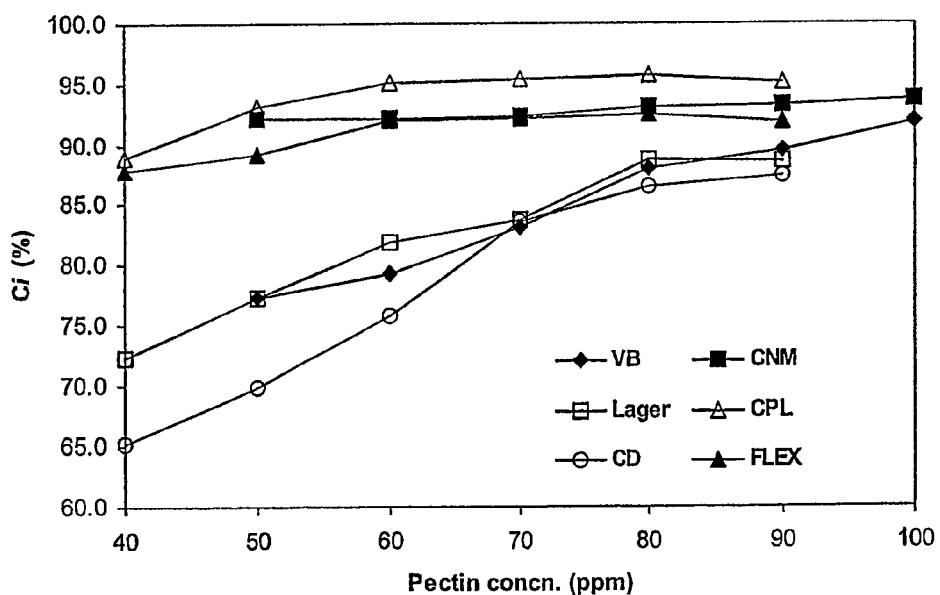
FIG. 11 is a chart showing pectin fining of UHB beer (18° P, kettle hoping) and HG beers (14° P, no kettle hoping).

Three kettle hopped beers (FLEX, CPL and CNM, 18° P Table 2) and three non-kettle hopped beers (LAGER, VB and CD, 14° P Table 2) were fined using LM101 at 40-100 ppm. Beer clarity improvement (Ci, (%)) after 48 h is dependent on pectin concentration (FIG. 11). Clarity improvement for the kettle hopped varieties were >88% even at low pectin levels (40 ppm), and could be as high as 95% for CPL for pectin concentrations >60 ppm. For beers that did not receive kettle hopping, there was a drop-off in clarity once the pectin concentration was reduced below 80 ppm. However even at a dose rate of 60 ppm pectin the clarification index exceeded >70%.

The dependence on kettle hopping was supported by examining the effect of hop extracts prepared by ethanolic extraction of Pride of Ringwood hop pellets [(50 ml ethanol (30%) plus 5 g pellets, 20° C.)] on HM121 (60 ppm) fining activity (Table 19—results of settling tests with high gravity beer). Hop extract increased the rate of clarification and reduced the final turbidity after 72 h of settling compared to the HM121 control.

TABLE 19

| Pectin (ppm) | Additive (ppm) | Turbidity (EBC) | | | |
|---|---|---|---|---|---|
| | | 0 h | 24 h | 48 h | 72 h |
| Control | — | 59.8 | 59.4 | 54.7 | 52.2 |
| HM121 | — | 59.8 | 59.4 | 31.9 | 22.0 |
| HM121 | Hop extract (2% w/w) | 60.2 | 46.7 | 24.5 | 16.4 |

Figure 12:
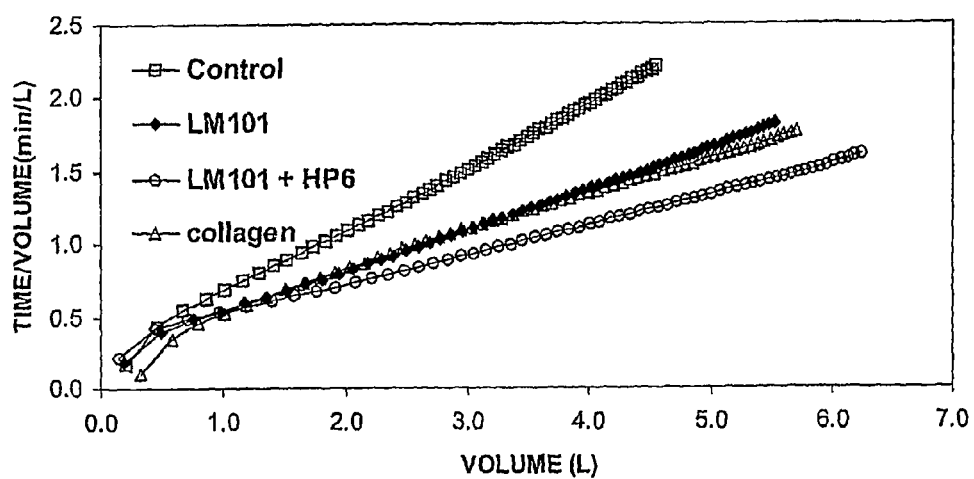
FIG. 12 is a chart showing the effect of HP6 addition on the finings performance of non-kettle hopping beer using a pectin solution.

Furthermore since ethanol extracts of hops also contain some proteins as well as isohumulones, we also tested the effect of co-addition of a $CO_2$-liquid hop extract on pectin activity. HP6 is a commercial extract of Pride of Ringwood hops. HP6 (25 International Bittering Units (IBU), final) and pectin LM101 (75 ppm, final) plus citrate (13 ppm, final) and $SO_2$ (8 ppm, final) were dosed together into post-centrifuged LAGER beer. Settling tests were carried out. The filterability with HP6 present was noticeably improved compared to the one without HP6 (FIG. 12). Filterability values approached 12 $sL^{-1}$, which is almost at the top end of 'best' filterability (~10 $sL^{-1}$). Similar improvement in filterability can be achieved with reduced HP6 additions (equivalent to 10 IBU, final). Thus kettle hopping effects on subsequent clarification by pectin-based agents, may be due to the availability of isohumulones. In turn this may affect the availability of pectin-reacting cations.

It was also noted that as pectin-finings solution ages (pectin-citrate-$SO_2$, 1-5% w/v), there appears to be an increase in finings effect (clarification and filterability, Table 20) and a drop-off in the positive effect on both by hop extract (HP6).

TABLE 20

| Finings additions (1% w/v pectin, citrate, $SO_2$) | Turbidity (EBC) | | Filterability ($sL^{-1}$) |
|---|---|---|---|
| | Initial | 48 h | |
| Initial | | | |
| LAGER no additions | 32 | 28 | 27 |
| 0.02% Collagen | 32 | 9 | 12.4 |
| LM101, 75 ppm final | 32 | 7.5 | 17.3 |
| After 20 days | | | |
| LAGER no additions | 36 | 29 | 27 |
| 0.02% Collagen | 36 | 11 | 15 |
| LM101, 75 ppm | 36 | 13 | 18 |
| LM101, 75 ppm + HP6 (25 IBU) | 36 | 8 | 12 |
| After 30 days | | | |
| LAGER no additions | 42 | 40 | 32 |
| 0.02% Collagen | 42 | 14 | 20 |
| LM101, 75 ppm | 42 | 13 | 10 |
| LM101, 75 ppm + HP6 (10 IBU) | 42 | 7 | 10.4 |
| LM101, 75 ppm + HP6 (20 IBU) | 42 | 5 | 10 |
| LM101, 75 ppm + HP6 (30 IBU) | 42 | 13 | 10.6 |

This presumably is linked to structure and thus functionality changes in the pectin, and implies change in cation activity.

Taken together, hop bittering agents improve the performance of pectin-based finings when introduced in the kettle boil or even later in the process, and especially at the time of addition of the pectin finings, prior to storage.

Example 12

Fining of High Gravity and Ultra High Gravity Beers

Figure 13:
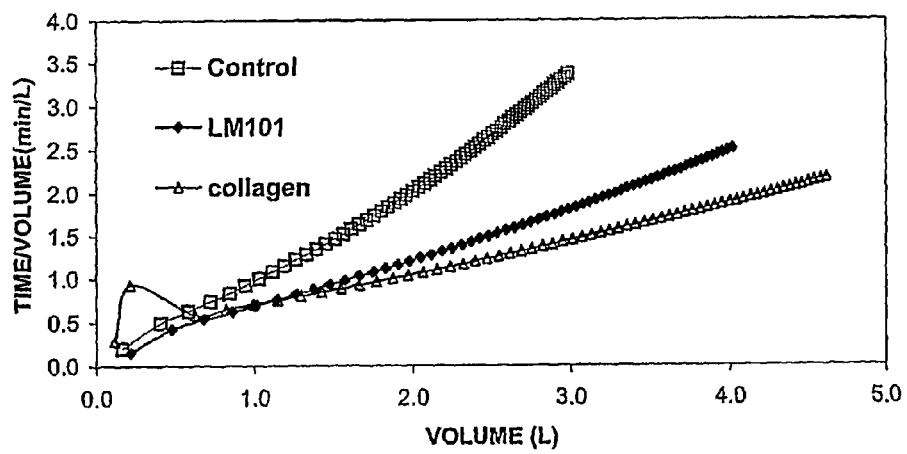
FIG. 13 is a chart showing the filterability of pectin fined HG beer.

HG beer (VB; 14° P) was dosed with LM101 (75 ppm) with citrate and $SO_2$ (13 ppm and 8 ppm final concentration respectively) and filterability was tested (FIG. 13).

Non-treated beer was used for the negative control and collagen (20 ml/hL) was used as a positive control. Both the collagen and pectin-treated beers were 2 or 3 times faster through the filter compared to non-treated beer (control). The pectin-treated beer was less turbid after the fining compared to collagen-treated beer (data not shown), yet the filterability of the pectin-treated beer was not quite equivalent to the collagen-treated beer. Residual pectin may reduce filterability.

Filterability of model beers (4% ethanol, 50 mM citrate and 20 IBU) dosed with pectin, indicate that residual pectin >2 ppm will noticeably reduce filtration through standard 0.65 µm micron nylon66 filter. Estimates based on such measures, and based on filterability of these model beers indicate that in the case above the residual pectin was <2 ppm.

Figure 14:
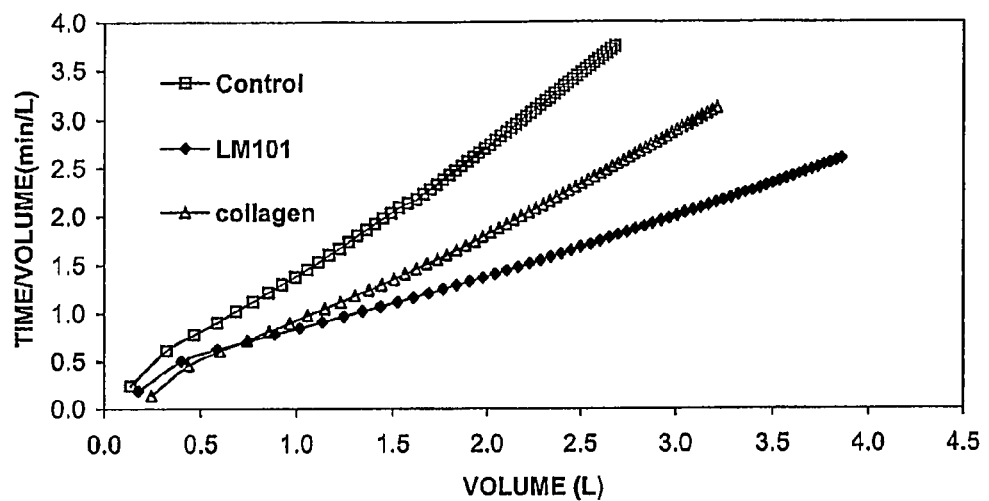
FIG. 14 is a chart showing the filterability of pectin fined UHG beer.

A similar series of tests was carried out with UHG beer (CPL) (FIG. 14). LM101 was dosed to 50 ppm and citrate and $SO_2$ to 9 and 6 ppm respectively. The filtration results show that filtration efficiency was higher in the pectin-treated beer compared to collagen-treated beer and the no-addition control, which is consistent with the settling tests which showed that the rate of clarification and the sedimentation volume were faster and more compact than in the case of the collagen-treated beer.

CPL is a kettle-hopped ultra high gravity beer. An equivalent beer stream that did not receive kettle hops, was less readily filtered after the same finings treatment. Again this indicates that the bittering agents may be contributing to the difference. The estimated residual pectin left in the beer is reduced in the kettle-hopped beers, compared to CPL. Isohumulones react with $Mg^{++}$ and $Ca^{2+}$ to form insoluble salts. One explanation for the kettle-hopping phenomenon is that it causes a reduction in cation levels which leads to a less favourable condition for gelling and a reduction in residual pectin.

Example 13

The Importance of Pectin Molecular Weight on its Finings Effect

Pectinase targets the galacturonic acid backbone, and may produce a population of pectin molecules of reduced molecular weight compared to the original substrate. Treated or untreated pectin (1% w/w) was added to LAGER (high gravity) green beer (14° P original wort) to 100 ppm. The units of pectinase added to 1 ml of the dosing pectin solution are shown in parentheses in Table 21. The results of settling tests shown in Table 21 are typical of several trials. None of the pectinase-treated pectins showed any finings effect compared to the original HM121 pectin. Pectinase activity in beer will affect the performance of pectin-based finings agents.

TABLE 21

| Pectin | Turbidity (EBC) | | | |
|---|---|---|---|---|
| | 0 h | 24 h | 48 h | 72 h |
| Control | 59.8 | 59.4 | 54.7 | 52.2 |
| HM121 | 59.8 | 18.6 | 8.9 | 6.9 |
| HM121 (2U) | 59.6 | 61.1 | 60.8 | 56.7 |
| HM121 (5U) | 59.5 | 60.2 | 57.3 | 54.8 |
| HM121 (10U) | 59.8 | 59.7 | 57.9 | 54.6 |
| HM121 (20U) | 59.2 | 59.1 | 58.9 | 56.4 |
| HM121 (50U) | 59.5 | 62.5 | 60.9 | 58.4 |

Example 14

Effect on the Finings Performance of Using a 5% Pectin Dosing Solution Containing Citrate and Sulphite Elevated pectin concentration in the finings dosing solution minimises the volume of finings added to the passing beer, which is more likely to suit modern processing requirements. Hence the desirability of a high pectin concentration in the dosing material.

Figure 15:
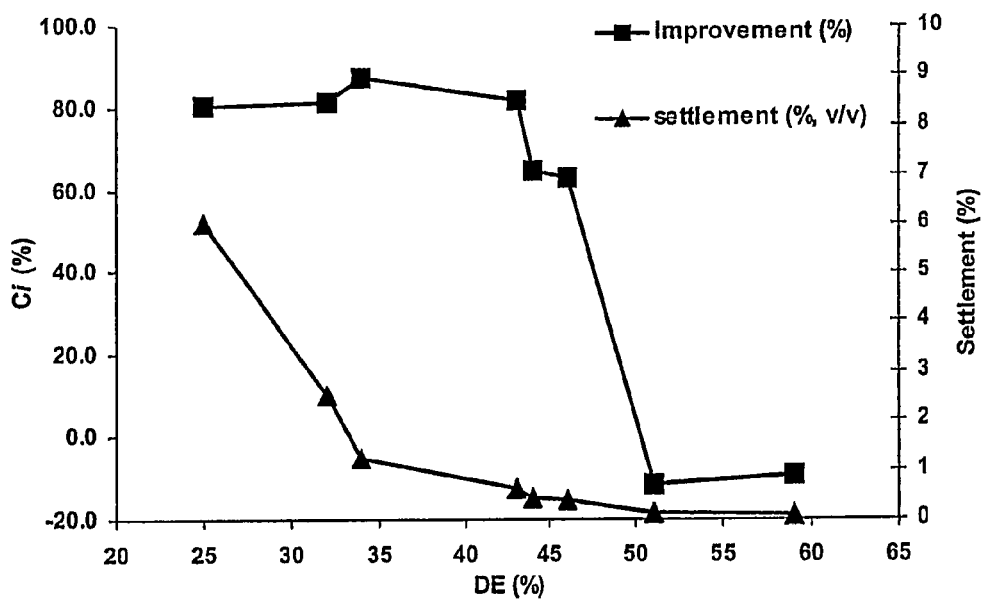
FIG. 15 is a chart showing the effect of increasing the concentration of the non-amidated pectin (with variable DE) finings solution plus addition of citrate and sulphur dioxide on the improvement of beer clarity and the volume of floc.

Pectin (LM101) was added to LAGER to achieve a final concentration of 75 ppm, and a citrate concentration of 13 ppm final and a $SO_2$ level of 8 ppm. The concentration of pectin in the dosing solution was 5%. The results are shown in FIG. 15. The clarification improvement was almost the same as that achieved with a 1% pectin dosing solution (compare FIGS. 4 and 15). The sediment volume was <1% for pectins within the DE range from 40-50%, which is similar to the result achieved with the 1% pectin stock solution (FIG. 8). In fact the pectins within the DE range from 35-50% have sedimentation volumes <1.5 of the total treated beer volume.

Taken together, delivery of LM101-pectin finings from a 5% stock solution as opposed to a 1% stock solution, resulted in no adverse changes in finings efficiency when tested with high gravity beer. Concentrated pectin is more convenient for shipping product, as well as for end users. Higher concentration of pectin, in excess of 7% tend to separate over time, and there appears to be a reduction in finings activity. There is a greater chance that this concentrate will separate rather than disperse evenly in the beer. Higher temperature increases pectin solubility and reduces viscosity albeit with increased likelihood of pectin deactivation.

Example 15

Plant Trial

Pectin—LM101 Based Finings Trial with a High Gravity Beer

A brewery trial was carried out with a pectin based finings (pectin from CP Kelco, LM101) in a high gravity beer (Original Gravity 14° P). The pectin finings was compared with a bovine collagen-based finings.

Protocol

A pallecon of the finings solution (nominally 5%) was prepared and transported to the brewery site. The pallecon was located on the finings dosing stand, and the outlet connected directly to the inlet of the dosing pump.

The trial was run under normal plant conditions. Additional sampling and quality assessments were carried out to meet the trial objectives.

The identified fermenter was passed through the centrifuges and finings were dosed after the post separator buffer tank and after the post separator heat exchanger. The beer was transferred to storage vessels (SV). After an appropriate storage time (typically 2 days) and after relevant quality assessments had been successfully completed, the beer was adjusted to meet finished product parameters, filtered, adjusted to sales gravity and moved to a Bright Beer Tank (BBT).

Final quality assessments were completed and the beer was released to packaging.

Pectin Solution Make Up

A 75 kg batch (three bags) of pectin LM101 was received from CP Kelco (Batch number S42251).

The pectin LM101 used for the plant trials contained 62% w/w pectin (referred to as active pectin hereafter) and the remainder was sugar. The level of the added sugar was detected using HPLC. Additionally, the level of pectin was determined by a gravimetric method after removal of sugars by extraction with aqueous ethanolic solution.

Preparation of the Finings Solution

The finings recipe was as follows:

| | |
|---|---|
| Standardised pectin LM101 (BN: S42251) | 5.5% |
| Sodium citrate ($Na_2C_6H_5O_7$-anhydrous) | 1.5% |
| Citric acid ($C_6H_8O_7$-anhydrous) | 0.5% |
| Potassium metabisulphite ($K_2S_2O_5$) | 1.0% |

For a 1000 L pod, the following amounts were required:

| | |
|---|---|
| Standardised pectin LM101 | 55 kg |
| Sodium citrate | 15 kg |
| Citric acid | 5 kg |
| Potassium metabisulphite | 10 kg |
| Deionised water | 950 L |

The pectin was suspended in 950 L of deionised water at room temperature (22° C.). A standard food grade homogeniser provided agitation. The pectin was added slowly (over 60 min) with continuous agitation. The pH was adjusted as required by either citrate or citric acid. Sulphite was added finally and the pH was again checked and adjusted as required to 4.5-4.9. The solution was transferred to a 1000 L pallecon container for transport to the brewery site. The level of active pectin in this solution was 3.3%, w/w. The pH and the viscosity of the made-up pectin dosing solution were 4.8 and around 500-740 mPa·sec.

Plant Trial Process

The trial was carried out with high gravity beer of Original Gravity (OG) 14° P from a 4000 Hl (1 Hl=100 L) fermenter split into two equal parts for trial and control. The trial was beer dosed with LM101 based finings at a dose rate of 4.94 mg/hL active pectin. The control was the collagen based finings (batch DFS007/05) dosed at 200 mg/L of nominally 2 wt/wt % slurry. The collagen material was supplied as a suspension in pallecons which were stored under normal environmental temperature, 10-18° C. This is the usual winter daily temperature variation for a Melbourne winter.

Following fermentation, and chill back to 4° C., the beer was transferred to two separators running at a combined rate of 600 hL/h. The pectin finings solution was added after the separators using a set point of 150 g/hL. This equates to 4.94 g active pectin/hL beer. The trial beer (pectin finings) was treated first, followed by the collagen treated control beer.

The storage vessels used for holding the treated beer were horizontal 950 hL tanks. Yeast was not dosed back onto the centrifuges, and there was no addition of reclaim beer. The trial beer was passed in 3 h 20 min. The temperature of the beer in storage was 0° C.

The combined volume of the trial tanks was 1920 hL and approximately 300 L of the finings solution was used. This equates closely to the target dosing rate.

Storage Tank Assessment

Plant analytical data are summarised in the following Table 22, which shows analytical data for pectin fined beer, and collagen fined beer, taken from storage tanks (2 tanks for each beer). Samples were taken after the tanks were filled. The data shows no significant difference in the analytical detail for the pectin fined beers versus the collagen fined beers in storage. The brewing staff qualitatively judged the compactness of the tank bottoms as 'tight', not fluffy.

shows brewing descriptors for the bright beer tank samples recovered for the pectin fined beer and the collagen-fined beer.

The data for the pectin-fined beer and the collagen-fined beer are very similar. Both were assessed positively as 'clean, solventy, creamy and fruity'. Haze in process was 33 FTU ASBC compared to 22 FTU ASBC for the trial beer. Both are well within the target level of 50 FTU ASBC and specification of 60 FTU ASBC. (FTU means formazin turbidity units).

TABLE 23

|  | Control | Trial |
|---|---|---|
| Sample Number | 98274 | 98375 |
| Sampled Date | 4/08/2005 9:41 | 4/08/2005 11:04 |

TABLE 22

|  |  | Control | Control | Trial | Trial |
|---|---|---|---|---|---|
| Sample Number |  | 96902 | 96950 | 96590 | 96717 |
| Sampled Date |  | 2/08/2005 16:38 | 2/08/2005 18:14 | 2/08/2005 10:59 | 2/08/2005 12:59 |
| Sampling Location |  | ST_N16 | ST_N17 | ST_N13 | ST_N14 |
| Taste in Product |  | PASS | PASS | PASS | PASS |
| Alcohol | % v/v | 6.35 | 6.32 | 6.32 | 6.38 |
| Specific Gravity (20/20) |  | 1.00819 | 1.0083 | 1.00803 | 1.00821 |
| Present Gravity | °P | 2.1 | 2.13 | 2.06 | 2.11 |
| Original Gravity | °P | 14 | 13.9 | 13.9 | 14 |
| Colour | EBC Units | 11.5 | 11.3 | 10.7 | 10.9 |
| pH |  | 4.02 | 4.02 | 4.04 | 4.03 |
| Total $SO_2$ | mg/L | 11 | 11 | 17 | 17 |
| Oxygen | mg/L | 0.09 | 0.1 | 0.19 | 0.19 |

Filtration

Filtration was carried out on a Filtrox Candle filter. A freshly prepared filter was used, with the control running first followed by the trial. The filter aid used for the pre-coat was Dicalite Speedplus (freshwater) and the filter aid used as the body feed was Celite Standard Supercel (marine).

Figure 16:
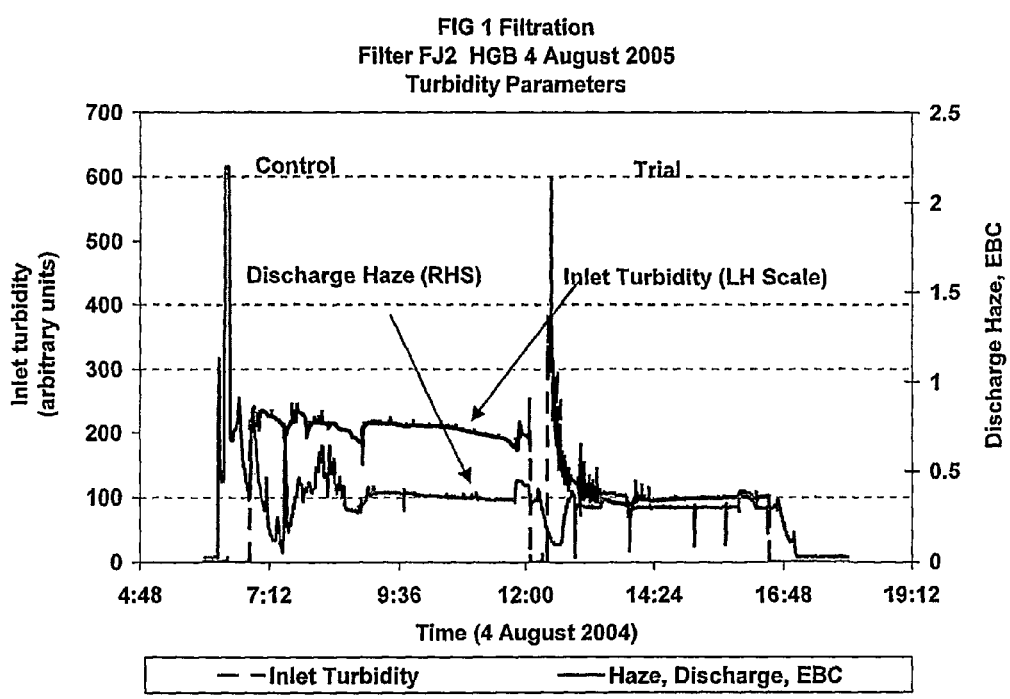
FIG. 16 shows a chart plotting filtration data—turbidity, powder flow rate and haze of the exiting beer (discharge beer) for LM101 pectin (trial) fined VB and bovine collagen (control) fined storage VB beer. The control storage beer data appears first followed by the trial beer data (changeover at 12.30 pm).
Figure 17:
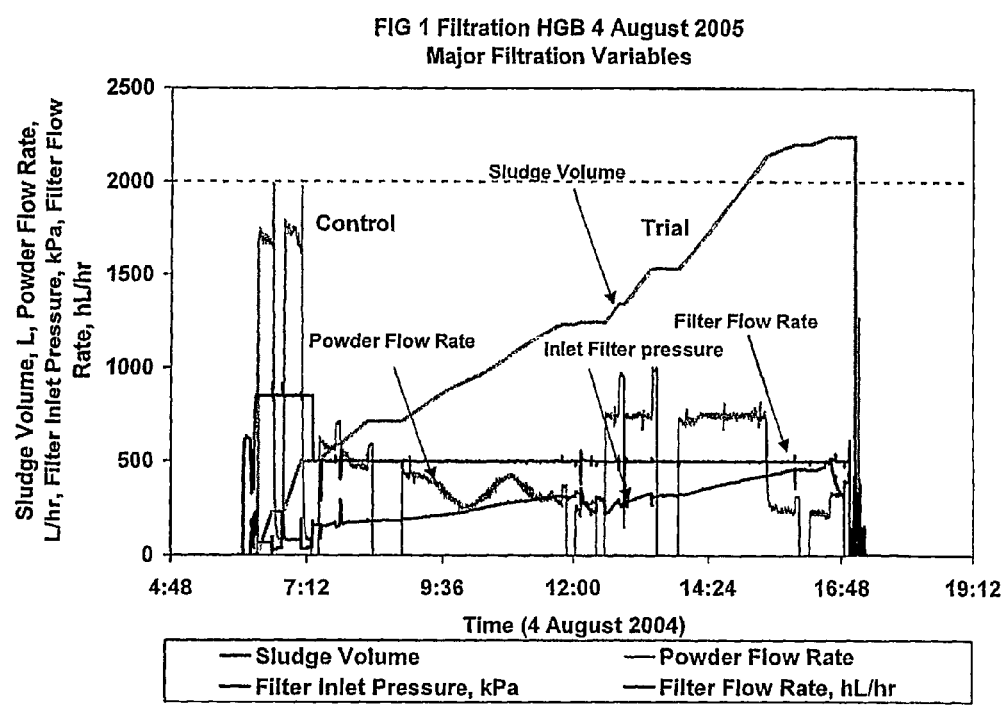
FIG. 17 shows a chart plotting filtration data—sludge volume in the candle filter, powder flow rate, filter discharge pressure, filter inlet pressure, filter flow rate—for LM101 pectin (trial) fined VB and bovine collagen (control) fined storage VB beer. The control storage beer data appears first followed by the trial beer data (changeover at 12.00 pm).

In the FIGS. 16 and 17, the changes in sludge volume, filter aid powder flow rate, filter inlet pressure, filter flow rate (FIG. 17) and inlet turbidity, and discharge haze (FIG. 16) are recorded over the length of the run.

The trial beer met quality standards with filter haze within specification.

According to the Filter room operators at the Abbotsford brewery, the pectin dosed beer performed within expectations for similar beers.

The trial beer did use more filter aid powder and there was a greater increase in filter differential pressure with filtration time.

The rate of increase in pressure was 32 kPa/h for the control, and 68 kPa/h for the trial. The average powder-dosing rate was 22 g/hL and 40 g/hL for the control and the trial respectively.

The powder use and the rate of pressure increase can vary due to variability in beer quality from fermentation to fermentation; this can be managed. For instance, even slightly longer settling times (3 days) significantly reduces both the rate of pressure increase and the powder usage, so that the collagen-fined and pectin-fined beers approach comparable values (refer to Example 9).

Bright Beer Assessment

Following filtration the control and the trial beer were analysed as summarised in the following Table 23 which TABLE 23-continued

|  |  | Control | Trial |
|---|---|---|---|
| Sampling Location |  | BB_L12 | BB_L11 |
| Taste in Product |  | PASS | Pass |
| Comment |  | FIG CONTROL clean; solventy; creamy; fruity | FIG TRIAL clean; solventy; creamy; fruity |
| Alcohol | % v/v | 4.87 | 4.87 |
| Specific Gravity (20/20) |  | 1.00626 | 1.00617 |
| Present Gravity | °P | 1.61 | 1.58 |
| Original Gravity | °P | 10.9 | 10.9 |
| Bitterness (Abs × 70) | Mg/L | 24.2 | 25.3 |
| Colour | EBC Units | 9.1 | 9.1 |
| pH |  | 4.16 | 4.16 |
| Carbon Dioxide | % w/v | 0.52 | 0.54 |
| Oxygen | Mg/L | 0.2 | 0.16 |
| Haze in Process | FTU ASBC | 33 | 22 |

Particle Size Distribution

Figure 18:
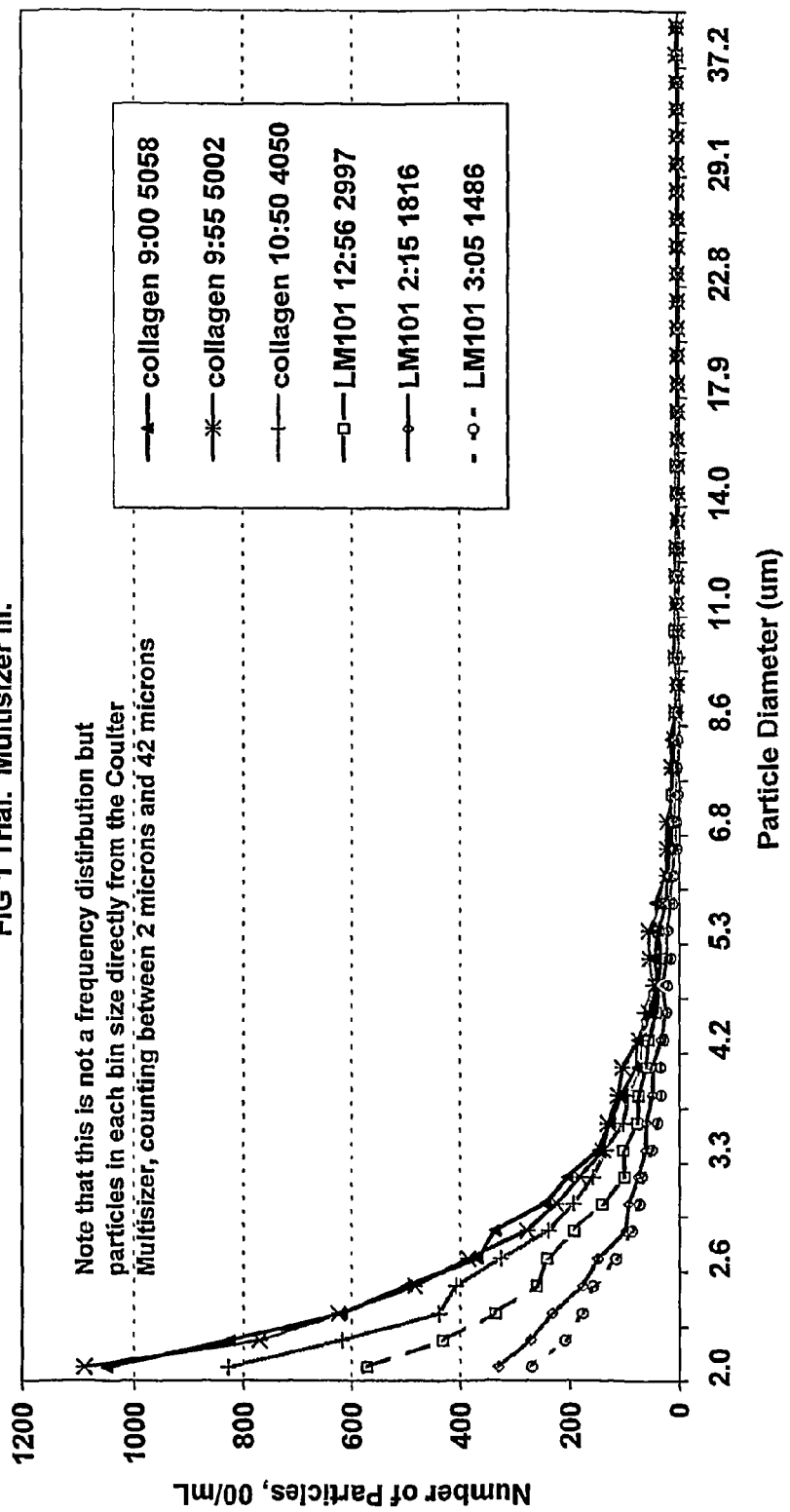
FIG. 18 is a chart showing particulate size distribution in storage beer for the collagen fined VB beer (control) and LM101 pectin fined VB beer. Three samples of each were analysed over a time period of 3-4 hours.

The particle size distribution was determined using a Coulter Multisizer III with a 70 micron tube, counting between 2 and 42 microns, and using Isoton II electrolyte (FIG. 18).

Three samples of each beer type were taken over a 3 hour period. The pectin-fined beer had a lower particle count initially and this decreased progressively over the period of sampling. The collagen-fined beer had a higher particle count for the equivalent time in storage and this also decreased progressively but not as obviously over the time period.

Laboratory Evaluation of Filterability

Samples of control and trial beer from the storage vessels were tested using the filterability rig described in FIG. 2. The results appear in Table 24, which shows laboratory estimation of filterability of the plant beers; LM101 pectin-fined beer, collagen-fined beer and an unfined beer for comparison. In Table 24 the filterability and the prefilter haze in a beer (with no finings), the collagen-treated control and the pectin treated-trial beer are compared. Haze values were obtained with a HACH 2100AN using ratio mode.

TABLE 24

|  | Finings treatment | | |
| --- | --- | --- | --- |
|  | Pectin LM101 finings | Collagen finings | No finings |
| Filterability sec/L^2 | 17.3 | 12.4 | 26.6 |
| Prefilter haze EBC units | 7.47 | 8.67 | 28 |

The filterability of the collagen treated beer was better in this test than the trial beer. This is in line with expectations, and is compatible with the data from the plant trial (FIGS. 16 and 17). The haze in the pectin-fined beer was lower than the collagen beer (c.f. Table 24 haze data for the laboratory filtered beers).
The reduced filterability of the pectin-beer compared to the collagen-fined beer in this trial may be caused by pectin residue in the beer as proposed in Example 11. This may be improved by the addition of hop extract, by increasing storage time and by avoiding overdosing of the pectin solution.

Plant Haze and Sulphur Dioxide Levels

Sulphur dioxide levels and haze levels were monitored during the trial. Table 25 presents the data for sulphur dioxide and haze levels in the pectin-fined storage beer presented to the finings dosing point from the centrifuges prior to dosing of finings. There was little difference in the beer being presented to the finings dosing point, with a slight increase in haze towards the end of the run.

TABLE 25

| Time (min) | Total SO$_2$ (mg/L) | Pre dosing haze (EBC, HACH 2100AN, ratio mode)) |
| --- | --- | --- |
| Start | 11 | 32 |
| 64 | 12 | 29.6 |
| 110 | 11 | 29.6 |
| 239 | 11 | 34.1 |
| 354 | 12 | 34.8 |

The turbidity of the emerging product from the filter was also monitored. The data is tabulated below (Table 26 which shows the inlet and the outlet turbidity of collagen-fined beer and pectin-fined beer). The pectin-fined beer is consistently lower in turbidity than that of the collagen-fined beer.

TABLE 26

| Filtration (min) | Inlet turbidity (EBC) | Outlet turbidity (EBC) |
| --- | --- | --- |
| Collagen Control run | | |
| Start | 16.7 | 0.57 |
| 5 | 15.2 | 0.75 |
| 110 | 14.1 | 0.77 |
| Pectin Trial Run | | |
| Start | 11.5 | 0.6 |
| 69 | 8.5 | 0.50 |
| 119 | 7.9 | 0.60 |

The data indicates that the beer from filtration for the trial was cleaner than the control. This is in line with the in-line haze meter and the haze in process data and particle size distribution data.

Figure 19:
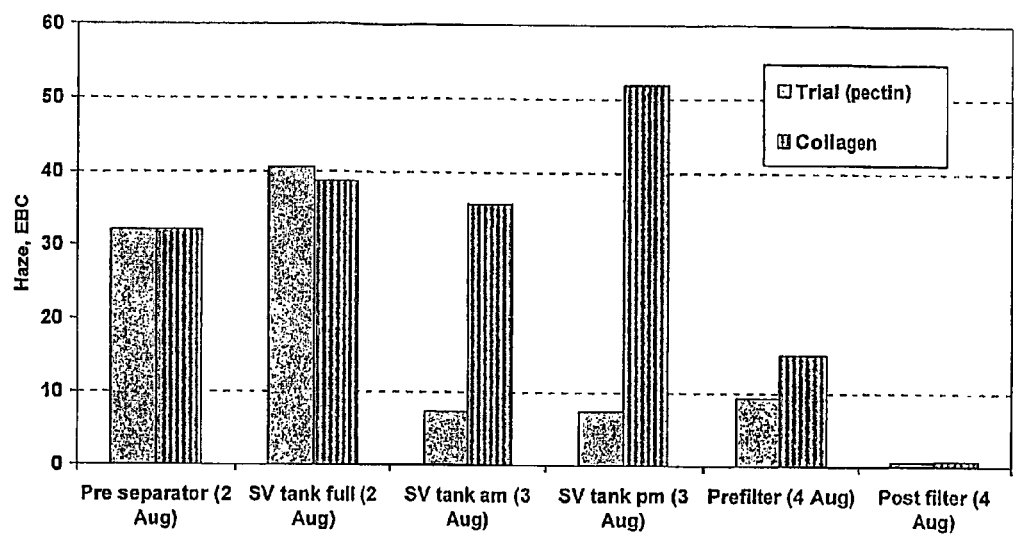
FIG. 19 charts haze profile in EBC units for collagen fined VB beer (control) and LM101 pectin fined beer (trial) at the following stages of the beer process—pre separator, storage tank initially and when full, storage tank after 24 hours, storage tank after 48 hours, pre filter and post filter.

The haze profile for trial and control beers at various stages after the beers had passed through the separator are shown in FIG. 19.

The haze profile during the process is in line with expectations. The pectin finings clarifies faster than the collagen finings and clarification is almost complete after 24 hours. The collagen finings takes 48 hours to achieve a similar haze result.

Figure 20:
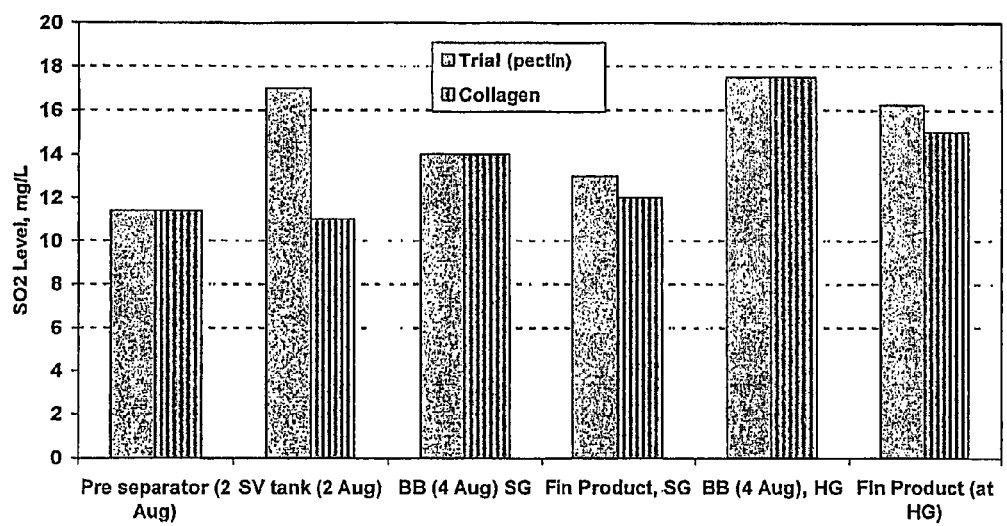
FIG. 20 charts sulphur dioxide in collagen fined VB beer (control) and LM101 pectin fined beer (trial) at the following stages of the beer process—pre separator, storage tank initially and when full, storage tank after 24 hours, storage tank after 48 hours, pre filter and post filter.

Similarly the sulphur dioxide profile was measured during the trial and is tabulated in FIG. 20. The trial finings contains a significant level of sulphur dioxide and an increase in sulphur dioxide level in storage was expected. The sulphur dioxide level increased from 11.3 mg/L to 16.8 mg/L, as compared to the control that showed no change from immediately after the separators. However bright beer, irrespective of finings treatment, exhibited the same sulphur dioxide level. Some sulphur dioxide, either natural or added, may be removed from the beer with the sediment in the storage tank by reaction with protein by sulphitolysis to produce sulphonic derivatives.

In Australia additions in excess of 10 ppm sulphur dioxide require mandatory labelling while the maximum level in beer is restricted to 25 ppm. If the present pectin finings formulation were classified as a process aid this would not apply. A process aid provides a technological function process and does not carry through to the final product. If it does not apply, the flexibility to add sulphur dioxide to beer will be restricted. If this is unacceptable the level of sulphur dioxide in the finings solution can be reduced as needed. There may be an accompanying decrease in efficiency but this will be dependent on the beer type.

Packaged Beer

Beer was packed off into 375 ml cans. The beer was analysed for brand character and sensory quality by a panel of expert tasters.

The tasting notes from the expert panel follow:
Trial cans (pectin fined): waxy, creamy, well-balanced, slightly dry, 7 (based on an 8 point system 1-8 in which 8 is exceptional example, 1 is unacceptable).
Control cans (collagen fined): slightly dirty, slightly thin, creamy, slightly sulphury, bitter, 6. There were no adverse issues identified by the expert taste panels in either beer.

The finished product analyses were comparable as shown in Table 27 which shows the analysis of cans of pectin-fined cans (Trial) and collagen-fined beer cans (Control).

TABLE 27

| Comment | | FIG Trial 1 (Cans) TRIAL (S11) | FIG Trial 1 (Cans) Control (S12) |
| --- | --- | --- | --- |
| Sample Number | | 100049 | 100051 |
| Sampled Date | | 8/08/2005 16:46 | 8/08/2005 16:46 |
| Process Stage | | FINAL | FINAL |
| Pack Type | | 375 C. | 375 C. |
| Alcohol | % v/v | 4.91 | 4.92 |
| Chill Haze Initial | FTU | 35 | 40 |
|  | ASBC | | |
| Carbon Dioxide | % w/v | 0.533 | 0.517 |
| Colour | EBC Units | 9.3 | 9.3 |
| Diacetyl | mg/L | 0.02 | 0.01 |
| Pentane dione | mg/L | 0.01 | 0.01 |
| Total Vicinal Diketones | mg/L | 0.03 | 0.02 |

TABLE 27-continued

| Comment | | FIG Trial 1 (Cans) TRIAL (S11) | FIG Trial 1 (Cans) Control (S12) |
|---|---|---|---|
| Head Retention - Nibem | secs | 235 | 238 |
| Calcium | mg/L | 31 | 31 |
| Copper | mg/L | 0.03 | 0.03 |
| Iron | mg/L | 0.04 | 0.03 |
| Magnesium | mg/L | 58 | 58 |
| Potassium | mg/L | 364 | 365 |
| Sodium | mg/L | 73 | 70 |
| Chloride | mg/L | 211 | 213 |
| Sulphate | mg/L | 175 | 177 |
| Bitterness (Abs × 70) | mg/L | 24.4 | 23.9 |
| Original Gravity | °P | 10.9 | 10.9 |
| Present Gravity | °P | 1.59 | 1.59 |
| Ph | | 4.11 | 4.11 |
| Comment | | some small PM present | some small PM present |
| Particulate Matter Initial | | PASS | PASS |
| Real Extract | °P | 3.41 | 3.41 |
| Specific Gravity (20/20) | | 1.00621 | 1.00618 |
| Free Dimethyl sulphide | µg/L | 12 | 11 |
| Hydrogen sulphide | µg/L | 2 | 3 |
| Methane thiol | µg/L | 1 | 1 |
| Ethyl Acetate | mg/L | 20.4 | 18.2 |
| Ethyl Hexonate | mg/L | 0.2 | 0.2 |
| Ethyl Octonate | mg/L | 0.56 | 0.51 |
| Iso Amyl Acetate | mg/L | 2.13 | 2.08 |
| Phenyl Ethyl Acetate | mg/L | 0.93 | 0.77 |
| Total Esters | mg/L | 24.2 | 21.8 |
| Iso Amyl Alcohol | mg/L | 75.8 | 73.4 |
| Iso Butanol | mg/L | 16.6 | 16.1 |
| n Propanol | mg/L | 13.3 | 12.5 |
| Phenyl Ethyl Alcohol | mg/L | 40.2 | 34.2 |
| Total Alcohols | mg/L | 145.9 | 136.2 |
| Alcohol/Ester Ratio | | 6.03 | 6.25 |
| Total sulphur Dioxide | mg/L | 13 | 12 |

There is no significant change in any of the analyses.

Flavour Stability

Electron Spin Resonance based measurement of hydroxyl radical formation (PBN as the free radical capture agent) showed that pectin treated beer exhibited a longer lag time than the control beer, treated with collagen (Table 28). This difference was maintained after 14 and 28 days storage of cans at a temperature of 30° C. The lag time calculated from the ESR data is believed to be related to the antioxidant potential of the beer. The longer the lag time, referred to as Ea, the greater the antioxidant potential of the beer. If so, the pectin treated beer is showing a greater anti-oxidant potential than the control.

TABLE 28

| Sample | Days after packaging at 30° C. | ESR lag time (min) | Total SO$_2$ (mg/L) | Furfural (microgram/L) |
|---|---|---|---|---|
| Trial-pectin finings beer | 0 | 112 | 15 | — |
| | 14 | 85 | 10 | 24 |
| | 28 | 90 | 11 | 46 |
| Control-Collagen finings beer | 0 | 80 | 18 | — |
| | 14 | 70 | 9 | 38 |
| | 28 | 79 | 10 | 79 |

The increase in furfural level can be ascribed to the trial beer being able to handle heat stress better than the control.

Aged Flavour Assessment Protocol

Aged flavour assessment was carried by a group of experienced tasters:

Three beers were presented:
Trial beer after storage in a 30° C. hot room for 2 weeks
Control beer stored under the same conditions
A "fresh" beer—taken from recent production at Abbotsford.

Panellists were asked to rate various aged parameters, based on the Flavour Stability Wheel as drafted by the EBC Sensory Subgroup. A 0-5 scale was used where 0 indicated not detected and 5 was intense. The panellists were then asked to rate (1-5 scale with 1=not aged, and 5=very aged) and rank the beers on an aged scale (1=least aged, 3=most aged). Panellists were asked for any flavour comments. Standard statistical analyses were carried out to identify significant differences.

Ranking Taste Test Evaluation

The ranking taste test evaluation was undertaken as usually applied in the industry. The data are shown in the following table (Table 29—Ranking Taste Test evaluation data (Note 1=least aged, 3=most aged)). The data was analysed in terms of criteria blocks.

TABLE 29

| Taster | Pectin LM101 (2 weeks 30° C.) beer - can | Collagen (2 weeks 30° C.) beer - can | Fresh beer - can |
|---|---|---|---|
| 1 | 1 | 3 | 2 |
| 2 | 3 | 2 | 1 |
| 3 | 2 | 3 | 1 |
| 4 | 2 | 3 | 1 |
| 5 | 1 | 3 | 2 |
| 6 | 1 | 2 | 3 |
| Rank sums | 10 | 16 | 10 |
| Average | 1.67 | 2.67 | 1.67 |

The analysis of the Ranking Taste Test data are shown in Table 30—Ranking Taste Test Evaluation (1-5 scale with 1=not aged, 5=very aged). The conclusion is that there is no significant difference or preference between the 3 beer samples.

TABLE 30

| | Alpha (5%) | Alpha (1%) | F (Friedman's test) |
|---|---|---|---|
| Criteria block | 5.99 | 9.21 | 4 |

Rate Taste Test Evaluation

Taste test data was analysed for preference. The results are summarised in the following Tables 31 and 32.

TABLE 31

| Taster | Pectin LM101 (2 weeks 30° C.) beer (A) | Collagen (2 weeks 30° C.) beer (B) | Fresh beer (C) |
|---|---|---|---|
| 1 | 1 | 2 | 1 |
| 2 | 2 | 3 | 1 |
| 3 | 2 | 3 | 1 |
| 4 | 2 | 3 | 1 |
| 5 | 1 | 2 | 1 |
| 6 | 1 | 3 | 4 |
| Sum | 9 | 16 | 9 |

The analysis of the data is summarised below (Table 32).

TABLE 32

|   | A-B | B-C | A-C |
|---|---|---|---|
| 1 | −1 | 1 | 0 |
| 2 | −1 | 2 | 1 |
| 3 | −1 | 2 | 1 |
| 4 | −1 | 2 | 1 |
| 5 | −1 | 1 | 0 |
| 6 | −2 | −1 | −3 |
| Sum | −7 | 7 | 0 |
| Average | −1.17 | 1.17 | 0.00 |
| Std Dev, s | 0.408 | 1.169 | 1.549 |
| Student's statistic | −7.00 | 2.44 | 0.00 |
| % | 0.046% | 2.916% | 50.000% |

The analysis indicates that the expert panel regards the trial product similar to the fresh beer and fresher than the control. The control beer was judged to be more aged than the fresh beer.

Figure 21:
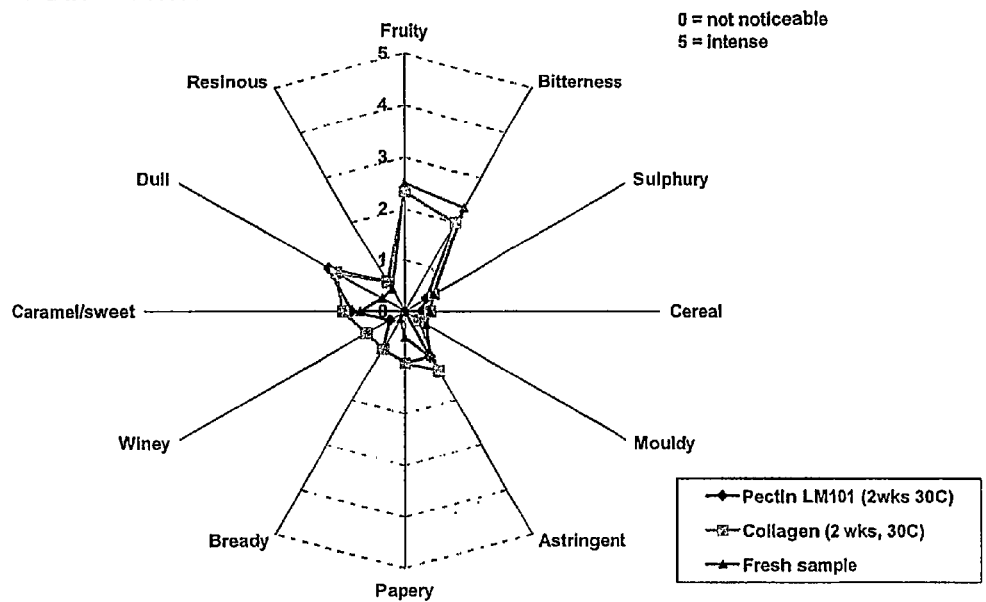
FIG. 21 shows a spider graph indicating flavour wheel character changes after aging for 2 weeks at 30° C. for collagen fined VB beer and LM101 pectin fined VB beer.

The flavour ratings from the expert panel have been summarised in the accompanying spider graph (FIG. 21), along with the unforced flavour comments (Table 33—Tasting panel descriptors for the collagen-fined, and pectin-fined beers and a fresh sample of beer for reference).

TABLE 33

| SAMPLE Panellist | Pectin LM101 (2 wks 30 C.) | Collagen (2 wks, 30 C.) | Fresh sample |
|---|---|---|---|
| 1 | All similar - none particularly aged | | |
| 2 | Dull | sulphury Dull | Fresh |
| 3 | Slightly cooked aroma, lowish ester nose | Lowish esters soft and more bland palate (diacetyl), slightly sweet | Estery on nose and palate, crisp bitter, slightly resinous |
| 4 | slightly harsh and astringent, slightly dull and aged | Slightly harsh and astringent, slightly oxidised + dry/resinous, slightly sweet | v slightly age, v slightly astringent |
| 5 | No noticeable aged aroma, no noticeable aged flavour | Slightly barley sugar nose, but not obvious aged aroma. Slightly aged flavour but barely noticeable | No noticeable aged aroma |
| 6 | Grainy, husky-dusty, straw | Papery, cardboard, biscuits, dough, bread crust, bread | Leathery, papery |

Taken together the results show a trend that the trial beer (pectin) is aging better than the Collagen control.

The ESR results (lag time) are a measure of flavour stability, and show a similar trend with the trial beer having a higher value. Thus this trial indicates that pectin-based finings can clarify high gravity beer after relatively short storage times. Filtration of pectin-fined beer is within the limits of acceptable practice and can be optimised to best practice performance. Packaged cans of pectin fined beer show no sensory defects compared to collagen fined beer in the trial. Pectin fined beers appear to age better than the collagen fined beer used in this trial.

Example 16

Plant Trial

Pectin—LM101 Based Finings Trial with a High Gravity Beer

A brewery trial was carried out with CP Kelco pectin based-finings (LM101) with a high gravity beer (OG 14° P). A total 400 hL of beer was dosed with LM101 pectin-finings under the same dosing conditions as in Example 15. A second fermenter of the same beer acted as the control beer, which was dosed with collagen finings. The details of the trial were the same as those outlined in Example 15.

Filtration Assessment

Figure 22:
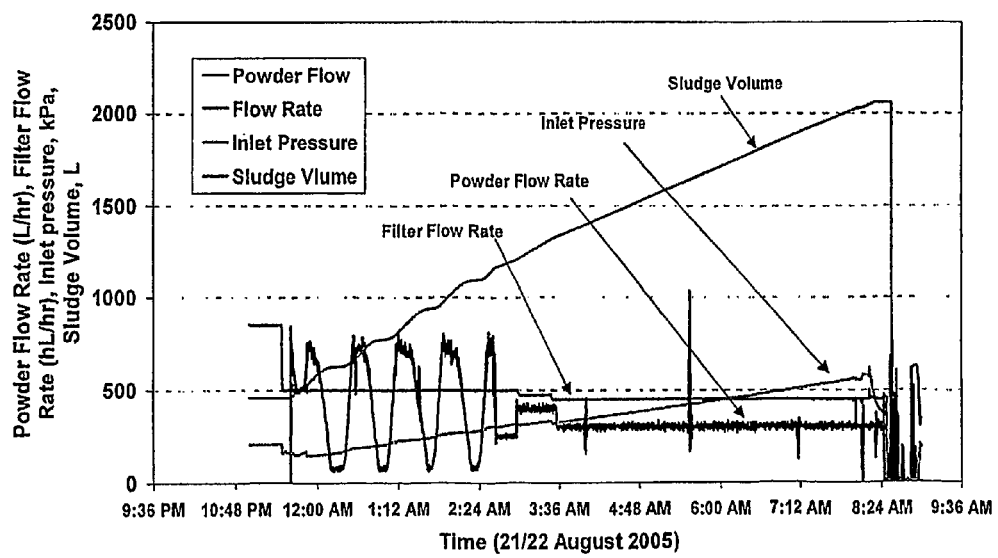
FIG. 22 shows LM101 pectin dosed VB beer filtration variables.
Figure 23:
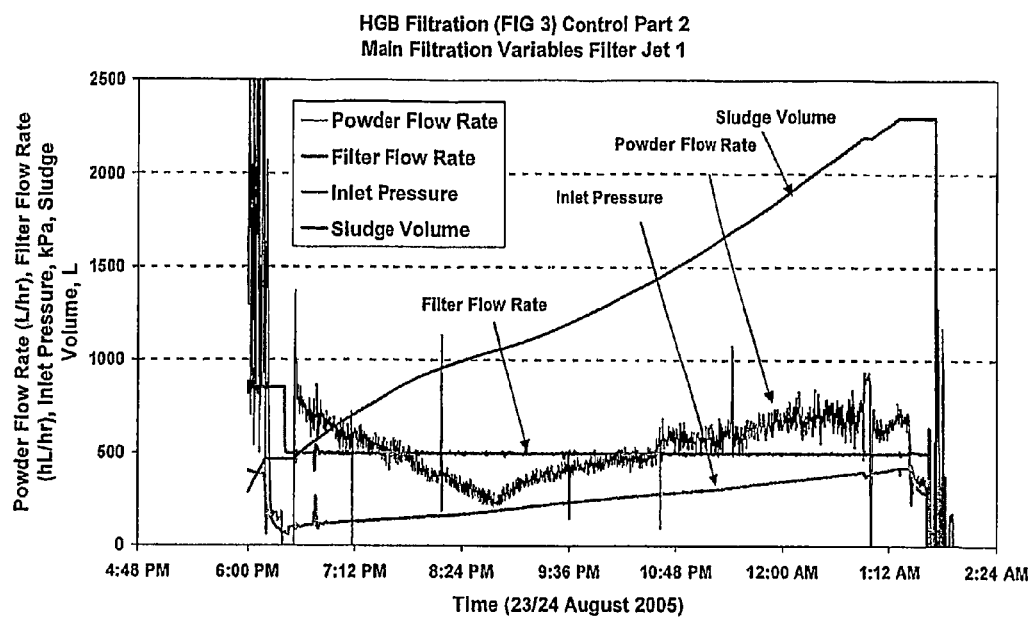
FIG. 23 shows bovine collagen dosed VB beer filtration variables.

The pectin-treated beer filtration data are shown in FIG. 22 for the LM101 pectin-fined beer. The control was filtered in two parts, with data for the second part of the control beer (collagen-fined) shown in FIG. 23.

The filter aid powder dosing rate was controlled by a fuzzy logic controller (Autodose), with rate of pressure increase and turbidity as the main inputs. The rate of pressure increase for the trial was 46 kPa/hr with a powder dose rate of 24 g/hL.

For the second part of the control the average rate of pressure increase was 36 kPa/hr with a powder dose rate of 32 g/hL.

Bright Beer Tank Assessment

The trial beer was held in three tanks. The sensory notes form the expert brewers' tasting panel were as follows:

| Tank 1 | estery, bitter, full |
| Tank 2 | waxy, fruity, solvent-like, slight butter note and after taste |
| Tank 3 | waxy, fruity, bitter |

The comments for similar products at the time were: waxy, sweet, solventy, slight astringency, slightly dry, fruity, grainy, dusty, slight sulphur, full, candy-like. The national sensory group also assessed samples of the 3 trial tanks on the day of release. Their comments were as follows:

| Tank 1 | clean, slightly estery, good beer character |
| Tank 2 | slightly fruitier, otherwise very similar |
| Tank 3 | clean, fruity. Estery, slightly powdery |

The sensory panel assessed the trial beer as acceptable for the brand type.

Haze and Sulphur Dioxide Profiles of Beer in Process

Before finings addition, the feed beer for the pectin addition has a sulphur dioxide level of 11 mg/hL with a haze of 35 EBC units. After dosing of the LM101 pectin-based finings the haze dropped to 11 EBC after approximately 24 hours. The post filter haze readings in feed and exiting LM101 pectin fined beer are shown in Table 34.

TABLE 34

| Time min | Haze in (EBC) | Haze out (EBC) | Vol passed hL |
|---|---|---|---|
| Start | 12.5 | 0.75 | 300 |
| 70 | 14.1 | 0.51 | 1000 |
| 155 | 13.7 | 0.51 | 2000 |
| 255 | 14.3 | 0.48 | 3000 |
| 380 | 14.4 | 0.49 | 4000 |

Figure 24:
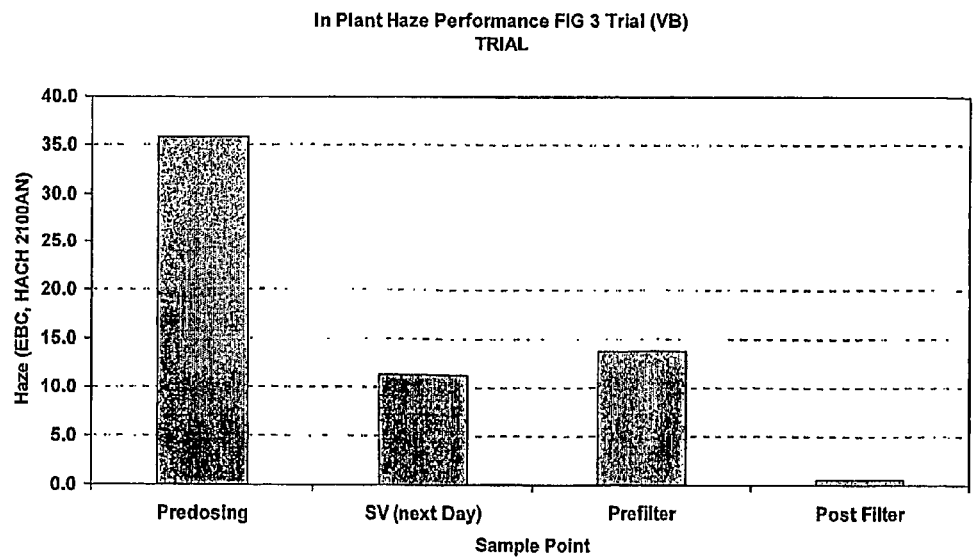
FIG. 24 shows product haze (EBC) at various stages of the process for the LM101 pectin fined VB trial beer.
Figure 25:
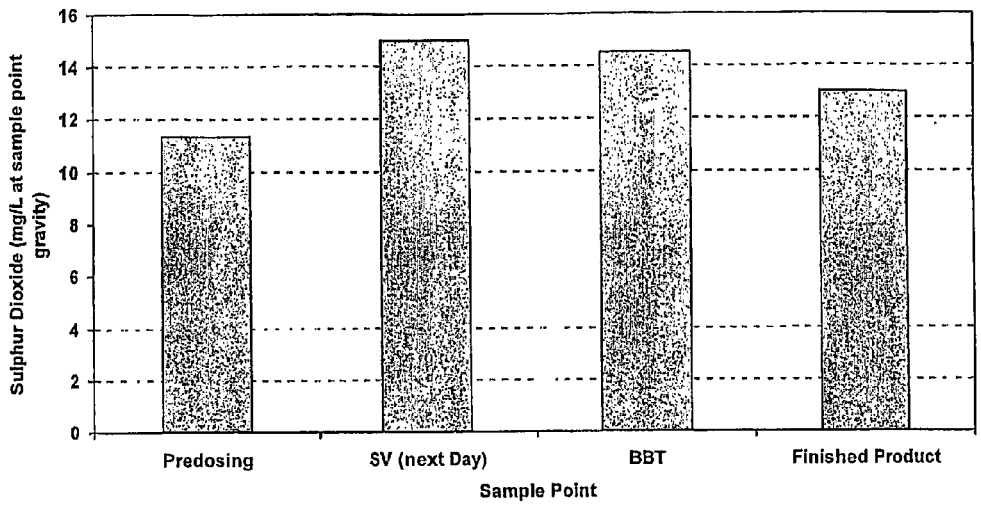
FIG. 25 shows sulphur dioxide at various stages of the process for the LM101 pectin fined VB trial beer.

The haze profile through the process to post filter is shown in FIG. 24. After 24 hours in storage the turbidity had stabilised. There was a slight increase in haze immediately before the filter due presumably to transfers. The post filter haze was very low (0.5 EBC).

sulphur dioxide levels in the predosing feed were 11 mg/L. After the addition of the pectin finings solution the level reached 15 mg/L, and then declined to 13 mg/L in the finished product (FIG. 25).

Packaged Beer

Beer was packaged off into 375 ml cans. The beer was analysed for brand character analytes (Table 35) and sensory quality by a panel of expert tasters.

TABLE 35

| | | TRIAL (cans) | Control (cans) |
|---|---|---|---|
| Sample Number | | 108184 | 108820 |
| Sampled Date | | 23/08/2005 16:46 | 23/08/2005 16:46 |
| Process Stage | | FINAL | FINAL |
| Pack Type | | 375C | 375C |
| Alcohol | % v/v | 4.9 | 4.96 |
| Chill Haze Initial | FTU ASBC | 45 | 50 |
| Chill Haze - Forced | FTU ASBC | 120 | 125 |
| Carbon Dioxide | % w/v | 0.518 | 0.53 |
| Colour | EBC Units | 9 | 9.2 |
| Diacetyl | mg/L | 0.03 | 0.01 |
| Pentane dione | mg/L | 0.02 | 0.01 |
| Total vicinal di ketone | mg/L | 0.05 | 0.02 |
| Head Retention - Nibem | secs | 233 | 233 |
| Calcium | mg/L | 34 | 30 |
| Copper | mg/L | 0.04 | 0.03 |
| Iron | mg/L | 0.04 | 0.03 |
| Magnesium | mg/L | 56 | 59 |
| Potassium | mg/L | 366 | 371 |
| Sodium | mg/L | 72 | 63 |
| Chloride | mg/L | 209 | 208 |
| Sulphate | mg/L | 178 | 162 |
| Bitterness (Abs × 70) | mg/L | 25.2 | 24.9 |
| Original Gravity | °P | 10.9 | 11.1 |
| Present Gravity | °P | 1.6 | 1.72 |
| pH | | 4.07 | 4.12 |
| Comment | | some small PM present | some small PM present |
| Particulate Matter Initial | | PASS | PASS |
| Real Extract | °P | 3.42 | 3.55 |
| Specific Gravity (20/20) | | 1.00625 | 1.00669 |
| Free Di Methyl Sulphide | µg/L | 14 | 14 |
| H2S | µg/L | 2 | 2 |
| Methane thiol | µg/L | 1 | 1 |

TABLE 35-continued

| | | TRIAL (cans) | Control (cans) |
|---|---|---|---|
| Ethyl Hexonate | mg/L | 0.22 | 0.21 |
| Ethyl Acetate | mg/L | 20.1 | 18.2 |
| Ethyl Octonate | mg/L | 0.39 | 0.53 |
| Iso Amyl Acetate | mg/L | 2.5 | 2.22 |
| Phenyl Ethyl Acetate | mg/L | 1.21 | 0.96 |
| Total Esters | mg/L | 24.4 | 22.1 |
| Iso Amyl Alcohol | mg/L | 87.3 | 68.9 |
| Iso Butanol | mg/L | 20.9 | 18.4 |
| n Propanol | mg/L | 15.2 | 12.6 |
| Phenyl Ethyl Alcohol | mg/L | 43.9 | 44 |
| Total Alcohols | mg/L | 167.3 | 143.9 |
| Ratio | | 6.86 | 6.51 |
| Total Sulphur Dioxide | mg/L | 13 | 11 |

It was concluded that there were no significant discrepancies between the control and the trial beers.

An expert sensory panel also assessed the beers. The trial beer was rated estery, slightly dull, soft, resinous, and received a rating or 6 using the standard reference chart referred to in Example 15. The control beer was rated resinous, dry, slightly harsh and was also rated 6.

In summary, this trial which treated twice the volume used in Example 15, but used a separate fermenter beer as the trial, confirmed the findings from example 15. The pectin treated beer in this trial however filtered better than in the former, and the filtration performance approached the very high performance standard of the collagen fined beer. There were no adverse sensory effects, and again the sensory evaluation as well as the ESr predictive tests, and sensory tests of storage beer indicate that the pectin finings provide some sensory stability benefit.

Example 17

Plant Trial

LM101 Pectin-Based Finings Trial with a Ultra High Gravity Beer

Process

An Ultra High Gravity beer, nominally 18° P Original Gravity, was treated with LM101 pectin-finings, and with collagen finings. A 200 hL fermenter served for each of the control (collagen finings) and the trial (pectin finings). The conditions of finings preparation and dosing were described in Example 15. The dosing levels for the collagen finings were the same as those used in Example 15. The pectin finings was dosed at 1.6 g active pectin/hL at fermenter gravity.

Storage Tank Assessment

Both the trial and the control beers were each held in two horizontal storage vessels. The analytical data for the storage tanks are shown in Table 36. There were no significant differences between the two beers.

TABLE 36

| Comment | | Collagen-fined | Collagen-fined | Pectin-fined LM101 | Pectin-fined LM101 |
|---|---|---|---|---|---|
| Sample Number | | 100917 | 100954 | 100540 | 100675 |
| Sampled Date | | 9/08/2005 16:29 | 9/08/2005 18:14 | 9/08/2005 10:32 | 9/08/2005 12:05 |
| Sampling Location | | ST_N14 | ST_N17 | ST_N26 | ST_N27 |
| From Location 1 | | FVB03 | FVB03 | FVB08 | FVB08 |
| Alcohol | % v/v | 6.51 | 6.5 | 6.41 | 6.49 |
| Specific Gravity (20/20) | | 1.02316 | 1.02307 | 1.02273 | 1.02306 |

TABLE 36-continued

| Comment | | Collagen-fined | Collagen-fined | Pectin-fined LM101 | Pectin-fined LM101 |
|---|---|---|---|---|---|
| Present Gravity | °P | 5.86 | 5.84 | 5.76 | 5.84 |
| Original Gravity | °P | 17.7 | 17.6 | 17.4 | 17.6 |
| Bitterness (Abs × 50) | BU | 17.4 | 17.3 | 16.5 | 16.5 |
| Colour | EBC | 25.4 | 25 | 26.4 | 26.8 |
| pH | Units | 4.22 | 4.22 | 4.27 | 4.26 |
| Total Sulphur Dioxide | mg/L | 14 | 13 | 15 | 15 |
| Oxygen | mg/L | 0.15 | 0.17 | 0.15 | 0.13 |
| Taste in Product | | PASS | PASS | PASS | PASS |

The tasting comments (sensory descriptors) for samples removed from the trial and the test beer storage tanks are set out in Table 37.

TABLE 37

| | Taste Comments |
|---|---|
| Collagen fined | Sweet, caramel, estery |
| Collagen fined | Sulphur, caramel, estery |
| LM 101 pectin fined | Lacks sweetness, dry, "phenolic". Slight sulphur, "very dry" |
| LM 101 pectin fined | Overripe fruity, lacks esters, unbalanced, dry |

The sensory panellists noted differences between the two beers. However this was ascribed to variation in the quality of the two fermenters chosen for the study, rather than differences due to the finings. The differences were in keeping with previously noted variation between fermenters at this stage of the process. The beers were regarded as true to type and considered to be consistent with brand character.

The trial sample was dosed with one third the rate of pectin used in Example 15 (1.6 g/hL versus 4.94 g/hL). The level of introduced sulphur dioxide was correspondingly lower at approximately 1.3 mg/L (at sales gravity). The dose rate in the filter room of the sulphur dioxide source was adjusted to meet an overall requirement of a maximum addition level of 8 mg/L.

Laboratory Filterability

Figure 26:
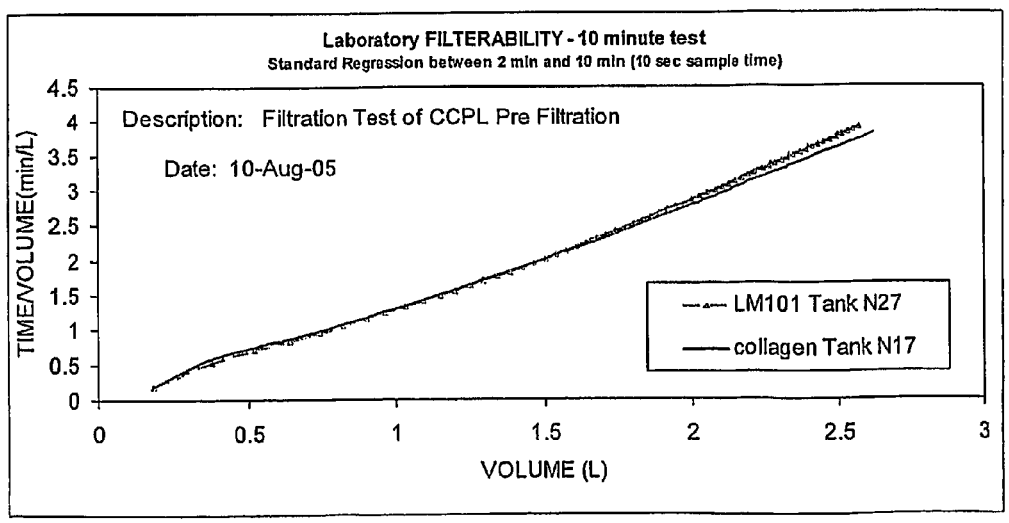
FIG. 26 shows the filterability of LM101 pectin fined and collagen fined (control) CCLP beer samples removed from the storage tanks during the plant trial.

The filterability of the storage tank beers was tested using the laboratory rig described in Example 12. The data are shown in Table 38. The filterability of the two beers is comparable. This is evident in FIG. 26 that shows the graphical comparison for the filterability of these beers.

TABLE 38

| | | Pectin-fined beer | Collagen-fined beer |
|---|---|---|---|
| Filterability | (sec/L^2) | 104.6 | 95.9 |
| Pre Filter Haze | EBC | 47.9 | 67.8 |
| Post Filter Haze | EBC | 1.95 | 2.05 |

Figure 27:
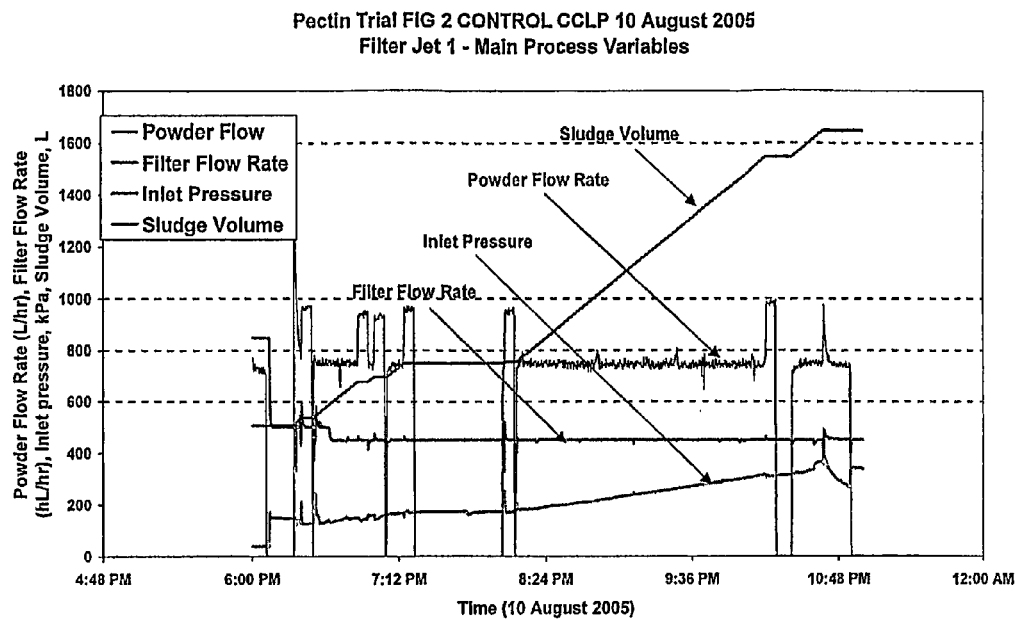
FIG. 27 shows main filtration variables for LM101 pectin fined CCLP beer.
Figure 28:
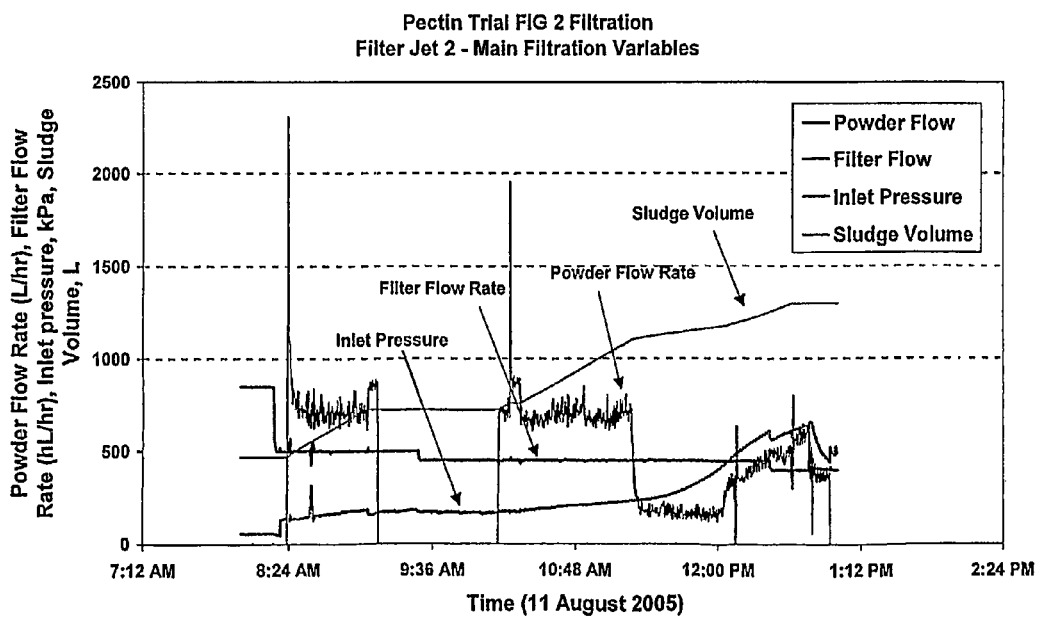
FIG. 28 shows main filtration variables for bovine collagen (control) fined CCLP beer.

Trend Charts for the trial and the control beers are reported in FIGS. 27 and 28 and were used to determine body feed usage and the rate of pressure increase.

The plant filterability is summarised in Table 39.

TABLE 39

| | CONTROL (Collagen) | TRIAL (pectin) - Autodose control |
|---|---|---|
| Rate of pressure increase | 102 kPa/h | 43.3 kPa/hr |
| Average powder dosing rate | 46 g/hL | 44 g/hL |

During the trial filtration, the filter management control changed. Towards the end of the trial, this resulted in a reduction in powder dosing rate and a corresponding increase in rate of pressure increase. The control logic was not able to recover and the filter went out on high pressure. The trial data in Table 39 are the results for the period the filter was under the fuzzy logic Autodose control.

During this phase of the trial, for comparable filter aid dosing levels, the rate of pressure increase for the trial (pectin) was significantly below that for the collagen treated beer.

Bright Beer Tank Assessment

The two beers were filtered after 48 hours of storage as described in Example 15.

Analysis of bright beer tank samples for the collagen-fined UHG beer and the LM101 pectin-fined UHG beer as shown in Table 40 indicates that the analytical data for the two beers recovered from the bright beer tanks are comparable.

TABLE 40

| Comment | | Collagen Fined | Pectin LM101 fined |
|---|---|---|---|
| Sample Number | | 101854 | 102091 |
| Sampled Date | | 10/08/2005 21:08 | 11/08/2005 8:38 |
| Sample Type | | BRGT_GEN | BRGT_GEN |
| Sampling Location | | BB_L06 | BB_M04 |
| Alcohol | % v/v | 2.77 | 2.76 |
| Specific Gravity (20/20) | | 1.00986 | 1.00976 |
| Present Gravity | °P | 2.52 | 2.5 |
| Original Gravity | °P | 7.9 | 7.8 |
| Bitterness (Abs × 70) | Mg/L | 23.7 | 23.9 |
| Colour | EBC Units | 11 | 10.8 |
| pH | | 4.32 | 4.34 |
| Carbon Dioxide | % w/v | 0.53 | 0.525 |
| Oxygen | Mg/L | 0.2 | 0.15 |
| Total Sulphur Dioxide | Mg/L | 12 | 9 |
| Haze in Process | FTU ASBC | 37 | 37 |
| Taste in Product | | PASS | PASS |
| Comment | | CONTROL toasty; slightly hoppy | TRIAL slightly sulphury; dry; roasty; coconut; only slightly hoppy |

Haze and Sulphur Dioxide Profile

Haze in both trial and control beers were similar, and pre-filter slightly less for the pectin-fined beer. Sulphur dioxide levels peaked in storage, with the pectin beer about 15 mg/L versus 13.5 mg/L for the control.

In the finished product the sulphur dioxide levels was 12 mg/L for the pectin trial beer and 14 mg/L for the control.

At the filtration point, the sulphur dioxide levels were similar as shown in Table 41 (sulphur dioxide levels in collagen-fined UHG beer and the LM101 pectin-fined UHG beer post filtration).

TABLE 41

| Stage | Pectin treated beer sulphur dioxide, mg/L | Collagen treated —beer sulphur dioxide, mg/L |
|---|---|---|
| Post Filtration - line sample Amount Filtered (hL) | | |
| 300 | 12 | 10 |
| 900 | 12 | 13 |
| 1800 | 13 | 13 |
| BBT | 9 | 12 |

Figure 29:
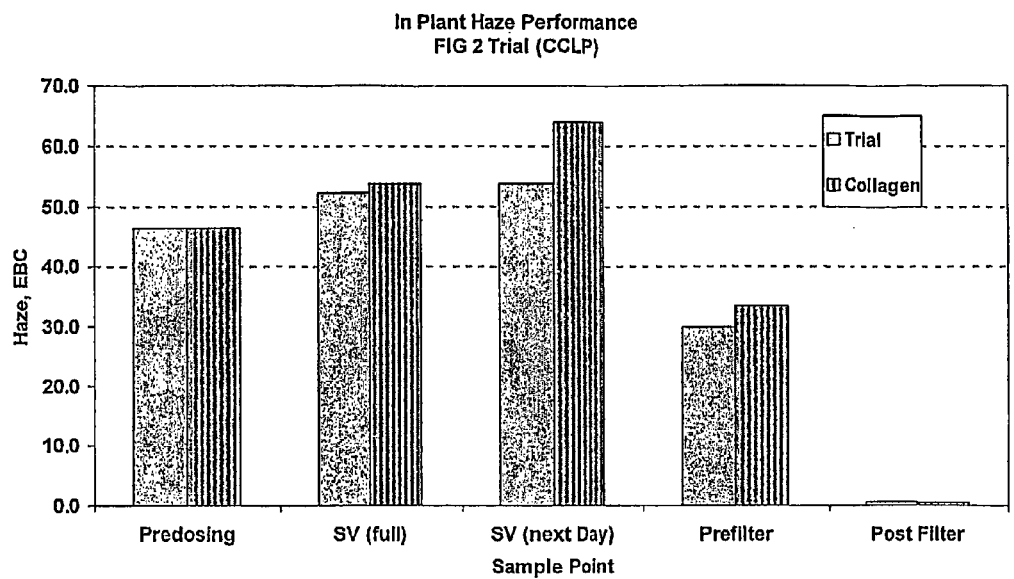
FIG. 29 charts plant haze performance: UHG CCLP beer; collagen (control) fined versus LM101 pectin (trial) fined beer.
Figure 30:
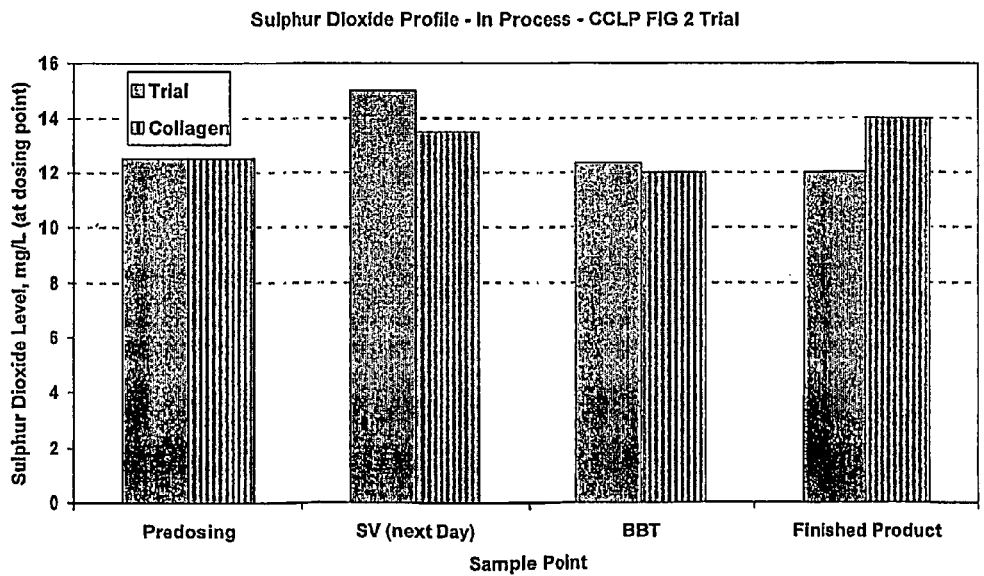
FIG. 30 shows sulphur dioxide in process: UHG CCLP beer; collagen (control) fined versus LM101 pectin (trial) fined beer.

The plant haze data post-finings dosing are summarised in FIGS. 29 and 30.

In Process Comparison—Flavour and Ionics

An expert brewers taste panel (National) evaluated samples of the bright beer tanks. The comments of the taste panel were as follows:

| | |
|---|---|
| Trial beer (LM101 pectin-fined) | Lacked hops on the nose, some on the palate, clean, ionic - rating 5 (rating described in Example 15) |
| Control beer (Collagen-fined) | Less hops on nose, more on palate, floral plastic, rating 5 |

Samples of the trial and the test beers were tasted by the expert sensory panel on a second day and the comments were as follows:

| | |
|---|---|
| Trial beer (LM101 pectin-fined) | slightly sweet, good esters, slightly plastic finish, slightly hoppy aroma, hoppy pallet. Dry finish - rating 6. |
| Control beer (Collagen-fined) | lower apparent esters, thin, lacked hops, dull, slight sulphur, falls away - rating 5. |

The sensory defects were judged to be process related rather than associated with the difference in finings used for the trial and the control beers.

Both beers (Bright Beer Tanks) were analysed for ionics (Table 42).

TABLE 42

| | Collagen | Pectin |
|---|---|---|
| Iron | 0.04 | 0.04 |
| Copper | 0.03 | 0.04 |
| Calcium | 29 | 33 |
| Magnesium | 71 | 71 |
| Sodium | 70 | 78 |
| Potassium | 377 | 389 |

The ionics for both the collagen and the LM1010-fined beers are comparable.

Finished Product—Analytical

Table 43 is a comparison of the standard analytical analyses for the trial and control finished product. No significant differences were noted.

TABLE 43

| Comment | | Bottles - TRIAL (pectin) | Bottles - CONTROL (Collagen) |
|---|---|---|---|
| Sample Number | | 103422 | 103424 |
| Sampled Date | | 8/08/2005 16:46 | 8/08/2005 16:46 |
| Process Stage | | FINAL | FINAL |
| Pack Type | | 375B | 375B |
| Alcohol | % v/v | 2.77 | 2.79 |
| Chill Haze Initial | FTU ASBC | 30 | 30 |
| Chill Haze - Forced | FTU ASBC | 75 | 115 |
| Carbon Dioxide | % w/v | 0.542 | 0.53 |
| Colour | EBC Units | 10.7 | 10.8 |
| Free Diacetyl | mg/L | 0.01 | 0.01 |
| Free Pentane dione | mg/L | 0.01 | 0.01 |
| Free Total Vicinal Diketones | mg/L | 0.02 | 0.02 |
| Head Retention - Nibem | secs | 302 | 295 |
| Calcium | mg/L | 22 | 23 |
| Copper | mg/L | 0.03 | 0.04 |
| Iron | mg/L | 0.04 | 0.03 |
| Magnesium | mg/L | 50 | 47 |
| Potassium | mg/L | 271 | 262 |
| Sodium | mg/L | 54 | 55 |
| Chloride | mg/L | 175 | 176 |
| sulphate | mg/L | 129 | 134 |
| Bitterness (Abs × 70) | mg/L | 23.2 | 23.9 |
| Original Gravity | °P | 7.8 | 7.9 |
| Present Gravity | °P | 2.47 | 2.51 |
| pH | | 4.31 | 4.28 |
| Particulate Matter Initial | | PASS | PASS |
| Real Extract | °P | 3.52 | 3.56 |
| Specific Gravity (20/20) | | 1.00966 | 1.00982 |
| Free Di Methyl sulphide | µg/L | 10 | 11 |
| Hydrogen sulphide | µg/L | 1 | 1 |
| Methane thiol | µg/L | 1 | 1 |
| Ethyl Acetate | mg/L | 10.2 | 10.8 |
| Ethyl Hexonate | mg/L | 0.05 | 0.05 |
| Ethyl Octonate | mg/L | 0.13 | 0.1 |
| Iso Amyl Acetate | mg/L | 0.54 | 0.52 |
| Phenyl Ethyl Acetate | mg/L | 0.44 | 0.4 |
| Total Esters | mg/L | 11.4 | 11.9 |
| Phenyl Ethyl Alcohol | mg/L | 20.8 | 19.5 |
| Iso Amyl Alcohol | mg/L | 33.8 | 28.6 |
| Iso Butanol | mg/L | 6.3 | 5.4 |
| n Propanol | mg/L | 6.1 | 5.1 |
| Total Higher Alcohols | mg/L | 67 | 58.6 |
| Higher Alcohol/ester ratio | | 5.88 | 4.92 |
| Total sulphur Dioxide | mg/L | 12 | 14 |

Flavour Assessment and Flavour Stability

The initial flavour assessment of the expert (National) sensory panel on the finished product is shown in Table 44.

TABLE 44

| | |
|---|---|
| LM 101 pectin-fined | citral, waxy, slightly hop, resinous, plastic, ionic, rating 6 |
| Collagen-fined | dusty, plastic, dull, resin, low hoppy palate, rating 5 |

The tasters referred to the range of variation in brand character. The present assessments were considered within the range of flavour and taste notes for this beer. The trial beer rated higher than the control. This shows a similar trend to that shown in Examples 15 and 16. The Ea values from ESR analysis, which measure hydroxyl radical suppression, are presented in Table 45.

TABLE 45

|  | ESR, Lag time (Ea), min | sulphur Dioxide, mg/L |
|---|---|---|
| Trial | 95 | 12 |
| Control | 85 | 14 |

The ESR Lag time (Ea) values are biased towards sulphur dioxide levels. Generally higher beer sulphur dioxide levels result in longer lag times. Based on these measurements the stability of the pectin-fined beer is the more stable of the two, which would not have been predicted from sulphur dioxide level alone.

Summary

Although the LM101 dosing rate of 1.6 mg/L applied in this example is not considered the optimum dosage rate, it still performed as well as the collagen finings. In fact, the sensory evaluation of the pectin fined finished beer was ahead of the collagen fined control. The stability of the pectin fined beer was better on predictive tests, and it appears that the pectin finings perform better in filtration than the collagen fined product.

Example 18

Laboratory and Plant Trials

Treatment of Ultra High Gravity Beer with Non-Amidinated Pectin Finings

Laboratory and plant trials were carried out with a non-amidated pectin finings and a high gravity beer (14P Original Gravity).

Pectin Solution Preparation

The apple pectin, AF702, is a non-amidated apple pectin supplied by Herbstreith & Fox. The pectin dosing solution was prepared as a mixture containing the pectin, sodium metabiite, sodium citrate and water as described in Example 9. The nominal concentration of the standardised pectin in the finings solution was 5% (wt/wt).

V is:

For 1000 L pectin (standardized) solution:
   50 kg pectin powder—AF702 supplied by H & F
   20 kg sodium citrate (no citric acid required)
   10 kg sodium (or potassium) metabisulphite
   950 L deionised water The made-up solution is slightly viscous, and light brown in colour. The level of active pectin was 78% based on the methods described in Example 15. The concentration of the finings solution was therefore 3.8% wt/wt based on active pectin.

Laboratory Filtration of Plant Dosed and Laboratory Dosed Beer

The trial was carried out with high gravity beer (14P Original Gravity) from a 4000 hL fermenter which was divided between control (collagen finings), and trial (AF702 Herbstrieth and Fox Gmb pectin finings). The beer was centrifuged as previously described in Example 15 before being dosed on the way to storage. The beers were held in storage for 48 hours.

Figure 31:
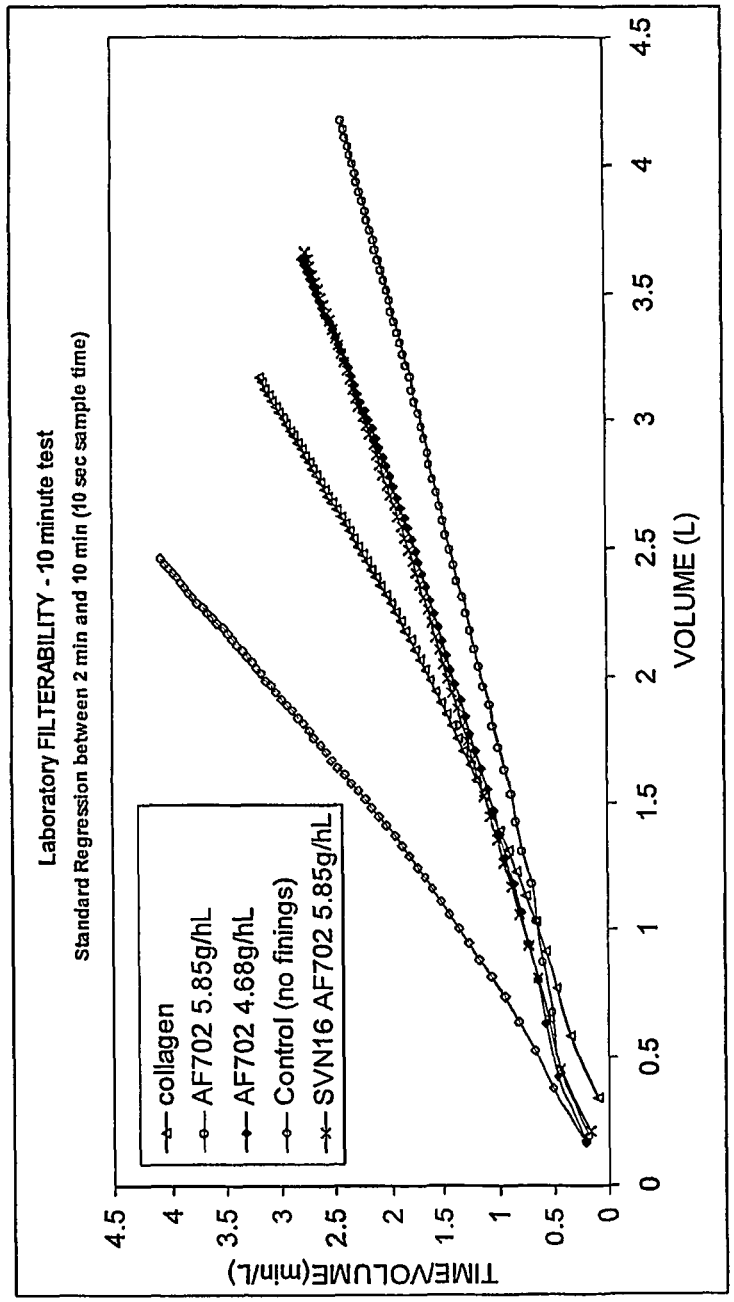
FIG. 31 shows laboratory filtration results using plant beer.

A sample of the pre-dosed beer was tested in the laboratory for filterability. The beer was dosed with finings, and after 48 hours, the filterability was measured (see Example 11 filterability description). The results are shown in FIG. 31. A plant sample (48 h in storage) was also included in the tests. Beer dosed with 60 and 75 ppm (4.68 and 5.85 g/hL respectively AF702-finings) had equivalent filterability, and both gave better results than the control. The plant storage tank sample showed the best filterability. Given the extreme plant mixing this is not surprising (Table 46).

TABLE 46

|  |  | Finings Regime | | | | |
|---|---|---|---|---|---|---|
|  |  | AF702 5.85 g/hL | Collagen at 200 mg/L* | Storage Vessel (AF702 at 5.85 g/hL) | AF702 4.68 g/hL | Control (no finings) |
| Filterability | (s/L^2) | 13.2 | 21.3 | 9.4 | 12.8 | 38.3 |
| Pre-Filter Haze | EBC | 2.97 | 21.90 | 7.23 | 6.02 | 45 |
| Post-Filter Haze | EBC | 0.78 | 1.21 | 0.88 | 1.01 | 1.25 |

*The concentration of collagen finings was 2% wt/wt.

Beers dosed with AF702 pectin shows better filterability than the beer dosed with the collagen. The collagen filterability was 21.3 s/L^2, while the control was 38.3 s/L^2. The filterbilities for the AF702 finings treated beer were 13.2 s/L^2 and 12.8 s/L^2 (5.85, 4.68 g/hL active pectin dose rate respectively). The pre-filter haze was very low for the AF702 finings beer at 5.85 g/hL at 2.97 EBC, whereas the trial haze was 21.9 EBC.

Plant dosed beer (Table 46, storage vessel) performed best in terms of filterability. The haze was similar to that of the laboratory beer that received 4.68 g/hL of pectin. There is therefore every likelihood that the dose rate could be reduced further.

Plant Filtration Data

A plant trial was carried based on the protocol outlined in Example 15. This filtration was at least as good as generally expected for the collagen based finings regime.

The data presented below is for a filtration run for the control at 2050 hL and the trial at 1759 hL.

The plant filtration data showed that the rate of pressure increase for the control beer was 68 kPa/h, and for the trial it was 41 kPa/h. The powder dose rate for the control was 40 g/hL, compared with the trial of 25 g/hL.

In this trial with ultra high gravity beer AF 702 finings performed even more effectively than the usual collagen finings.

Example 19

Protein Specificity of Pectin and Isinglass

Sulphite attenuates the activity of pectin finings, possibly through sulphitolysis, and possibly by affecting protein charge.

Sulphitolysis breaks disulphide linkages to form free thiols and charged sulphonates. Protein thiols are able to reform disulphide linkages by oxidation with molecular oxygen. When this happens there is a chance that different proteins will be coupled together and form larger aggregates. Intramolecular links could also form. These intramolecular bonds would not assist flocculation but protein-to-protein crosslinking probably would.

Thiols are known to be involved in the formation of particles in beer during storage. The more sulphite present in beer, in the presence of divalent cations such as $Fe^{++}$, the more likely this is. Perhaps the most reactive redox proteins end up in pectin flocs. It is also possible that other rather stable proteins, such as albumin that normally would not participate in floc formation do so because of exposed reactive thiols formed during sulphitolysis.

Floc proteins can be separated and stained for redox activity with thiol specific reagents. The proteins can be separated by one-dimensional or two-dimensional electrophoresis, and on the basis of charge and size. Hence it is possible to assess whether pectin flocs show preference for basic versus acidic proteins, small versus large proteins, or thiol-reactive versus thiol-inactive proteins.

Process

Processing of Samples

VB beers were treated with pectin finings with LM101, LM121, LMC710, or AF702 (1% w/w pectin dosing solution) and at 70 ppm, at 4° C., and allowed to stand for 48 h. The supernatants were decanted off the pellet. The pellet suspension, usually about 5% of the original beer volume was transferred to a centrifuge tube and centrifuged at 10,000 g for 5 min. The pellets were recovered after decanting off the top supernatant.

The floc pellets were resuspended in 1 ml of SDS (−) sample buffer (0.0625M Tris-Cl pH 6.8, 2% SDS, (−) no reductant present) containing 1 mM EDTA and extracted at room temperature for 15 min. The samples were then centrifuged at 14000 g for 15 mins. Supernatants were collected and stored as aliquots at −30° C. for later analysis.

Protein Estimation

Protein concentrations of floc pellet samples were determined using the Lowry procedure (BioRad).

Thiol Estimations

The Thiol concentration of the floc pellets was measured using the standard DTNB assay (5,5'-disthiol(2-nitrobenzoic acid)) (Pierce Biotechnology Instruments: Ellman Reagent, application no 22582).

MPB Labelling of Protein Thiols

Free protein thiols in the flocs were labelled with MPB ((N'-(3-maleimidylpropionyl)biocytin, Molecular Probes) a biotinylated derivative of N-ethylmaleimide NEM. It reacts specifically with free thiols resulting in the attachment of a biotin residue, which can be subsequently detected on Western Blots using avidin-peroxidase as the developing reagent.

Aliquots of the samples were adjusted to pH 8.0 by adding 1 part of 0.2M Sodium Phosphate Buffer, pH 8.0 per 5 parts of sample. MPB was immediately added to a concentration of 250 uM and the samples incubated at room temperature for 30 min. The excess MPB was the quenched by the addition of DTT to a final concentration of 1 mM and incubation for 15 min at room temperature. The MPB samples were then stored as aliquots at −30 C until analysed by SDS PAGE and Western Blot.

SDS PAGE and WESTERN BLOT Analyses of MPB Labelled Samples of Floc Pellets

MPB labelled samples of floc pellets were analysed for total protein profile by SDS PAGE on 15% gels with Coommassie staining and for protein thiol profiles by a parallel SDS PAGE followed by Western Blotting with avidin-peroxidase development followed by chemiluminescence detection using the Amersham luminol development procedure (ECL, Amersham, Castle Hill, NSW, Australia; Vision Works software package and analysed using the GDS 7600 gel documentation and analysis system (Ultra-Violet Products, Cambridge, UK).

One set of gels was loaded with the samples on an equal volume basis to allow comparison of the relative amounts of protein/protein thiols present in the different samples. Another set of gels was loaded with samples on an equal protein basis (50 ug).

In all cases samples were prepared in SDS(+) sample buffer ((+) sample buffer contains 20 mM dithiothrietol).

Two Dimensional Gel Electrophoresis Analysis of Floc Pellet Samples

First dimension analyses were performed on InVitroGen pH 3-10 Isoelectric Focusing Strips loaded with 30 ug of floc pellet samples (not MPB labelled). Second dimension analyses were by SDS PAGE on 15% gels. Second dimension gels were stained with Ruby Red and the fluorescent pattern of protein spots was recorded using an FLA Imager using an excitation wavelength of 435 nm.

Analyses

Protein thiol levels in flocs are summarised in Table 47

TABLE 47

Thiols in floc proteins from VB beer

| Floc | Floc Pellets | | |
|---|---|---|---|
| | mg/ml | uM SH | nmoles SH/mg |
| AF 702 | 7.2 | 11 | 1.5 |
| LM 101 | 11.3 | 11 | 1.0 |
| LM 121 | 12.8 | 15 | 1.2 |
| ISSINGLASS 2-9 | 9.0 | 11 | 4.4 |
| WHOLE BEER 2-9 | 2.8 | 11 | 3.9 |

The Isinglass floc has a higher thiol:protein ratio than the pectin flocs. The proteins removed by pectin must presumably represent a different distribution to those removed with Isinglass.

To test this, the flocs were resuspended in slightly alkaline buffer and mixed with the thiol probe, MPB, and then analysed using SDS PAGE and 2D gel electrophoresis.

SDS PAGE and WESTERN BLOT Analyses

Figure 32:
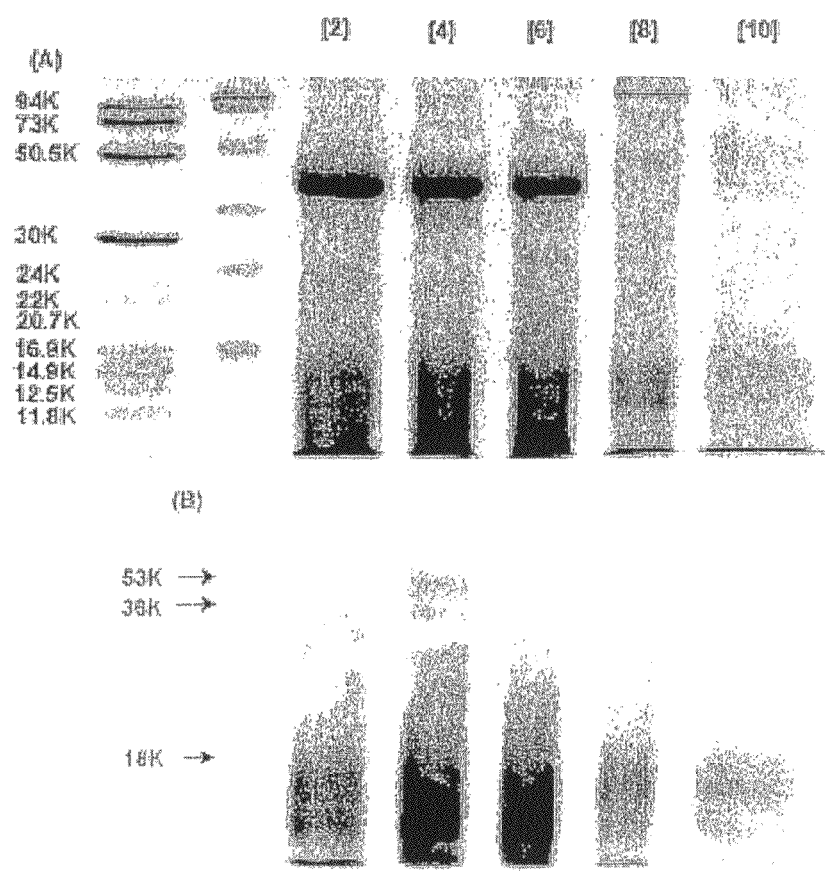
FIG. 32 shows MPB labelled floc pellet samples analysed on an equal protein basis. (A) SDS PAGE/Coomassie Blue stained proteins; (B) SDS PAGE Western Blot MPB labelling of protein thiols.

Samples of the MPB-labelled floc pellets were analysed on parallel SDS PAGE gels with Coomassie Blue staining and by SDS PAGE/Western Blots to reveal protein thiol redox status (FIG. 32(A)&(B)). The MPB labelled floc pellet samples were analysed on an equal protein basis (loading 50 µg protein).

FIG. 32(A) shows the SDS PAGE/Coumassie Staining patterns for the pectin VB beer floc proteins, the Isinglass VB floc protein and whole VB beer protein. (lane 2-AF 702, lane 4-LM101, lane 6-LM121, lane 8-Isinglass, lane 10-whole beer)

FIG. 32(B) shows the SDS PAGE/Western Blot and visualises protein thiol labelling (protein redox state).

The flocs stained with Coomassie Blue show typical beer staining patterns for the pectin floc samples. A strong band corresponding to the albumin protein is present at a position corresponding to 40,000 molecular weight, and a range of low molecular weight proteins from below ~20,000 Daltons can also be seen.

The protein profiles and the MPB-labelling profiles were similar for all of the pectin finings agents, however the Isinglass profile was different. All except Isinglass pulled out principally a 40K protein with a group of proteins of lower MW in the region 10-15K and some even lower MW material not resolved by these gels. The Isinglass seems to target, in the main, proteins in the 10-15K region (the same as can be seen in the control beer pellets not treated with any finings agent (c.f. lanes 8 and 10, FIG. 32(A)).

Most of the floc MPB labelling (FIG. 32(B)) is associated with the bands in the 10-15K region, although some labelling is also seen in the 40K region for those samples that contain this protein(s). While there are variations in the intensity of labelling for the different finings agents, the patterns obtained with Isinglass are the weakest of all. This suggests that the 10-15K polypeptides targeted by the Isinglass have fewer free thiols (perhaps are more oxidised) than the 10-15K polypeptides removed by the pectins.

2D Gel Analyses

Figure 33:
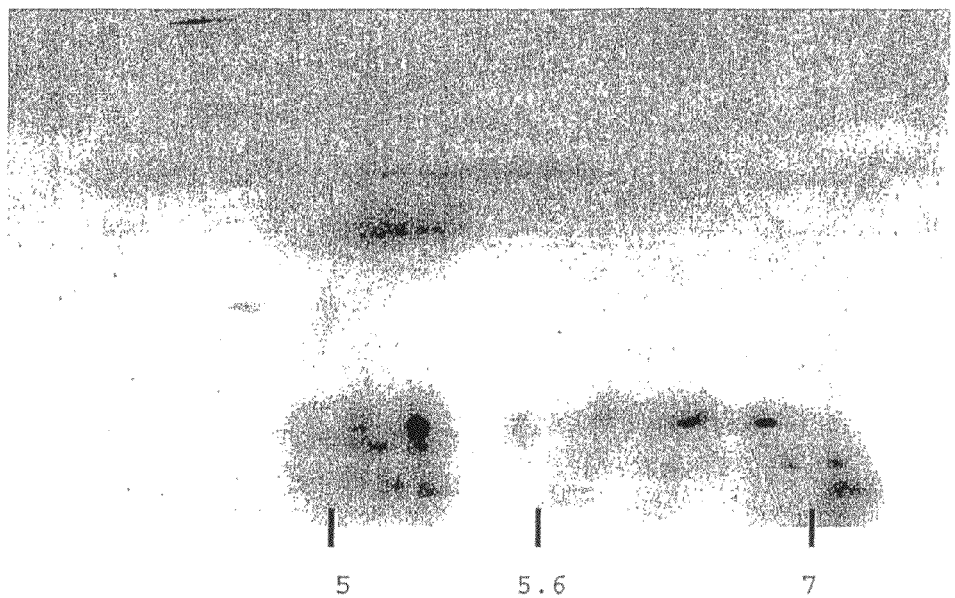
FIG. 33 shows a 2D gel analysis of pectin LM121 floc from VB beer.
Figure 34:
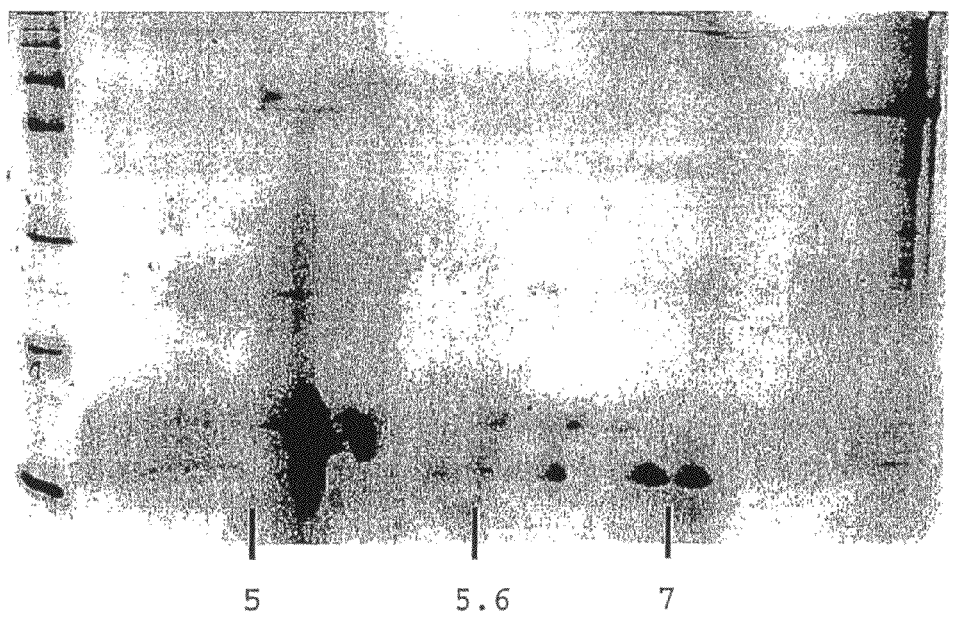
FIG. 34 shows a 2D gel analysis of Isinglass floc from VB beer.

2D Gel analyses were performed on floc pellet samples using Ruby Red protein staining (e.g. LM121 versus Isinglass flocs, VB beer; FIGS. 33 and 34).

The patterns obtained with pectin finings are all rather similar whereas the pattern obtained for the floc from Isinglass treatment is distinctly different.

The pectin flocs show a series of spots in the low molecular weight, 10-15K protein region, spread over a range of pIs (isoelectric points) from about 5 to 7.5 (FIG. 34). The patterns in this 10-15K region are very similar both in terms of the spots present and in terms of the relative intensity of the spots. This is shown clearly in FIG. 35 which shows the low molecular weight region of the 2D analyses for the different pectins and the Isinglass floc ((a) LM101, (b) LM121, (c) AF702, (d) LMC702, (e) Isinglass).

Figure 35:
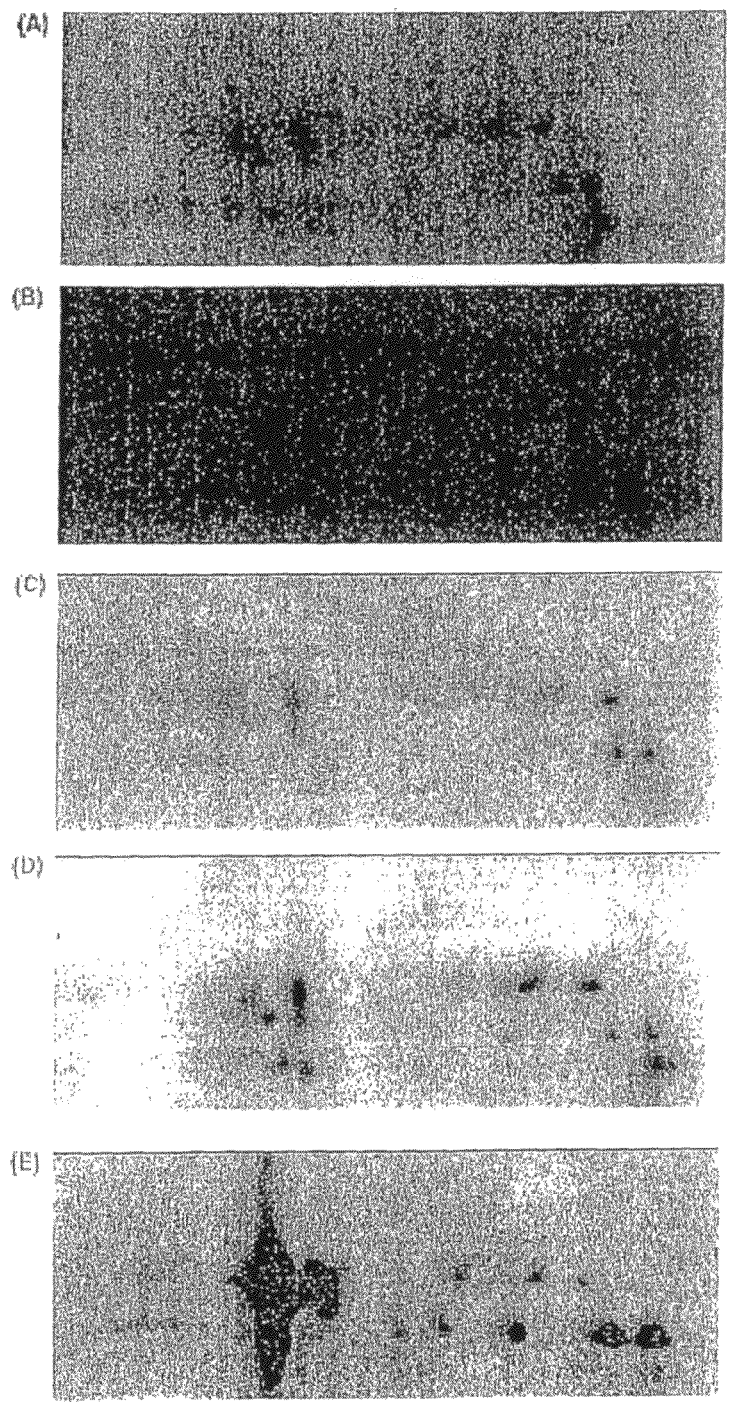
FIG. 35 shows Coomassie Blue stained 2D gel electrophoresis of floc pellet samples (a) pectin LM101, (b) pectin LM121, (c) AF702, (d) LMC710 and (e) Isinglass.

In the Isinglass pattern, FIG. 35(e), the relative intensity of the spots is very different from that in the other patterns ((a-d), FIG. 35)). This is made obvious by comparing the patterns overall or by comparing clusters of spots.

Clearly the bands around 10-15K as seen in the one dimension gels (FIG. 35), contain a whole range of isoelectric variants and the more acidic (oxidised forms probably) tend to dominate in the material bound to the Isinglass.

It seems that the Isinglass targets the acidic (more oxidised) protein forms more so than the pectin variants. Whereas it seems the pectin flocs are more reliant on electrostatic forces to form flocs, preferably with basic (positive) proteins.

Since collagen flocs contain predominantly low molecular weight, redox active proteins, it is not surprising that the Isinglass finings action is not so dependent on sulphite effects given such a relative abundance of reactive thiols.

Pectins, on the other hand, seem less likely to accumulate high amounts of thiol reactive proteins. So sulphite could in this situation activate these flocs by reduction of protein disulphides, which would, in effect create reactive free thiols. These thiols could then participate in crosslinking to stabilise and grow the flocs.

REFERENCES

Ciucanu I. and Kerek F. (1984) Carbohydr. Res., 131, 209-217.

Dubois, M., Gilles, K. A., Hamilton, J. K., Rebeis, P. A. and Smith, F. (1956) Anal. Chem., 18, 350-356.

Filisetti-Cozzi T. M. C. C. and Carpita N. C. (1991) Anal. Biochem., 197, 157-162.

Fry S. (1988) The Growing Plant Cell Wall: Chemical and Metabolic Analysis. Longman Scientific and Technical, London.

Laemmli E. K. (1970) Nature 227, 680-685.

Lim, Y H, M. Pecar, D. Sudarmana, R. Peel, M. Freeman, and D. Hawthorne, "Effect of storage conditions on the filterability of beer," Master Brewers Association of the Americas Technical Quarterly, vol. 29, pp. 37-41, 1992.

McConville, M. J., Homans, S. W., Thomas-Oates, J. E., Dell, A. and Bacic, A. (1990) J. Biol. Chem., 265, 7385-7394.

Persson J. and Nasholm T. (2001) Physiol. Plant. 113, 352-358.

TABLE 1

| Pectin | Supplier | DE (%) | DA (%) | Sugar conc. (%) | | | Metallic ion and Citrate (%) | | | | | | |
|---|---|---|---|---|---|---|---|---|---|---|---|---|---|
| | | | | Sucrose | Glucose | Fructose | Fe | Cu | Ca | Mg | Na | K | Citrate |
| HM121 | Citrus Colloids | 57 | N/A | 21.7 | 1.1 | 0.8 | <0.01 | <0.01 | 0.01 | <0.01 | 0.80 | 0.05 | N/A |
| LM101 | CP Kelco | 35 | 15 | 33.0 | 3.6 | 1.7 | <0.01 | <0.01 | 0.01 | <0.01 | 0.80 | 0.02 | 0.46 |
| LA110 | Danisco | 33 | 17 | <0.1 | 29.5 | <0.1 | <0.01 | <0.01 | 0.02 | <0.01 | 0.50 | 0.01 | 0.03 |
| LM102 | CP Kelco | 30 | 19 | 33.3 | 0.6 | 0.7 | <0.01 | <0.01 | 0.01 | <0.01 | 0.50 | 0.01 | 0.69 |
| CF005 | Herbstreith & Fox | 32-40 | 11-17 | 24 | 0.5 | <0.1 | <0.01 | <0.01 | 0.01 | 0.02 | 0.65 | 0.06 | 0.02 |
| CF010 | Herbstreith & Fox | 30-36 | 14-20 | 22 | 0.2 | <0.1 | <0.01 | <0.01 | 0.01 | <0.01 | 0.45 | 0.03 | 0.03 |
| CF020 | Herbstreith & Fox | 27-32 | 18-23 | 28 | 1.2 | <0.1 | <0.01 | <0.01 | 0.01 | 0.01 | 1.24 | 0.17 | N/A |
| AY901 | Herbstreith & Fox | 42-47 | N/A | <0.1 | 26.6 | <0.1 | <0.01 | <0.01 | 0.10 | <0.01 | 1.40 | 0.30 | 0.03 |
| AY801 | Herbstreith & Fox | 43-48 | N/A | <0.1 | 5.4 | 0.1 | <0.01 | <0.01 | 1.20 | <0.01 | 2.40 | 0.20 | N/A |
| LMC710 | Danisco | 48 | N/A | <0.10 | 0.4 | <0.1 | <0.01 | <0.01 | 0.02 | <0.01 | 1.20 | 0.12 | N/A |
| AF702 | Herbstreith & Fox | 38-44 | N/A | 20.0 | 0.33 | <0.1 | <0.01 | <0.01 | 0.01 | <0.01 | 0.46 | 0.08 | N/A |

TABLE 2

| Beer | Style | Malt charge | Kettle Hops | Kettle Finings | Yeast | Initial Turbidity (EBC) | $Ca^{2+}$ (mg/L) |
|---|---|---|---|---|---|---|---|
| LAGER | HG | 75 | No | No | A | 50.8-76.8 | 24 |
| FLEX | HG | 75 | 25% | Yes | A | 20.4 | 33 |
| VB | HG | 71 | No | No | A | 33.8-62.3 | 30-35 |
| FICE | UHG | 70 | No | No | A | N/A | 37 |
| CPL | UHG | 80 | 40% | No | A | 61.8 | 39 |
| RPL | HG | 63 | 80% | No | J | 36.2-49.6 | N/A |
| CNM | UHG | 80 | 40% | No | A | 57.8-77.2 | 59 |
| CD | HG | 67 | No | Yes | A | 32.9-45.3 | N/A |
| STELLA | HG | 80 | 100% | No | I | 10.9 | N/A |
| CC | HG | 67 | No | Yes | A | 61.4-65.3 | N/A |

What is claimed is:

1. A finings formulation for use in fining beer comprising a pectin selected from the group consisting of a high methyl ester pectin with a DE of about 50% to 65%, a low methyl ester pectin with a DE of about 20% to 50%, and an amidated low methyl ester pectin with a DE of about 20% to 40%, and a donor of sulphur dioxide, wherein a ratio of pectin to donor of sulphur dioxide is about 3.5:1 to 7.5:1.

2. The finings formulation according to claim 1, in which the ratio of pectin to donor of sulphur dioxide is about 5:1.

3. The finings formulation according to claim 1, in which the donor of sulphur dioxide is potassium metabisulphite or sodium metabisulphite.

4. The finings formulation according to claim 1, in which the pectin is a high methyl ester pectin with a DE of about 50% to 60%.

5. The finings formulation according to claim 1, in which the pectin is a low methyl ester pectin with a DE of about 30% to 50%.

6. The finings formulation according to claim 1; in which the pectin is a low methyl ester pectin with a DE of about 35% to 45%.

7. The finings formulation according to claim 1, in which the pectin is a low methyl ester pectin with a DE of about 40%.

8. The finings formulation according to claim 1, in which the degree of amidation of the amidated low methyl ester pectin is about 10% to 25%.

9. The finings formulation according to claim 8, in which the degree of amidation of the amidated low methyl ester pectin is about 14% to 18%.

10. The finings formulation according to claim 1, comprising more than one pectin.

11. The finings formulation according to claim 1, further comprising a buffering agent capable of buffering the pH of a solution of the formulation to a pH of from about 4.0 to 5.0.

12. The finings formulation according to claim 11, in which the buffering agent is capable of buffering the solution to around pH 4.8.

13. The finings formulation according to claim 12, in which the buffering agent is citrate buffer.

14. The finings formulation according to claim 11, in which the buffering agent is capable of buffering the solution to around pH 4.5 to pH 5.0.

15. The finings formulation according to claim 1, further comprising a sequestering agent for at least one divalent ion.

16. The finings formulation according to claim 15, in which the sequestering agent chelates at least one of calcium, magnesium, iron, and copper ions.

17. The finings formulation according to claim 15, in which the sequestering agent is tri-sodium citrate, citric acid or a combination thereof.

18. The finings formulation according to claim 1, wherein the finings formulation is in aqueous solution.

19. The finings formulation according to claim 18, in which the pectin in the aqueous solution is present at about 1% to 10% (w/v).

20. The finings formulation according to claim 19, in which the pectin in aqueous solution is present at about 5% to 7% (w/v).

21. The finings formulation according to claim 20, in which the pectin in aqueous solution is present at about 5% to 5.5% (w/v).

22. The finings formulation according to claim 18, comprising about 5.5% (w/v) pectin, about 1.5% (w/v) sodium citrate, about 0.5% (w/v) citric acid, and about 1.0% (w/v) potassium metabisulphite.

23. A method of fining beer, comprising adding to the beer a finings formulation according to claim 22.

24. The finings formulation according to claim 18, further comprising at least one additive.

25. The finings formulation according to claim 24, in which the at least one additive is tannic acid.

26. The finings formulation according to claim 25, in which the tannic acid is present at a final concentration of about 10 ppm to 50 ppm of total beer volume.

27. The finings formulation according to claim 26, in which the tannic acid is present at a final concentration of about 30 ppm to 50 ppm of total beer volume.

28. The finings formulation according to claim 24, in which the at least one additive is hop extracts with about 30% to 50% ethanol or hop extracts with acidic water of a pH ranging from about 1.8 to 2.0 at about 0.1% to 0.5% (v/v) of total volume of the acidic water.

29. The finings formulation according to claim 24, in which the at least one additive is commercial hop extract.

30. The finings formulation according to claim 24, in which the at least one additive is cytochrome C.

31. The finings formulation according to claim 30, in which the at least one additive is present at a final concentration of about 5 ppm to 20 ppm of total beer volume.

32. A method of fining beer, comprising adding to the beer a finings formulation according to claim 31.

33. The finings formulation according to claim 1, further comprising at least one additive.

34. The finings formulation according to claim 33, in which the at least one additive is tannic acid.

35. The finings formulation according to claim 34, in which the tannic acid is present at a final concentration of 10 ppm to 50 ppm of total beer volume.

36. The finings formulation according to claim 35, in which the tannic acid is present at a final concentration of about 30 ppm to 50 ppm of the total beer volume.

37. The finings formulation according to claim 33, in which the at least one additive is hop extracts with about 30% to 50% ethanol or hop extracts with acidic water of a pH ranging from about 1.8 to 2.0 at about 0.1% to 0.5% (v/v) of total volume of the acidic water.

38. The finings formulation according to claim 33, in which the at least one additive is commercial hop extract.

39. The finings formulation according to claim 33, in which the at least one additive is cytochrome C.

40. The finings formulation according to claim 39, in which the additive is present at a final concentration of about 5 ppm to 20 ppm of total beer volume.

41. The finings formulation according to claim 1, comprising about 25% to 91% (w/w) pectin, about 5.5% to 50% (w/w) citrate and about 3.5% to 25% (w/w) a donor of sulphur dioxide.

42. A method of fining beer, comprising adding to the beer a finings formulation according to claim 1.

43. A beer that has undergone a fining process according to the method of claim 42.

44. The finings formulation according to claim 1, in which the pectin is an amidated low methyl ester pectin with a DE of about 30% to 37%.

45. The finings formulation according to claim 44, in which the degree of amidation of the amidated low methyl ester pectin is about 10% to 25%.

46. The finings formulation according to claim 44, in which the degree of amidation of the amidated low methyl ester pectin is about 14% to 18%.

47. A method of fining beer, comprising adding to beer a finings agent comprising a pectin selected from the group consisting of a high methyl ester pectin with a DE of about 50% to 65%, a low methyl ester pectin with a DE of about 20% to 50%, and an amidated low methyl ester pectin with a DE of about 20% to 40%, and a donor of sulfur dioxide, in which an amount of pectin is in the range of about 10 ppm to 300 ppm inclusive of the total beer volume, wherein a ratio of pectin to donor of sulfur dioxide is about 3.5:1 to 7.5:1.

48. The method according to claim 47, in which the amount of pectin is in the range of about 40 ppm to 80 ppm inclusive of total beer volume.

49. A beer that has undergone a fining process according to the method of claim 48.

50. A beer that has undergone a fining process according to the method of claim 47.

* * * * *

UNITED STATES PATENT AND TRADEMARK OFFICE
CERTIFICATE OF CORRECTION

| | | |
|---|---|---|
| PATENT NO. | : 8,697,169 B2 | Page 1 of 1 |
| APPLICATION NO. | : 11/663274 | |
| DATED | : April 15, 2014 | |
| INVENTOR(S) | : Duan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1568 days.

Signed and Sealed this
Nineteenth Day of May, 2015

Michelle K. Lee
*Director of the United States Patent and Trademark Office*